(12) United States Patent
Serafinowski et al.

(10) Patent No.: US 7,956,011 B2
(45) Date of Patent: Jun. 7, 2011

(54) MATERIALS AND METHODS FOR THE PHOTODIRECTED SYNTHESIS OF OLIGONUCLEOTIDE ARRAYS

(75) Inventors: Pawel Jerzy Serafinowski, Kent (GB); Peter Bryan Garland, Sussex (GB)

(73) Assignee: The Institute of Cancer Research: Royal Cancer Hospital, London (GB)

( * ) Notice: Subject to any disclaimer, the term of this patent is extended or adjusted under 35 U.S.C. 154(b) by 158 days.

(21) Appl. No.: 11/913,650

(22) PCT Filed: May 4, 2006

(86) PCT No.: PCT/GB2006/001617
§ 371 (c)(1),
(2), (4) Date: Nov. 5, 2007

(87) PCT Pub. No.: WO2006/117556
PCT Pub. Date: Nov. 9, 2006

(65) Prior Publication Data
US 2009/0270279 A1    Oct. 29, 2009

Related U.S. Application Data

(60) Provisional application No. 60/677,579, filed on May 4, 2005.

(51) Int. Cl.
| C40B 50/00 | (2006.01) |
| C40B 50/12 | (2006.01) |
| C40B 50/18 | (2006.01) |
| C07H 21/00 | (2006.01) |
| C40B 40/00 | (2006.01) |
| C40B 40/06 | (2006.01) |
| C40B 40/10 | (2006.01) |
| C40B 60/10 | (2006.01) |
| C12Q 1/68  | (2006.01) |

(52) U.S. Cl. ............... 506/23; 506/13; 506/16; 506/18; 506/29; 506/32; 506/33; 536/25.3; 435/6

(58) Field of Classification Search .................. 506/13, 506/16, 18, 23, 29, 32, 33; 435/6; 536/25.3
See application file for complete search history.

(56) References Cited

U.S. PATENT DOCUMENTS

| 5,510,476 A    | 4/1996  | Ravikumar et al. |
| 6,541,077 B1   | 4/2003  | Kozawa et al.    |
| 2004/0110133 A1| 6/2004  | Xu et al.        |
| 2004/0248034 A1| 12/2004 | Henderson et al. |

FOREIGN PATENT DOCUMENTS

| WO | 9812559    | 3/1998  |
| WO | 9941007    | 8/1999  |
| WO | 0053311    | 9/2000  |
| WO | 2005108992 | 11/2005 |

Primary Examiner — Jezia Riley
(74) Attorney, Agent, or Firm — Patrick J. Hagan; Dann, Dorfman, Herrell and Skillman, P.C.

(57) ABSTRACT

Materials and methods for photodirected synthesis of oligonucleotide arrays on a solid substrate by photodirected synthesis are disclosed which employ a film formed from (i) a photoacid generator that on photolysis generates acid that is capable of directly removing the protecting group of the linker molecules or oligonucleotides and (ii) a polymer substantially lacking electronegative heteroatoms that are capable of hydrogen bonding with photogenerated acid. Methods of synthesizing an oligomer arrays are also described that use a film that restricts diffusion of reactants and products on the substrate during synthesis of the array and which includes a precursor of a deprotecting reagent. The method involves removing one or more of the non-required products of the deprotection reaction from the reactive array elements at which they are produced during the reaction, in order to displace the deprotection reaction towards completion.

16 Claims, 17 Drawing Sheets

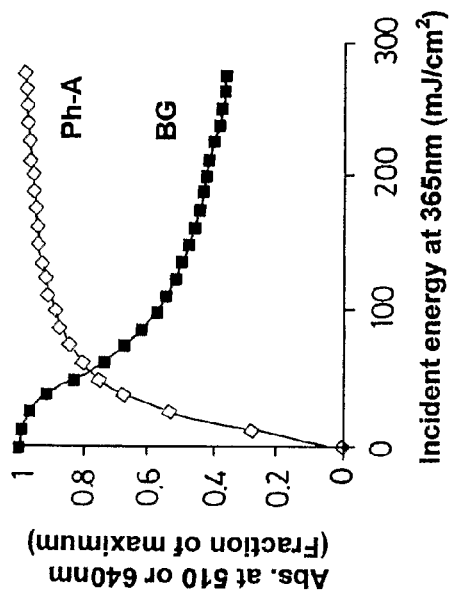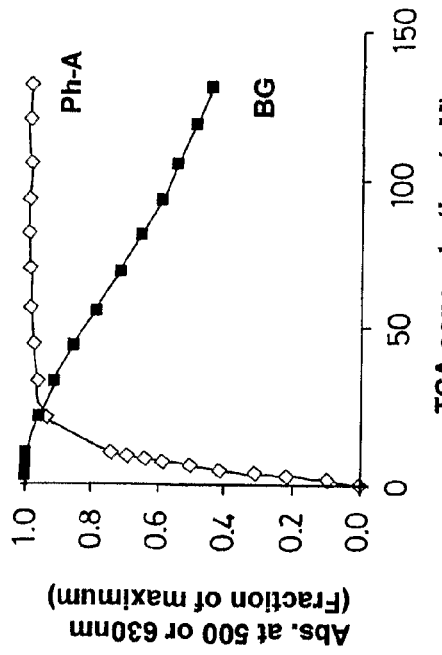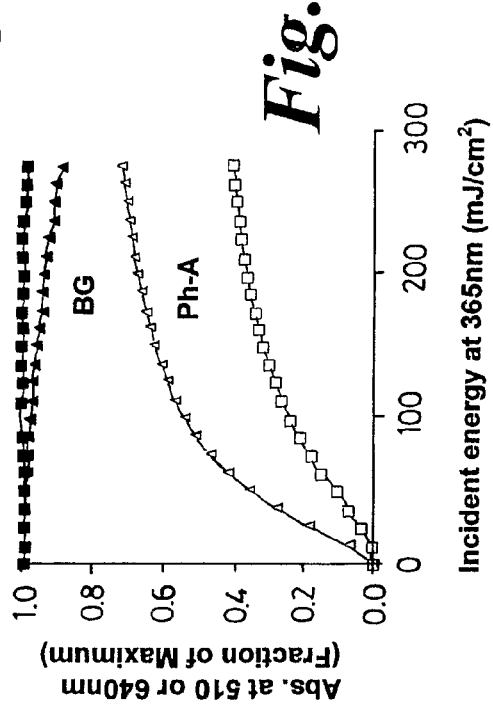
Fig. 3(a)
Fig. 3(b)
Fig. 3(c)

Upper plate

Lower plate

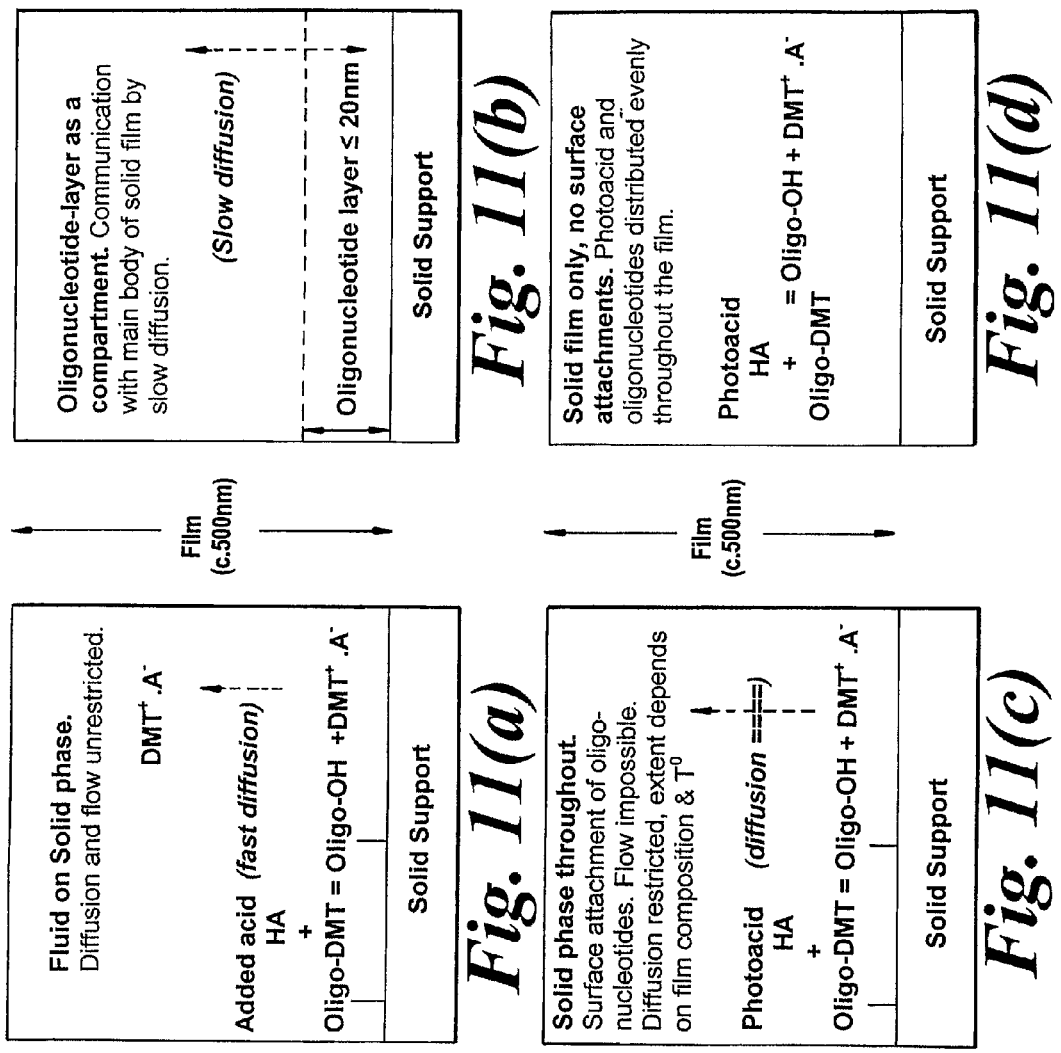

MATERIALS AND METHODS FOR THE PHOTODIRECTED SYNTHESIS OF OLIGONUCLEOTIDE ARRAYS

This application is the U.S. National Stage of International Application No. PCT/GB2006/001617, filed 4 May 2006, which claims the benefit of U.S. Provisional Application No. 60/677,579, filed 4 May 2005. The entire discloses of the aforesaid applications are incorporated by reference in the present application.

FIELD OF THE INVENTION

The present invention relates to the synthesis of oligonucleotide arrays, and in particular to materials and methods that employ polymeric films comprising a compound that can be photolysed to generate acid for removing a protecting group present on a linker or oligonucleotides at an element of the array. Apparatus for array synthesis are also provided. The present invention also relates to the synthesis of oligomer arrays and in particular to methods for synthesizing oligomer arrays that employ a film comprising a precursor of a reagent that is capable of removing the protecting groups that are present on oligomer or linker groups at elements of the array where synthesis is required. In preferred embodiments, the methods of the present invention are used for the synthesis of oligonucleotide arrays.

BACKGROUND OF THE INVENTION

The most robust and least costly synthetic chemistry for oligonucleotide synthesis is that already well established for conventional use (Caruthers, 1991). The direction of synthesis of the oligonucleotide chains is typically in the 3'- to 5'-direction, with the first monomeric unit covalently attached through its 3'—OH group and a linker to a solid phase such as controlled porosity glass or plastic beads. The method is described as solid phase, but all other reactants are provided by a surrounding liquid phase: the reactions occur on rather than in the solid phase. The monomeric building blocks are nucleosides with an acid labile 5'-O-dimethoxytrityl group (DMT–) protecting the nucleoside 5'—OH position, and a cyanoethyl-phosphoramidite group at the 3'—OH position involving a repetitive sequence of chemical reactions involved in oligonucleotide synthesis. Stepwise addition of each monomeric unit to the growing oligonucleotide requires deprotection of the existing terminal 5'-nucleotide by removal of DMT with added acid prior to coupling with a new nucleoside via a 3'-phosphoramidite group (Caruthers 1991; Beaucage & Iyer, 1992). Acid-labile protecting groups other than DMT may be used (Lehmann et al, 1989) without altering the general principles of the procedure. The direction of synthesis can be altered by switching the substituents at the 3'- and 5'-positions.

Pease et al (1994) created a photodirected method of oligonucleotide synthesis by replacing the DMT-blocking group with a photosensitive one that leaves on illumination. All other reactions were unchanged, but the solid phase was a sheet of glass rather than granules or beads. This photodependent method of oligonucleotide deprotection at the 5'—OH position was used with patterned illumination to create different oligonucleotides at different but spatially addressable locations on a planar surface, i.e. an oligonucleotide array. Because photo-deprotection at the 5'—OH position must be essentially complete to preserve synthetic yields over typically 20-25 synthetic cycles for each oligonucleotide, illumination must be prolonged for 8-10 photolytic half-lives of the photosensitive protecting group. Light sensitivity is therefore low but sensitivity to stray light is not (Garland & Serafinowski, 2002). Expensive reagents, poor light sensitivity and photolithographic masks all increase the cost of array fabrication. Replacement of photolithographic masks by pattern projection with a digital light modulator makes for much improved flexibility (Singh-Gasson et al, 1999). However, the low light sensitivity of direct photodeprotection allied with limits to the UV light intensities that digital light modulators can tolerate constrains this maskless method to serial rather than parallel synthesis, i.e. one full size array (currently 1024×768 pixels) per complete synthesis. The resultant low throughput maintains high cost. The major advantage of the maskless method is in removing the very substantial initial cost of making a new set of 80-100 photolithographic masks for custom-designed arrays. Arrays made using the photodirected chemistry described above are available commercially, but there is a major need amongst users or would-be users for arrays that are less expensive than those currently available.

The fabrication of high density oligonucleotide arrays can also be carried out using the conventional DMT-based chemistry. This variation requires that the acid responsible for removal of DMT-groups is provided in a spatially addressable manner at the planar surface on which oligonucleotides are to be synthesised.

Irrespective of whether the acid is added as such, generated photochemically (Wallraff et al, 1997; Gao et al, 1998, Serafinowski & Garland, 2003) or electrochemically (Southern & Egeland, 2004) some means must be found to restrict diffusion of acid from its point of generation or application to other sites on the array surface, otherwise the spatial separations that define an array will be lost.

A variety of methods have been used to localize acid to discrete areas on a planar surface. Where the acid is photogenerated in solution, surface tension wells (Gao et al, 2001) or physical wells (Zhou et al, 2004) have been successfully used, but the surface density of the resulting arrays was not high, about $10^4$ elements or features per $cm^2$. Low array densities are also obtained using local application of acid solution by mechanical pins, micro-jets, micro-channels or elastomeric templates.

Solid matrices of organic polymers have been used for many years as transparent and inert matrices in which the photochemistry of incorporated light-sensitive molecules under conditions of restricted translational and rotational diffusion could be studied by optical methods (e.g. Cowell & Pitts, 1968). Similar matrices have come into widespread use as films for photolithographic patterning in the fabrication of integrated semiconductor devices, where they are used as photoresists. In this use, a solid film of photoresist composition is created on a planar semiconductor substrate, typically silicon, by spin coating from a solution of the photoresist composed of an organic polymer and other components including a photoacid generator. A heating step (pre-exposure bake) is invariably used to drive off residual solvent remaining from the film casting solution that would otherwise increase photoacid diffusion in the film to levels that might give unacceptable loss of photolithographic resolution. Exposure of the film to patterned light illumination to generate photoacid followed by post-exposure baking alters the solubility of the illuminated areas, such that exposure to a particular solvent or mixture of solvents differentially removes polymer from the illuminated or non-illuminated areas. The resulting polymer pattern then determines access in the exposed areas of the substrate to treatments such as vapor etching or layer deposition that determine the structure of the integrated circuit (Thompson et al, 1994).

Translation of photoacid-dependent photolithographic methods from the semiconductor industry to oligonucleotide array fabrication would at first sight seem attractive. However, the polymer and PAG requirements for photodirected synthesis of oligonucleotide arrays differ in several significant ways from those for manufacture of integrated semiconductor devices, as follows. Firstly, with one exception (Pease et al, 1998) the polymer is required only as a diffusion-restricting solid matrix for photoacid, and not as a photopatterned resist for determining access of other reagents to the substrate surface as in semiconductor device fabrication. Moreover, in the synthesis of oligonucleotide arrays the molecules being synthesised are easily damaged by strong acids or free radicals, yet these are generated by many of the PAGs widely used in the electronics industry. This damage may be exacerbated by the high temperatures used for post-exposure baking. Finally, for the synthesis of oligonucleotide arrays, the stepwise yield for the photoacid-dependent steps in the photodirected synthesis must be very close to 100%, otherwise the overall yield of desired product will fall with each successive synthetic cycle, to be replaced by products of incorrect sequence. A similar quantitative yield is not demanded of the chemistry involved in photolithography.

Despite these potential hurdles photolithographic generation of acid in solid diffusion-restricting films of organic polymers would avoid the problems posed by diffusion of acid in liquid solution, and offer 100-fold or greater increases in array density. The high array densities combined with lower reagent costs and industrial-scale fabrication offer the prospect of substantial reductions in the fabrication cost of oligonucleotide arrays, resulting in their much wider availability to users in biomedical research and its applications. However, getting the detritylation step chemistry to work properly and achieve >99% deprotection of the oligonucleotide-5'—OH group in a diffusion restricting polymer has been problematical, and this approach has not at present been satisfactorily implemented for oligonucleotide array fabrication.

Part of this difficulty arises from reversibility of acid-dependent removal of protecting groups such as DMT. In conventional solid phase syntheses of peptides or oligonucleotides the released acid-labile protecting group can be washed away with deprotection solution from the site of production at the solid phase, enabling the deprotection reaction to proceed to completion. Washing the solid phase with the deprotecting solution is simple and inexpensive. Nevertheless alternative strategies have been proposed and exemplified, even if not widely used. They depend on providing in the (typically acid) deprotection solution a compound that acts as a scavenger for the protecting group released at the surface of the solid phase.

An early example of the use of a scavenging agent was given by Brenner et al (1984) and Davison et al (1987) for the use of triethylsilane as a carbocation scavenger in the acidic deprotection of a tritylated thiol derivative. Reese et al (1986) used pyrrole to react irreversibly with DMT carbocation in solution phase oligonucleotide synthesis. Mehta et al (1992) used triethylsilane to react irreversibly with the carbocations released by acid from peptides protected by t-butyl or t-butoxycarbonyl groups. Ravikumar et al (1996) described the use of a variety of scavengers in acid solution used for deprotection of oligonucleotide OH-groups protected by DMT or related groups that also convert to carbocations when exposed to acid. The scavengers included anisole, thioanisole, benzyl mercaptan, ethanediol, pyrrole and silanes of general formula $R_3SiH$ where R is $C_1$-$C_4$-alkyl, phenyl, or phenyl monosubstituted by halo, nitro- or $C_1$-$C_4$-alkyl. Other possible carbocation scavengers are indole, thiophen and furan, either substituted or non-substituted; phenol, resorcinol, 1,3 dimethoxy benzene, 1,3,5-trimethoxybenzene, and dimethylsulfide.

In the past 10 years, there have been six approaches to the use of photoacid dependent methods in the fabrication of oligonucleotide arrays. One of them, using photoacid in solution, appears to have been technically successful but required sophisticated and expensive microfluidic devices to define the physical boundaries of each array element, which in any case were relatively large and gave low density arrays (Gao et al, 2004. Xu et al, 2004. ). The other five approaches have used photolithographic methods applied to diffusion-restricting solid films at the array surface.

In a first such approach, Wallraff et al (1997) used poly (methylmethacrylate) ("PMMA") as a solid matrix containing one of a variety of PAGs and applied it to glass surfaces on which oligonucleotide arrays were to be synthesised. The sequence of reactions was as follows:

First, a photoacid generator on illumination produces acid (Equation 1) which then dissociates to anion and proton (Equation 2). The extent of dissociation depends on the $pK_a$ of the acid:

$$\text{PAG+light=Residual photoproduct(s)+photoacid} \tag{1}$$

$$\text{Photoacid=Anion}^-+\text{H}^+ \tag{2}$$

"Residual photoproducts" covers those photoproducts other than the photoacid itself: for example, the substituted 2-nitroso-compounds remaining after photolysis of substituted 2-nitrobenzyl esters. Generated protons participate as a substrate for the detritylation of dimethoxytrityl-blocked oligonucleotides (Equation 3), not as a catalyst. The products of the reaction are the oligonucleotides with an unblocked 5'- or 3'—OH group, depending on the chosen direction of synthesis, plus the dimethoxytrityl cation.

$$\text{DMT-oligonucleotide+H}^+=\text{DMT}^++\text{HO-oligonucleotide} \tag{3}$$

When the environment is solid and aprotic Equation (3) may be more appropriately written with direct participation of the photoacid HA and the formation of ion pairs rather than free ions, as in Equation (4):

$$\text{DMT-oligonucleotide+HA=DMT}^+.\text{A}^-+\text{HO-oligonucleotide} \tag{4}$$

Under the conditions used by Wallraff et al (1997) generation of a preferred carboxylic photoacid failed to achieve adequate detritylation, even if heated to 90-100° C. for 2-3 min. The use of much stronger acids, also with heating, did achieve full detritylation, but caused unacceptable depurination.

In a second approach, conventional photoresists were used to determine access of either added 20% dichloroacetic acid solution (McGall et al, 1996) or trichloroacetic acid vapor (Pease et al, 1998) to 5'-DMT-O-oligonucleotides attached to the underlying substrate, which in all cases was glass. For technical reasons, a layer of polymer was required under the layer of photoresist, thereby involving two spin-coatings and their associated pre- and post-illumination baking steps. The stepwise synthetic yield was 90% and therefore not usable.

In a third approach, Beecher et al (1997, 2000) turned to a chemical amplification method to overcome the inadequate detritylation obtained by Wallraff et al (1997) with weaker acids such as haloacetic or alkylsulphonic acids. In the amplification method, photoacid generated as in Equation (1) catalyzes at elevated temperature the thermolysis of a compound known as an enhancer. For example, 1,4-cyclohex-2-enediylbis-(pentafluorobenzoate) when exposed to both acid and heat decomposes as shown below (Equation 5) to give a net gain of two molecules of acid (pentafluorobenzoic) for each molecule of enhancer that undergoes thermolysis. The photoacid is not the detritylating acid; it acts as a catalyst to initiate the thermolytic and acid-producing decay of the enhancer.

Equation (5)

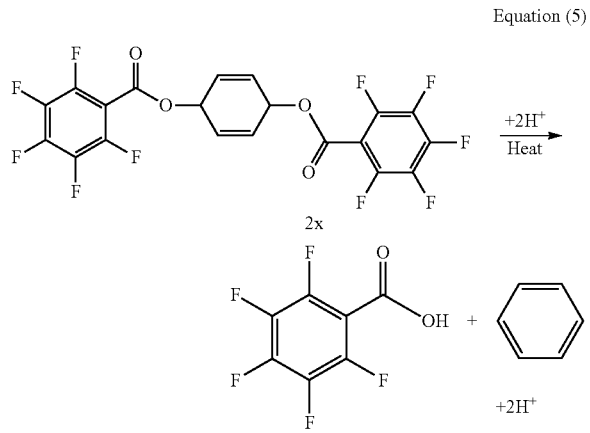

In a fourth approach, Serafinowski & Garland (2003, 2004) described a series of substituted 2-nitrobenzyl esters that, when photolysed, release by an intramolecular rearrangement an acid (trichloroacetic) that is capable of effecting the detritylation step of oligonucleotide without generating potentially damaging photochemical products. Two such esters were tested in a photo-dependent variation of otherwise conventional solid-phase oligonucleotide synthesis on controlled porosity glass. Synthetic yields of 99-100% were obtained (Serafinowski & Garland, 2003). Some of these esters form solid, optically clear films, and when formed as photosensitive films in contact with an underlying planar glass surface carrying covalently attached DMT-T can achieve >98% detritylation on illumination. Post-exposure heating is not required. These same esters are also effective when incorporated in a polymer film, provided that the polymer lacks electronegative heteroatoms that may otherwise weaken the acid by hydrogen bonding (Garland & Serafinowski, 2006).

In a fifth approach Goldberg et al (2005) used as the photoacid generator either 2,6-dinitrobenzyltosylate or a substituted diphenyliodonium hexafluorophosphate in PMMA films on glass. This approach differed from that of Wallraff et al (1997) in two ways: the post-exposure baking step was omitted and a base was incorporated in the film to prevent inappropriate acidification of the films by the relatively strong photoacids. Fidelity of oligonucleotide synthesis using 2,6-dinitrobenzyl-tosylate as the photoacid generator was judged by an indirect method to be comparable with the 97-99% achievable with conventional oligonucleotide synthesis using solution phase. The stepwise synthetic yield using the diphenyliodonium hexafluorophosphate was an unsatisfactory 93% as calculated from the 64% overall synthetic yield of a hexamer.

Of the methods described above for oligonucleotide synthesis using patterned photoacid generation in a diffusion-restricting solid, that using photoacid generators based on substituted 2-nitrobenzyl esters of trichloroacetic acid in films of non-hydrogen bonding polymers has a number of advantages. Trichloroacetic acid itself is well tolerated by purine nucleotides, and has been the acid of choice for oligonucleotide synthesis over many years. The photolysis of substituted 2-nitrobenzyl esters proceeds via an intramolecular rearrangement; hydrogen abstraction from other molecules is not required, and potentially aggressive photochemical products are not formed. Methyl- or phenyl-substitution of the α-carbon atom can be used to improve quantum yield without causing instability of the trichloroacetate esters; this is not the case with tosylic esters, which undergo spontaneous intramolecular rearrangement with loss of acid in response to substitution with methyl or phenyl groups at the α-carbon atom.

Other substitutions of the 2-nitrobenzyl structure can be made to give a wide range of photochemical properties and excitation wavelengths. Post exposure heating is not required. Substituted 2-nitrobenzyl-trichloroacetate esters are film forming in their own right, but can be conveniently used in films of polymers that lack electronegative heteroatoms and cannot weaken carboxylic acids by hydrogen bonding to their undissociated carboxyl groups. (Garland & Serafinowski, 2006).

WO 03/000644 (Serafinowski & Garland) provides a way of overcoming some of the drawbacks of the first approach. It discloses a series of substituted 2-nitrobenzyl esters that, when photolysed, release acid that is capable of removing a terminal protecting group from an oligonucleotide being synthesised in an array. These esters are typically used in the first method described above in which the photogenerated acid is capable of directly deprotecting a dimethoxytrityl-blocked oligonucleotide, rather than needing to employ the third method in which photogenerated acid is not involved in the deprotection reaction and instead serves to catalyze a thermolytic reaction in which the deprotecting acid is generated from an enhancer. The incorporation of the substituted 2-nitrobenzyl esters in polymeric films is disclosed. The application also discloses a method of ameliorating the effect of stray light irradiating elements of the array not being designated for synthesis by including small amounts of a buffer at the elements. The buffer serves to neutralize small amounts of acid produced by stray light while not substantially affecting the larger amounts of acid produced at sites designated for oligonucleotide synthesis.

US Patent Application 2004/0110133 follows on from U.S. Pat. No. 6,083,697 (Beecher et al, 2000) and lists polymers that might be used to provide a solid matrix for reactions (1) to (4) described above. The polymers listed were poly(methylmethacrylate), poly(acrylate), poly(ethylenepropylene), polyethylene and polyvinyl chloride. Apart from poly(methylmethacrylate, no exemplification of the use of these polymers was provided.

SUMMARY OF THE INVENTION

Broadly, the present invention is based on the recognition of reasons leading to some of the drawbacks of the three methods for photoacid dependent oligonucleotide synthesis described above. The first approach, using patterned photoacid generation in a polymer film, had the promise of higher light sensitivity, improved resolution, and diminished sensitivity to stray light. Unfortunately it failed, essentially due to deficiencies in the performance of photoacids: weaker acids gave inadequate detritylation, while stronger acids gave depurination. The second method, using a photoresist approach, gave only 90% stepwise yields in return for a complex and lengthy fabrication method. The third approach, using chemical amplification, gave satisfactory synthetic yields and photolithographic resolution, but suffered from the time-consuming complexities of spin coating and pre- and post-exposure baking at 90-100° C. Furthermore, the choice of the final acid, the one generated by acid-catalyzed thermolysis of a precursor molecule, was severely restricted. All three methods as described require physical manipulations involved in heating and spin coating. These manipulations erect barriers to devising simple and continuous automated production.

Accordingly, in one aspect, the present invention concerns improvements to methods of synthesizing oligonucleotide arrays and in particular to improvements to the first method that uses photogenerated acid to directly remove the protecting group present on a linker or oligonucleotide at elements of an array where nucleic acid synthesis is desired. Despite the drawbacks with the prior art attempts to implement the first method, the present inventors examined why the prior art examples of the method did not work efficiently, in particular (a) considering the possible interaction between polymers and carboxylic acids, (b) synthesizing a series of substituted 2-nitrobenzyl esters of trichloroacetic or other acids, to be used as photoacid generators, and (c) devising and applying sensitive spectrophotometric methods for simultaneous measurements of photoacid generation, intrafilm pH changes and oligonucleotide detritylation occurring within thin (<1 µm) films on glass microscope slides during illumination with photolytic light intensities.

These experiments are discussed in detail below but the conclusions and outcomes can be summarized now.

Carboxylic acids are capable of engaging in hydrogen bond formation either with themselves, to form homodimmers, or with solvent molecules. A hydrogen bond can be defined as a weak electrostatic interaction between a hydrogen atom and an electronegative atom bearing at least one lone pair of electrons—that is, a heteroatom such as N, O, P, S or a halogen (F, Cl, Br, I). The hydrogen atom is covalently bonded to one heteroatom and more weakly associated with a second heteroatom. Electronegativity values for atoms found in polymers are Si(1.8), P(2.1), H(2.2) S(2.5), C(2.5), Br(2.7), Cl(2.8), N(3.1), O(3.5) and F(4.1). The last five of this list when covalently bound to aliphatic carbon atoms in a polymer can all be expected to form hydrogen bonds with acidic —OH groups. The strongest bonds would be with fluorine, oxygen and nitrogen, and the other halides giving weaker bonds.

Binding of the undissociated carboxyl hydrogen atom to an adjacent solvent or polymer heteroatom lessens the probability that it will dissociate as a proton. In other words, the $pK_a$ is increased. Importantly, we observed that the dissociation of photogenerated carboxylic acids is severely inhibited by polymers such as poly(methylmethacrylate), polyesters, and polyethers that contain oxygen heteroatoms. We made similar observations with polyvinylchloride and polyacrylonitrile, where the heteroatom is chlorine and nitrogen respectively.

Accordingly, the present inventors realized that polymers lacking oxygen, nitrogen, and halogen heteroatoms, and therefore that are incapable of participating in hydrogen bonds, such as polystyrene or poly(α-methylstyrene) or their co-polymers, can be used with a photoacid generator such as substituted 2-nitrobenzyl esters, to achieve intrafilm pH levels that are sufficiently low to obtain complete oligonucleotide detritylation. In these circumstances, neither chemical amplification nor post-illumination baking is required. But there are two circumstances where oxygen, nitrogen or halogen heteroatoms can be tolerated in the polymer. Firstly their proportion in the whole polymer is low, as can occur with a co-polymer where the majority of subunits lack these heteroatoms whereas the minority does not. Secondly, the heteroatoms are substituents whose lone pair of electrons is conjugated with an aryl system, and consequently have diminished ability to act as acceptors of hydrogen bonds. Neither of these circumstances is preferred to the absence of electronegative heteroatoms.

Accordingly, in one aspect, the present invention provides a method for synthesizing an oligonucleotide array on a solid substrate by photodirected synthesis, the array having linker molecules or oligonucleotides attached to the substrate at a plurality of array elements, the linker molecules or oligonucleotides having protecting groups at their termini, wherein the method comprises:

(a) providing in contact with the array a film formed from
 (i) a photoacid generator that on photolysis generates acid that is capable of directly removing the protecting group of the linker molecules or oligonucleotides and
 (ii) a polymer substantially lacking electronegative heteroatoms that are capable of hydrogen bonding with photogenerated acid;
(b) exposing one or more array elements to radiation to photolyse the photoacid generator at the illuminated array elements so that the photogenerated acid deprotects the linker molecules or oligonucleotides at those array elements;
(c) removing the film;
(d) contacting the deprotected linker or oligonucleotide molecules with chemically reactive nucleosides so that the linker molecules or oligonucleotides couple to the nucleoside;
(e) optionally blocking deprotected and unreacted oligonucleotide or linker groups that did not react in step (d);
(f) optionally modifying the array produced in step (e) or (f); and
(g) repeating steps (a) to (f) until synthesis of the oligonucleotide array is complete.

In preferred embodiments, the electronegative heteroatoms that the polymer substantially lacks are oxygen, nitrogen and halogen heteroatoms.

There are three main classes of the polymers substantially lacking electronegative heteroatoms that are capable of hydrogen bonding with photogenerated acid that can be employed in accordance with the present invention.

The first and most preferred class are polymers with zero content of electronegative heteroatoms, such as polystyrenes, polycarbosilanes and acenaphthalenes.

A second class are polymers that contain electronegative heteroatoms that because of their position in the polymer have only a limited ability to form hydrogen bonds. These polymers include those having aryl groups with substituents in which the lone pair of an electronegative heteroatom is conjugated with or delocalized into the aryl electron system and which consequently has the a reduced ability to act as an acceptor for hydrogen bonds. An example of this class of polymers includes poly(arylhalides), such as poly(3-chlorostyrene) and poly(3,4-dichlorostyrene).

A third class of polymers are those that have a low content of electronegative heteroatoms as in co- or block-polymers. Examples of this class of polymers are co- or block-polymers in which not all of the repeating subunits contain electronegative heteroatoms, e.g. a co- or block-polymer where the majority of repeating units are either free of electronegative heteroatoms or have any electronegative heteroatoms conjugated to aryl systems. An example of this class of polymer is poly(indene-co-coumarone). By low content of heteroatoms, it is meant that fewer than 1 in 50, and more preferably fewer than 1 in 100 of the atoms, are electronegative heteroatoms.

In a further aspect, the present invention provides film comprising (i) a polymer substantially lacking electronegative heteroatoms that are capable of hydrogen bonding with photogenerated acid and (ii) a photoacid generator that is capable of being photolysed to generate acid that is capable of directly removing the protecting group of linker molecules or oligonucleotide in photodirected synthesis of an oligonucleotide array on a solid substrate.

In a further aspect, the present invention provides composition comprising (i) a polymer substantially lacking electronegative heteroatoms that are capable of hydrogen bonding with photogenerated acid and (ii) a photoacid generator that is capable of photolysis to generate acid that is capable of directly removing the protecting group of linker molecules or oligonucleotide in photodirected synthesis of an oligonucleotide array on a solid substrate, the polymer and photoacid generator being dissolved in a solvent.

In a further aspect, the present invention provides the use of a film for the photodirected synthesis of an oligonucleotide on a solid substrate, the array comprising linker molecules or oligonucleotides attached to the substrate at a plurality of array elements, the linker molecules or oligonucleotides having protecting groups at their termini, wherein the film is formed from (i) a polymer substantially lacking electronegative heteroatoms that are capable of hydrogen bonding with photogenerated acid and (ii) a photoacid generator that on photolysis generates acid that is capable of directly removing the protecting group of the linker molecules or oligonucleotides.

In a further aspect, the present invention provides an apparatus for synthesizing an oligonucleotide array on a solid substrate by photodirected synthesis, the array having linker molecules or oligonucleotides attached to the substrate at a plurality of array elements, the linker molecules or oligonucleotides having acid-labile protecting groups capable of removal by photogenerated acid releasable from a photoacid generator, wherein the apparatus comprises a circuit of plurality of stations for carrying out a sequential set of treatments used in the production of the array, so that each lap of the circuit adds one monomer to deprotected sites on a substrate that are chemically available for monomer addition.

Conveniently, thin films of polymer lacking oxygen, nitrogen or halogen heteroatoms, for example poly(arylalkenes) such as polystyrene, can be cast on microscope slides by dip, flow, or spray-coating from a solution of the polymer in a low boiling point solvent such as dichloromethane. The film is formed on evaporation of the solvent. Spin-coating is not required, nor is pre-exposure baking to remove residual solvent. The dip-coating process is fast, and solid films are obtained in a few seconds without need for pre-illumination baking. The films can be removed by solvent with similar speed.

Even more simply, films can be made by allowing a solution of polymer and photoacid generator in a low boiling point solvent applied to a given area of glass or other planar transparent substrate to dry out. The resulting film may not be uniformly flat on its interface with air, but it is on its interface with the underlying substrate, through which the photolithographic beam can be focused, without distortion from film imperfections, on the substrate/film interface.

Another alternative to dip coating is to keep the array substrate in a constant position within a flow cell, to cover it with film casting solution, and then remove the solution by, for example, gravitational force, or displacement by gas pressure, to leave a residual film of solvent that is then dried by a gas flow to leave a solid film on the surface of the substrate. This flow cell arrangement can be configured as an accessory to a DNA synthesizer that handles the flow of reagent solutions and solvents.

The format of a transparent polymer film on glass slides enables detritylation to be monitored spectrophotometrically during and immediately after photolysis, thereby providing an option for monitoring stepwise synthetic yield.

Solid matrices of polystyrene or poly(α-methylstyrene) or their co-polymers provide a suitable host environment for inclusion of other compounds to enhance performance, for example, contrast enhancement reagents; low concentrations of buffers with $pK_a$ values above that desired in the film to protect against stray light; higher concentrations of buffers with $pK_a$ values similar to or slightly below that desired in the film to protect against depurination; or low pH indicators to sense intrafilm pH as part of an electronic feedback loop controlling the intrafilm pH by variation of the intensity of photolytic light.

The combination of high light sensitivity in a non-inhibitory polymer film, simplicity of film formation and its removal, and absence of heating steps has enabled us to design a bench-top automated apparatus for maskless photodirected oligonucleotide array synthesis to make full size (1024×768 pixels) high density oligonucleotide arrays on 10 microscope slides in parallel, with an option to double that number by beam splitting or addition of a second optical channel. The design principles of the apparatus allow for upgrades to 20 or 40 slides in parallel, each carrying one or two full size arrays.

The present invention is therefore particularly concerned with the identification of suitable organic polymers for use in forming the films of the invention that provide a solid diffusion-restricting environment for the photoacid-dependent oligonucleotide detritylation step in photodirected oligonucleotide array synthesis. As discussed above, the identification of suitable polymers has hitherto proved elusive, perhaps unsurprisingly so in view of the large and diverse range of available polymers. For instance, The Aldrich Chemical Company provides over 1,700 polymers and a similar number of reactive monomers. However, we provide the following general guidance to the skilled person seeking to select a polymer suitable for use in accordance with the present invention.

The first criterion for the polymers is that they should not contain oxygen, nitrogen or halogen heteroatoms. This avoids the problem of inadequate detritylation encountered in the prior art, which we have attributed to acid-weakening due to hydrogen bond formation between polymers containing electronegative heteroatoms and photoacid. Conveniently, the polymer is also capable of dissolving readily at room temperature in low boiling point solvents, such as dichloromethane, tetrahydrofuran or acetone. In some embodiments, this property is useful as it allows solid films of the polymer made by dip-coating or otherwise coating a solid surface, typically glass, from a polymer solution in a low boiling point solvent. Advantageously, the polymer is optically transparent, capable of forming films that are uniform, stable and adherent to the underlying substrate.

As the film must be removed during each cycle of synthesis to allow access of various reagents to the array, it is preferred that it is capable of being removed by a solvent wash. This helps in the automation of the method of synthesizing oligonucleotide arrays.

In addition to these properties, the films generally provide a suitable environment for incorporation of suitable photoacid generators, and other compounds with functions related to enhanced performance of the film. To this end, it is preferred that that the polymers do not contain either proton binding sites that could prevent the photoacid from achieving the required intra-film pH, or acidic groups that could themselves effect some degree of acid-dependent detritylation.

Conveniently, it is also desirable that the polymer is non-toxic, readily available and inexpensive.

In particularly preferred embodiments of the invention, application of these criteria means that poly(arylalkenes), for example polystyrenes and similar polymers, are preferred for use in the present invention.

The films formed from a photoacid generator and polymers that lack oxygen, nitrogen or halogen heteroatoms may have one or more further benefits making them suitable for use as matrices for photoacid generators for photodirected oligonucleotide array fabrication.

(1) Pre- or post-exposure baking is not required, neither is chemical amplification.
(2) The restricted choice of amplified acid that applies to chemical amplification does not apply, because there is no amplified acid.
(3) The intra-film pH level can be lowered to the required level by as little as 25% or even lower photolysis of the photoacid generator. By contrast the direct method of photodeprotection (Pease et al, 1994) requires 8-10 half-lives, so for comparable quantum yields and extinction coefficients at the photolytic wavelength the photoacid method has an intrinsic gain in light sensitivity of at least 16-20 fold.
(4) The structure of photoacid generators, and particularly substituted 2-nitrobenzyl esters, can be modified to obtain improved quantum yields, extinction coefficients and wavelengths of absorption maxima. This is less easily done with photosensitive protecting groups for oligonucleotide 5'- or 3'—OH groups, where different structures may result in increased photolysis down pathways that do not lead to deprotection.
(5) These gains in light sensitivity, realized in practice with selected substituted 2-nitrobenzyl esters of trichloroacetic acid, enable protocols for photodirected array fabrication to be designed as parallel or quasi-parallel modes that increase throughput by an order of magnitude or more.
(6) The photoacid generator is not required to be film-forming in its own right, as would be the case where the drawbacks of a less suitable polymer are negated simply by omitting the polymer altogether.
(7) Lastly, the excellent optical properties of the films of preferred polymers and their ability to act as a solid solvent for other useful molecules enable the photodirected detritylation process to be enhanced in various ways: e.g. contrast enhancement, trityl-monitoring and control of intra-film pH.

For convenient reference, we show below the structures of (a) PMMA (b) poly(styrene) and (c) poly(α-methylstyrene). Their main chain units differ by only the presence or absence of a methyl group.

There are two atoms of oxygen per monomeric unit of PMMA. In a solid film of PMMA containing 10% by weight of photoacid of molecular weight 500, the molar ratio of polymer oxygen to photoacid at say 25% photolysis is c.360. It is zero in polystyrene films at any acid concentration.

(a) poly(methylmethacrylate) (b) poly(styrene) (c) poly(α-methylstyrene)

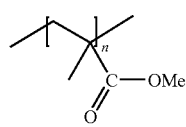

(a)

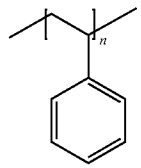

(b)

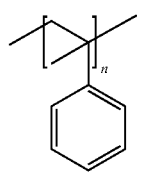

(c)

The diffraction of light limits photolithographic resolution using contact masks or projection to about 0.5 of a wavelength. This is not the case with scanning near field optical methods, in which an incident beam is transmitted by a waveguide that tapers to a tip of diameter 20 nm or so and is held at a similar distance from, and scanned over, the solid surface that is to be illuminated (Sun & Leggett, 2004). This approach yields resolution of less than 50 nm, which in array terms corresponds to at least $10^6$ features on an area 0.1×0.1 mm. This approach is not practical for photoresist-based technologies, because a 20-40 nm thick film of photoresist is so thin that it no longer functions as an effective barrier. This is not a limitation for thin films used to generate photoacid that then reacts with a monolayer on the surface: they do not have a resist function, and can be say 20-40 nm thick.

However, translational diffusion becomes problematical at these sub-micron distances. An even weakly volatile photoacid such a trichloroacetic would be useless. Non-volatile photoacids such as perfluoro-octanoic or mesitylene-sulphonic acid could be used to esterify substituted 2-nitrobenzyl alcohols. An alternative would be to use the polymer itself as the photoacid, as Hanson et al (1992) did for a chemically amplified polystyrene-based photoresist. For example, the poly(4-styrene-sulphonate) ester of a substituted 2-nitrobenzyl alcohol would release poly(4-styrenesulphonic acid) on photolysis. The acid cannot diffuse. Protons might, but their diffusion is restricted electrostatically by the immobile poly (4-styrene-sulphonate) anion. Films could be composed of the photoacid generating polymer by itself, or mixed with an unmodified polymer such as poly(styrene), or as a co-polymer of the two.

Thus, we have determined the reasons why the use of desirable photoacids of modest strength such as alkylsulphonic or trichloroacetic acid for removal of acid-labile dimethoxytrityl groups from the oligonucleotide-5'—OH position fails when carried out in diffusion-restricting solid films of polymers such as poly(methylmethacrylate). This failure is due to inappropriate choice of polymers that because of their structure are able to increase the $pK_a$ of the acids. Modest strength acids thereby become weak acids, unable to effect adequate removal of acid-labile dimethoxytrityl groups from the oligonucleotide-5'—OH position. This failure has been an obstacle to the successful transfer of high-throughput low-cost photolithographic fabrication methods from the semiconductor industry to the fabrication of oligonucleotide arrays (Wallraff et al, 1997).

Knowing the cause of the failure we have invented two methods of overcoming it. The first exploits the ability of photoacid generators such as esters of substituted 2-nitrobenzyl alcohol to form solid films in the absence of added polymer. The second uses polymers of more appropriate structure, with low or zero electronegative heteroatom content and unable to have significant impact through hydrogen bonding on the $pK_a$ values of the photoacids, thereby allowing satisfactory removal of dimethoxytrityl groups from oligonucleotides. A preferred class of these polymers are those that do not contain nitrogen, oxygen or halogen heteroatoms and which comprise aryl groups. Photoacid-induced oligonucleotide detritylation occurs at room temperature, typically 20-25° C. Heating to 90-100° C. as used in earlier attempts with unsuitable polymers (Wallraff et al, 1997) or alternative chemical amplification methods (Beecher et al, 1997, 2000) is not required.

Non-ionic photoacid generators based on the esters of substituted 2-nitrobenzyl alcohols are readily soluble in low boiling point organic solvents such as dichloromethane (b.p. 40° C.), as are polymers of appropriate structure such as poly (styrene), poly(α-methylstyrene) or their co- or block-polymers. We have therefore exploited these properties to design novel apparatus that can automate all steps of the photoacid-dependent fabrication of oligonucleotide arrays, including casting and post-illumination removal of solid films of photoacid generator, with or without polymer. The high-light sensitivity of our methods permits parallel synthesis of multiple arrays.

Furthermore, the physical properties of the solid films made from photoacid generators with or without added polymers, combined with instrumentation that we developed for analyzing the photolysis of photoacid generators, intra-film pH changes and release of dimethoxytrityl groups from oligonucleotides in thin solid films, enabled us to develop three novel methods of process control for photodirected synthesis of oligonucleotide arrays.

Lastly, we have extended the range of esters of substituted 2-nitrobenzyl alcohols to provide novel compounds that are potentially useful in the photodirected oligonucleotide array fabrication using our approach. These new acids include some that are non-volatile and will have lower diffusion coefficients than their volatile counterparts. We have also designed photoacid generators that are esters of an acidic polystyrene polymer and substituted 2-nitrobenzyl alcohols. The photoacid from such compounds is a polymer with an extremely low diffusion coefficient, and is suitable for photodirected synthesis of oligonucleotide nanoarrays using near field optical methods and photoacid generation.

In a further alternative or additional aspect, the present invention is broadly concerned with methods of synthesizing oligomer arrays that employ a reagent for removing in a reversible reaction protecting groups at elements of the array where monomer units are to be added. Preferred applications of the present invention are in the synthesis of oligonucleotide arrays and/or where the reagent for removing the protecting groups is generated by photolysis of a precursor. In preferred methods, photogenerated acid is used to remove acid labile protecting groups, such as a dimethoxytrityl (DMT) or similar protecting groups, which are used to protect the 3'- or 5'—OH positions of linker molecules or oligonucleotides immobilized at elements of the array.

Accordingly, in this aspect, the present invention provides a method of synthesizing an oligomer array on a solid substrate, the array comprising linker molecules or oligomer molecules attached to the substrate at a plurality of array elements, the linker molecules or oligomer molecules having protecting groups to make them unreactive to a chain extension reaction with a monomer, wherein the method comprises:

(a) providing in contact with the array a film that restricts diffusion of reactants and products on the substrate during synthesis of the array, wherein the film includes a precursor of a reagent that is capable of removing the protecting groups of the linker or oligomer molecules;

(b) generating the reagent that is capable of removing the protecting groups of the linker or oligomer molecules from the precursor at one or more of the array elements chosen for the chain extension reaction with a monomer;

(c) removing the protecting groups in a reversible reaction at the one or more of the array elements to produce reactive array elements at which the linker or oligomer molecules are capable of undergoing a chain extension reaction with a monomer, and one or more products of the deprotection reaction; and (d) coupling a monomer to the linker or oligomer molecules at one or more of the reactive array elements;

wherein the method further comprises removing one or more products of the deprotection reaction from the reactive array elements at which they are produced during the deprotection reaction to displace this reaction towards completion.

Accordingly, the present invention addresses some of the problems that occur when the reversible removal of protecting groups by reagents, such as photogenerated acid, takes place within the diffusion-restricting environment of a solid film used to overlay the substrate on which the oligomer array. Such films provide a useful way for delivering the precursor of the deprotecting reagent to the surface of the array and for controlling which elements of the array are made reactive to chain extension by monomer units in a given cycle of array synthesis by selectively generating the deprotecting reagent from the precursor in the film at those elements of the array. However, the present inventors realized that because the deprotection reactions are typically reversible, and the products of the reaction are trapped by the film at their site of formation because the films tend to restrict diffusion, this makes it difficult for the reaction to achieve the required high levels of completion (e.g. ≧98%) unless a brute force approach of very high concentration of deprotection reagent, typically photogenerated acid, is used. Accordingly, the present invention concerns ways of addressing this problem by providing means for removing one or more of the unwanted products of the deprotection reaction from the reactive array elements at which they are produced during the deprotection reaction. This in turn displaces the deprotection reaction towards completion, and so makes it possible to achieve the high reaction yields necessary for array synthesis. Preferably, the approaches described herein also help to avoid the need to resort to undesirable reaction conditions described above, that typically lead to undesirable reactions such as depurination.

A further benefit of the invention is that the light sensitivity for the photodirected step may be improved. This results from the ability of relatively low photoacid concentrations to effect complete deprotection of oligonucleotides when the reaction is made effectively irreversible by removal of the acid-released protecting group. The practical benefits of improved light sensitivity for photodirected fabrication of arrays include higher throughput and lower cost.

The present invention provides three different methods for removing unwanted reaction products from their site of formation, thereby improving the yield of the wanted product(s) of the deprotection reaction. Each method may be used alone or in combination with one or both of the others, or in conjunction with other embodiments of the invention falling within the scope of the claims. In each method the present invention is particularly concerned with synthesis of arrays that at some stage have the format shown in FIG. 11b and 11c. In this format, the oligomer molecules (or before the first cycle of synthesis the linker molecules alone) are tethered by linker molecules to the surface of a supporting substrate, such as a glass slide. The linker molecules or oligomer molecules are protected to make them unreactive to a chain extension reaction with monomer units. In each cycle of synthesis, a film comprising a precursor of the reagent for removing the protecting groups is provided on the surface of the substrate and the deprotecting reagent is generated at elements of the array selected for the chain extension reaction. Preferred examples of the reagents for removing the protecting groups include photoacid generators such as substituted 2-nitrobenzyl esters, for example of the type disclosed in WO 03/000644.

The first method involves increasing the diffusion coefficients of low molecular weight compounds (e.g. m.w.=100-1000) within the film to accelerate diffusional movement of unwanted products of the deprotection reaction away from reaction sites, while unreacted deprotecting reagent is enabled to diffuse towards those sites. The wanted product, for example oligonucleotide deprotected at its 3'- or 5'-hydroxy function, is unable to diffuse because it is covalently attached to the substrate.

By way of explanation, if the X and Y axes define the plane of a film laid down on the surface of a generally planar substrate on which the array is synthesized and the film is formed, then the thickness of the film extends along a Z axis normal to the X and Y axes. The Z-axis provides the most effective diffusional path for removal of unwanted products from the deprotection reaction at the underlying surface, because it is equally accessible to all parts of the array elements. In an isotropic medium such as a polymer film the diffusion coefficients of a given molecule are the same in all three axes. It is necessary that diffusion of reactants and/or products in the X-Y plane of the film, and in particular the deprotecting reagent, do not degrade photolithographic resolution of array elements. For elements that are 10×10 µm square, the upper limit for X-Y diffusion pathways can be set at 0.5 µm. More generally, X-Y diffusion pathways should not exceed 5% of the diameter of circular array elements or 5% of the shorter side of rectangular elements. Because the mean diffusional pathway length of molecules is proportional to the square root of the time spent diffusing, it is possible to have significant diffusion in a given time over a shorter distance (e.g. $\leq$100 nm) with only insignificant diffusion over longer distances (e.g. $\geq$500 nm).

The film thickness provides a volume into which unwanted reaction products can diffuse from the underlying substrate. If it is too thin, say <50-100 nm, diffusion will slow down prematurely as the Z-axis concentration gradient of the diffusing species falls. There is no upper limit to film thickness unless set by other criteria such a light absorption or reagent cost.

Thus, a preferred embodiment of this approach involves increasing the intrafilm diffusion coefficients of one or more of the products released by the deprotection reaction, for example DMT$^+$ cation produced by detritylation of oligonucleotides at the substrate surface. In parallel, the rate at which a reagent, such as H$^+$ or HA, utilised by the reaction at the substrate surface can be replaced from the overlying film is also increased, thereby helping to drive the deprotection reaction towards completion.

Methods of increasing the diffusion coefficients of low molecular weight (100-1000) in polymer films are in general non-specific, applying to all molecules of that size range, and have only weak dependence on molecular weight. The methods include (a) increasing the concentration of residual solvent in the film, thereby allowing chemical species within the film to diffuse more freely, and/or (b) incorporating plasticizers in the solid film and/or (c) increasing the temperature of the film; and/or (d) selecting a film formed from a polymer with higher internal diffusion rates, such as polymers with a high content of poorly packing polymer side chains as shown by lowered glass transition temperatures.

The second method is also based on decreasing the intrafilm concentration of unwanted products of the deprotection reaction. It simply removes the overlying polymer film with solvent after one episode of deprotection and follows it with a second episode using fresh film. In the case of the synthesis of oligonucleotide arrays this can be achieved by removing the film of polymer and photoacid generator after a first photoacid-generating exposure to patterned light, and then creating a fresh film that receives a second photoacid-generating and identically patterned exposure before it too is removed.

The third method is based on chemically converting, with so-called scavenger molecules, the removed protecting groups into forms that do not significantly react back with the groups that they previously protected. Preferably this reaction between released protecting groups and scavenger is irreversible. For example, the detritylation step of oligonucleotide array fabrication may be carried out with the addition of carbocation scavenging agents such as pyrrole or triethylsilane in the solid photoacid generating film used to effect light-dependent detritylation. The irreversible reaction of DMT$^+$ and similar carbocations with the scavenging reagent pulls detritylation to completion. Reversible scavenging reagents such as primary alcohols may in principle also be used if their affinity for carbocations and/or their achievable intrafilm concentration are suitably in excess of those of deprotected oligonucleotide-3' or 5'-hydroxyl groups with which they compete for DMT$^+$. Irrespective of whether the scavenging reaction is irreversible or not, the reaction rate under achievable intrafilm conditions must be high to avoid unacceptable time penalties that both increase the exposure time to acid of array molecules that can be damaged by acid, and extend the overall fabrication time of completed oligonucleotide arrays from a few hours to many.

As set out above, while the methods of the present invention are applicable to the synthesis of different types of oligomer arrays, preferably the methods are applicable to the synthesis of peptide arrays, and more preferably oligonucleotide arrays. In a preferred embodiment, the present invention concerns the synthesis of oligonucleotide arrays in which the protecting groups are acid labile groups linked to the free 3'- or 5'-terminus of oligonucleotides or linker molecules, so that reactive array elements are produced by illuminating those elements of the array to photolyse a photoacid generator within the film to generate acid that is capable of directly removing the protecting group of the linker molecules or oligonucleotides. A preferred acid labile protecting group is a dimethoxytrityl (DMT) group that is capable of removal by the photogenerated acid.

Alternatively, oligonucleotides or linker groups in the array may be protected by groups that can be removed under different reaction conditions, for example alkali labile groups linked to the free 3' or 5' terminus of the oligonucleotides, and producing reactive array elements, and comprises illuminating elements of the array to photolyse a photoalkali generator within the film to generate alkali that is capable of directly or indirectly removing the protecting group of the linker molecules or oligonucleotides.

A related example is the use of peroxy anions to remove alkyl- or aryl-carbonates from oligonucleotide 5'- or 3'-groups (Dellinger et al, 2003. Sierzchala et al, 2004). The reaction is irreversible, so removal of unwanted reaction product(s) by diffusion or trapping is not required. But in a photodirected version using a photoalkali generator in a polymer film to provide the required conditions for peroxy anion formation at selected sites of an array surface, depletion by utilization of peroxy anion at the oligonucleotide layer could cause incomplete or unacceptably slow reaction rates. In which case, enhancement of translational diffusion within the film would provide a solution, enabling the peroxy anion concentration to be maintained in the oligonucleotide layer.

Embodiments of the present invention will now be described in more detail by way of example and not limitation with reference to the accompanying figures.

BRIEF DESCRIPTION OF THE FIGURES

FIG. 11. The spatial distribution of reactants and products of oligonucleotide detritylation in various media and formats.

DEFINITIONS

Figure 1:
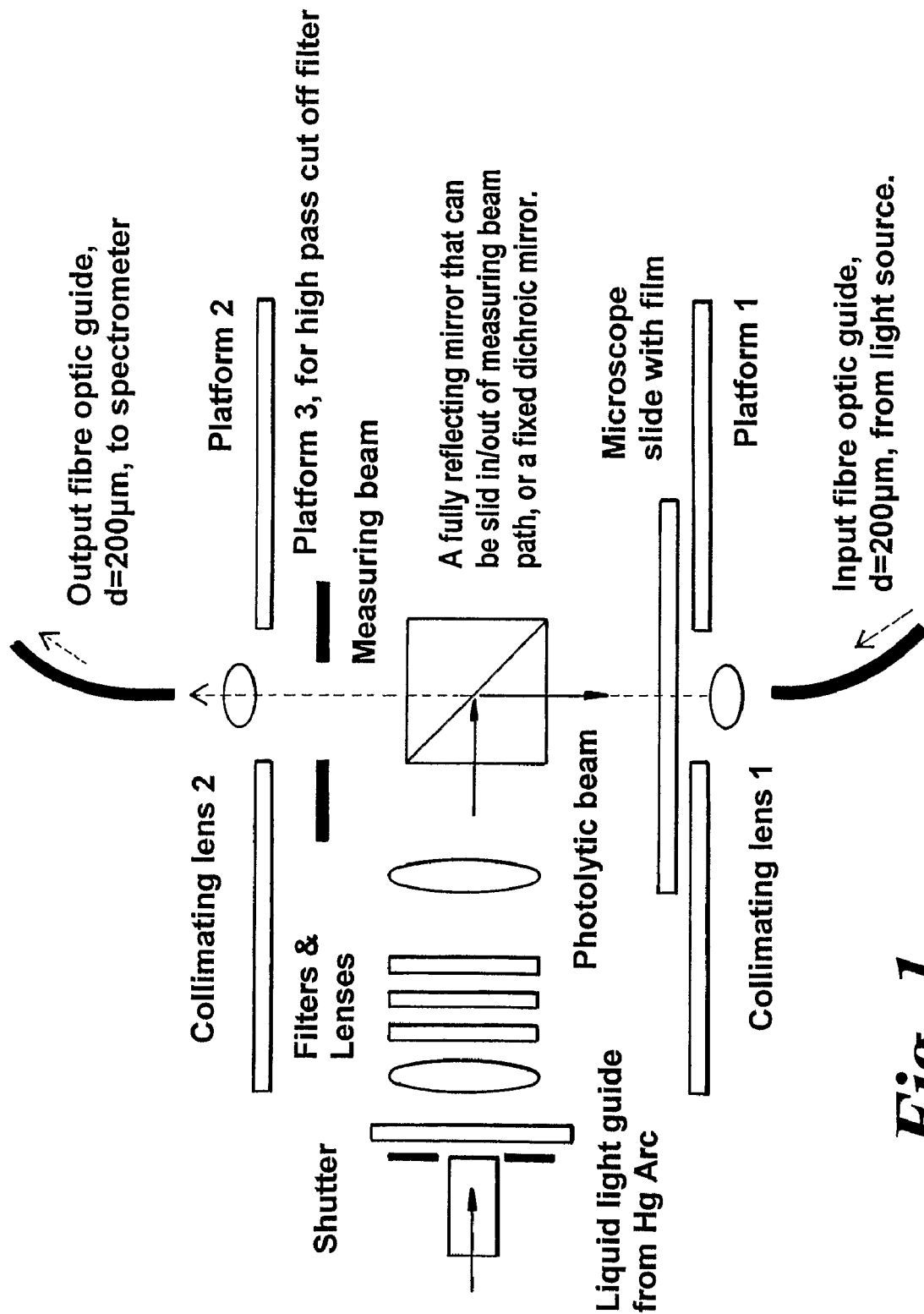
FIG. 1. A scheme illustrating the optical configuration and components of the UV-Visible range spectrophotometer constructed for measurements of thin films on glass microscope slides.

In the present invention, "array" means a group of molecules intentionally created and arranged on a substrate at a plurality of array elements. It is generally preferred that there is a substantially homogeneous population of molecules at each element of the array. The arrays described herein are oligomer arrays, and more preferably biopolymer arrays, that is they are formed from monomer units such as nucleotides or amino acids, or non natural variants thereof. The molecules present in the array may be prepared either synthetically or biosynthetically and may be identical or different from the molecules present at other elements of the array. There is a wide variety of substrates on which arrays may be laid down. Similarly, the geometry of the elements forming the array may be varied. However, for convenience, it is typical in the art to employ a substrate, typically formed from an inorganic material such as glass or a plastic material (e.g. nylon, polyethylene) resistant to the organic solvents used in reagent solutions, and on which the molecules at each element of the array can be laid down as a grid of squares, rectangles or circles. Preferably, substrates have rigid or semi-rigid surfaces and, although it is generally preferred that at least one surface of the substrate is substantially flat, it is known in the art to separate elements of the array by using surface features, such as ridges or grids or coatings.

The present invention is particularly concerned with oligomer arrays, and more especially oligonucleotide or peptide arrays. As is well known in the art, nucleic acid is a polymer or oligomer of pyrimidine (U, C, T), or purine (A, G) nucleotides. In the present invention, the terms "oligonucleotide" and "nucleic acid" are used interchangeably. Typically, the oligonucleotides synthesised on the substrate are at least 10 nucleotides in length, more preferably at least 20 or 25 nucleotides in length to provide satisfactory hybridization and discrimination when binding a target nucleic acid sequence. The oligonucleotides and nucleic acid molecules of the present invention may be formed from naturally occurring nucleotides, for example forming deoxyribonucleic acid (DNA) or ribonucleic acid (RNA) molecules. Alternatively, the naturally occurring oligonucleotides may include structural modifications to alter their properties, such as in peptide nucleic acids (PNA) or in locked nucleic acids (LNA). For example, the improved hybridization properties of these modified oligonucleotides can be used to reduce the length required for their use in arrays. The solid phase synthesis of oligonucleotides and nucleic acid molecules with naturally occurring or artificial bases is well known in the art. The arrays of oligonucleotides, formed from natural or artificial bases may be synthesised in either the 3'→5' or 5'→3' directions.

The present invention also pertains to peptide oligomer arrays formed from sequences of amino acids, or similar compounds, for example L-amino acids, D-amino acids, or synthetic amino acids.

As used herein, "monomer" refers to any member of a basic set for synthesis of a oligomer in the arrays described herein. For example, oligonucleotide arrays are produced from naturally occurring or artificial nucleotide bases, while peptide arrays are produced from naturally occurring or artificial amino acids.

As discussed above, the present invention is particularly directed to the synthesis of oligonucleotide arrays in which the photoacid released on photolysis of a photoacid generator is capable of directly removing a protecting group from the terminus of a linker or oligonucleotide being synthesised at one or more elements of the array. In the present invention, "direct removal" and grammatical equivalents thereof expressly excludes methods of synthesizing arrays in which the photogenerated acid does not directly react with the protecting group to any substantial extent and instead serves to catalyze the production of acid from another reagent, for example in the chemical amplification method, described in the introduction, the photogenerated acid catalyzes the thermolysis of an enhancer to thus produce the deprotecting acid. Under the preferred conditions described by Beecher et al (2000), less than 5%, and probably less than 1%, of the final pool of intra-film acid responsible for detritylation is derived from the photoacid generator. The remaining 95-99% comes from thermolysis of the enhancer.

DETAILED DESCRIPTION

Part 1

Polymer and Photoacid Generators

Choice and Synthesis of Photoacid Generators for Use in Solid Films There are two important considerations for the skilled person selecting or designing a photoacid generator, the choice of the acid and the choice of the photogenerator. Generally, it is preferred that the acid (i) generates and maintains a low intrafilm pH sufficient to drive the removal of a protecting group (e.g. oligonucleotide detritylation) to completion, (ii) does not generate an intrafilm pH that causes any substantial level of oligonucleotide depurination, (iii) does not diffuse in the film at rates sufficient to cause loss of resolution between neighboring array elements. In this latter context, typically a lateral diffusion coefficient of <100 nm$^2$ s$^{-1}$ would be compatible with a diffusion time of 50 s and 0.5 µm resolution.

On the other hand, from a practical point of view, the photoacid generator should preferably (i) be soluble in the solvent used to cast films, (ii) not undergo lateral phase segregation during formation of films from its solution with polymer and (iii) possess an adequate value for the product of its (quantum yield)×(extinction coefficient) in the solid state at an appropriate wavelength above c.320 nm. Lower wavelengths are not preferred as they can cause damage to oligonucleotide bases. Preferred wavelengths are historically 365, 405 and 436 nm to match major spectral bands of high pressure Hg arc lamps. Progress in design and manufacture of high power light emitting diodes (LEDs) has widened the range, although the photochemistry of most photoacid generators still retains the requirement for near UV-violet region. In addition, the photoacid generator should also preferably (iv) release acid by a mechanism that produces neither chemically reactive intermediates nor reactive final products that can damage oligonucleotides, (v) be stable at room temperature and (vi) ideally not form an insoluble photoproduct that resists subsequent removal from the array surface.

It is also preferred that photolysis of the photoacid generator proceeds by an intramolecular process, not requiring collision with other molecules. A particularly preferred class of photoacid generators are photolabile esters of substituted 2-nitrobenzyl alcohols with carboxylic acids or halocarboxylic acids. These provide acids with a strength suitable for use in oligonucleotide synthesis and provide a wide range of photoacid generators. By way of example, we have shown that two such esters with trichloroacetic acid can generate very high stepwise synthetic yields when used in solution for detritylation of linkers or oligonucleotides attached to a solid surface such as controlled porosity glass (Serafinowski & Garland, 2003).

We have found that some trichloroacetate and arylsulphonate esters of substituted 2-nitrobenzylalcohols are capable of forming stable, uniform and optically transparent films when used in solution without added polymer for dip-coating glass microscope slides. Illumination of these polymer-less films lowered the intrafilm pH to a level sensed by co-incorporated low-pH indicators, and achieved complete detritylation of DMT-T covalently attached to the film-coated glass.

However, while the use of polymer-less films of substituted 2-nitrobenzyl-esters provides a useful method for oligonucleotide array synthesis, in some circumstances, it does have drawbacks. The more hydrophobic esters made with aromatic substituents of the benzyl ring do not form films easily, whereas some halo-substituted 2-nitrobenzyl esters of high quantum yield form films but they remain tacky. Furthermore, the only possible proportion of photoacid generator in the film is 100%. We therefore investigated alternative films to attempt to solve these problems.

Without wishing to be bound by any particular theory or explanation, the problem of low detritylation met by Wallraff et al (1997) with weaker acids appears to lie with the polymer and not, as previously believed in the art, with the photoacid generator. Furthermore, as we describe below, polymers based on polystyrene do not exhibit the adverse effects of poly(methylmethacrylate) and instead provide an excellent solid matrix, in particular for non-ionic photoacid generators, such as substituted 2-nitrobenzyl esters.

In addition, we have continued to expand the range of 2-substituted 2-nitrobenzyl esters, of which we have already described a number. (Serafinowski & Garland, 2003). The general formula of the esters is given in Scheme 1.

Scheme 1: Structure of photoacid generators and precursor 2-nitrobenzylalcohols.

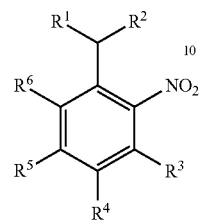

R$^1$=hydrogen, alkyl, substituted alkyl, aryl, substituted aryl, cyano, nitro.

R$^2$=hydroxyl, halogen, acetoxy or acyloxy group unsubstituted or substituted with one or more halogen atoms, alkyl- or substituted alkyl-sulphonyloxy group, aryl- or substituted aryl-sulphonyloxy group.

R$^3$=hydrogen, halogen, amino, substituted amino, alkoxy, substituted alkoxy, alkyl, substituted alkyl, alkene, substituted alkene, alkyne, substituted alkyne, aryl, substituted aryl, aryloxy, substituted aryloxy, heteroaryl, substituted heteroaryl, heteroaryloxy, substituted heteroaryloxy, nitro.

R$^4$=hydrogen, halogen, amino, substituted amino, alkoxy, substituted alkoxy, alkyl, substituted alkyl, alkene, substituted alkene, alkyne, substituted alkyne, aryl, substituted aryl, aryloxy, substituted aryloxy, heteroaryl, substituted heteroaryl, heteroaryloxy, substituted heteroaryloxy, nitro.

R$^5$=hydrogen, halogen, amino, substituted amino, alkoxy, substituted alkoxy, alkyl, substituted alkyl, alkene, substituted alkene, alkyne, substituted alkyne, aryl, substituted aryl, aryloxy, substituted aryloxy, heteroaryl, substituted heteroaryl, heteroaryloxy, substituted heteroaryloxy, nitro, phenyl substituted azo, acetamido, acylamido.

R$^6$=hydrogen, halogen, amino, substituted amino, alkoxy, substituted alkoxy, alkyl, substituted alkyl, alkene, substituted alkene, alkyne, substituted alkyne, aryl, substituted aryl, aryloxy, substituted aryloxy, heteroaryl, substituted heteroaryl, heteroaryloxy, substituted heteroaryloxy, nitro.

The esters additional to those that we have previously described (Serafinowski & Garland, 2005) are listed in Table 1.

TABLE 1

A list of new photoacid generators.

1. (3-(Dimethylamino)-2,6-dinitrophenyl)(phenyl)methyl-2,2,2-trichloroacetate
λmax 376 nm ε 10700

TABLE 1-continued

A list of new photoacid generators.

2. (3-(Diethylamino)-2,6-dinitrophenyl)(phenyl)methyl-2,2,2-trichloroacetate
   $\lambda$max 380 nm $\epsilon$ 8000
3. (2,6-Dinitro-3-pyrrolidin-1-yl)phenyl)(phenyl)methyl-2,2,2-trichloroacetate
   UV $\lambda$max 380 nm $\epsilon$ 14600
4. (2-Nitro-5-(pyrrolidin-1-yl)phenyl)(phenyl)methyl-2,2,2-trichloroacetate
   $\lambda$max = 403 nm $\epsilon$ 22700
5. (2,6-Dinitro-3-(piperidin-1-yl)phenyl)(phenyl)methyl-2,2,2-trichloroacetate
   $\lambda$max 380 nm $\epsilon$ 13120
6. (3-Morpholino-2,6-dinitrophenyl)(phenyl)methyl-2,2,2-trichloroacetate
   $\lambda$max 359 nm $\epsilon$ 6450
7. Trichloro-acetic acid-(2-nitro-5-phenylazo-phenyl)-phenyl-methyl ester
   $\lambda$max = 335 nm $\epsilon$ 24000; $\lambda$max = 454 nm $\epsilon$ 1000
8. Acetic acid-(2-nitro-5-phenylazo)-benzylester
   $\lambda$max = 323 nm $\epsilon$ 14230 $\lambda$max = 431 nm $\epsilon$ 1970
9. 5-Acetamido-2-nitrobenzyl-acetate
   $\lambda$max = 355 nm $\epsilon$ 5340
10. 5-Amino-2-nitrobenzyl-acetate
    $\lambda$max = 396 nm $\epsilon$ 5711
11. (3-Amino-2,6-dinitrophenyl)(phenyl)methyl-acetate
    $\lambda$max = 328 nm $\epsilon$ 9200
12. (5-Bromo-2-nitrophenyl)(phenyl)methyl-2,2,2-trichloroacetate
    $\lambda$max 276 nm $\epsilon$ 6600
13. 3-Bromo-2,6-dinitrophenyl)(phenyl)methyl-2,2,2-trichloroacetate
    $\lambda$max 255 nm $\epsilon$ 8900
14. (5-Chloro-2-nitrophenyl)(phenyl)methyl-2,2,2-trichloroacetate
    $\lambda$max 270 nm $\epsilon$ 6200
15. (3-Chloro-2,6-dinitrophenyl)(phenyl)methyl-2,2,2-trichloroacetate
    $\lambda$max 256 $\epsilon$ 7500
16. (3-Fluoro-2,6-dinitrophenyl)(phenyl)methyl-2,2,2-trichloroacetate
    $\lambda$max 232 nm $\epsilon$ 15600
17. (5-Iodo-2-nitrophenyl)(phenyl)methyl-2,2,2-trichloroacetate
    $\lambda$ 296 nm $\epsilon$ 6500
18. (2,6-Dinitro-3-(phenylamino)phenyl)(phenyl)methyl-2,2,2-trichloroacetate
    $\lambda_{max}$ 363 nm $\epsilon$ 6600
19. (3-(4-Methoxyphenylamino)-2,6-dinitrophenyl)(phenyl)methyl-2,2,2-trichloroacetate
    $\lambda_{max}$ 370 nm $\epsilon$ 8200
20. (2,6-Dinitro-3-(phenyl)phenyl)(phenyl)methyl-2,2,2-trichloroacetate
    $\lambda_{max}$ 280 nm $\epsilon$ 7600
21. (2,6-Dinitro-3-(4-N,N-dimethylaminophenyl)phenyl)(phenyl)methyl-2,2,2-trichloroacetate
    $\lambda_{max}$ 410 nm $\epsilon$ 7100
22. (2,6-Dinitro-3-(4-methoxyphenyl)phenyl)(phenyl)methyl-2,2,2-trichloroacetate
    $\lambda_{max}$ 324 nm $\epsilon$ 4430
23. (2,6-Dinitro-3-(3,4-dimethoxyphenyl)phenyl)(phenyl)methyl-2,2,2-trichloroacetate
    $\lambda_{max}$ 343 nm $\epsilon$ 4750
24. (4-Methoxy-2,6-dinitrophenyl)(phenyl)methyl-2,2,2-trichloroacetate
    $\lambda_{shoulder}$ 314 nm $\epsilon$ 3176
25. (4-Methoxy-2-nitrophenyl)(phenyl)methyl-2,2,2-trichloroacetate
    $\lambda_{max}$ 329 nm $\epsilon$ 2750
26. 4,5-Dimethoxy-2-nitrophenyl(methyl)tosylate
    $\lambda_{max}$ 347 nm $\epsilon$ 6800

The Table reveals a wide range of structures and a corresponding wide range of wavelengths for the main absorption bands and their extinction coefficients. All of these esters are non-ionic and dissolve in dichloromethane. Quantum yields range from <0.01 to nearly 1.0.

Spectrophotometric Measurements on Thin Films.

We wished to have a better understanding of how a polymer such as poly(methylmethacrylate) could prevent photogenerated halo-acetic acids from effecting oligonucleotide detritylation. To this end we designed sensitive spectrophotometric methods to measure, in thin films on glass slides, photogeneration of acid, intra-film pH changes and acid dependent detritylation of either surface-attached or incorporated DMT-oligonucleotides in a polymer film.

The optical layout of the apparatus is shown in FIG. 1. It shows a vertical section containing the optical axes of both the measuring and photolytic light beams. The apparatus was assembled with fiber-optic spectrometer components from Avantes (www.Avantes.com) plus Microbench components, lenses and filters from Linos Photonics (www.Linos.com). There are two light beams. One, entering at the foot of the figure, is the analytical beam, conducted by an input fiber from a UV-Visible light source. It enters from below through a collimating lens and Platform 1, traverses the microscope slide and film, and passes to the output fiber at Platform 2 and thence to a 2,048-pixel CCD spectrometer (Avantes S2000, range 250-850 nm). The signal output from the spectrometer goes to a personal computer via a 12-bit A-D converter. For higher signal/noise ratios the S2000 spectrometer was replaced with a 1,024-pixel photodiode deep well spectrometer (Avantes DW1024, range 350-850 nm).

The other beam, entering at the left of the figure, is for photolysis. It originates from a high pressure Hg arc lamp (100 W Linos LQ-UV 1000 or 150 W Hamamatsu LC5), proceeds through a flexible light guide, enters the spectrometer on a horizontal axis, passes through an optional shutter, a collimating lens, a heat absorbing filter, an interference filter (usually 365 or 405 nm) and a second lens, and is then reflected by a 45° moveable mirror to project a diffuse circular area of illumination on the microscope slide resting on a Platform 1. The photolytic and measuring beams, diameters 10-20 mm and 2-3 mm respectively, are coaxial at the slide. The mirror can be slid in or out of the measuring beam axis to allow photolysis or measurement. If the mirror is in the position shown then it reflects the photolytic beam to the microscope slide and simultaneously closes off the light path to the spectrometer. Alternatively a dichroic mirror (Omega Optical Inc. www.omegafilters.com) may be used to reflect the photolytic beam in place of the 45° mirror, in which case a high pass cut-off filter is inserted at Platform 2 to allow passage of the measuring beam but not light reflected from the photolytic beam. The power of the photolytic beam was measured with the detection head of a joulemeter (Melles Griot model 13PEM001) in place of the analytical input-collimating lens in Platform 1. The system was operated with the manufacturer's software (Avantes SW5FULL).

Observations on the Effects of Poly(Methylmethacrylate) on Photoacid Function.

Figure 2A:
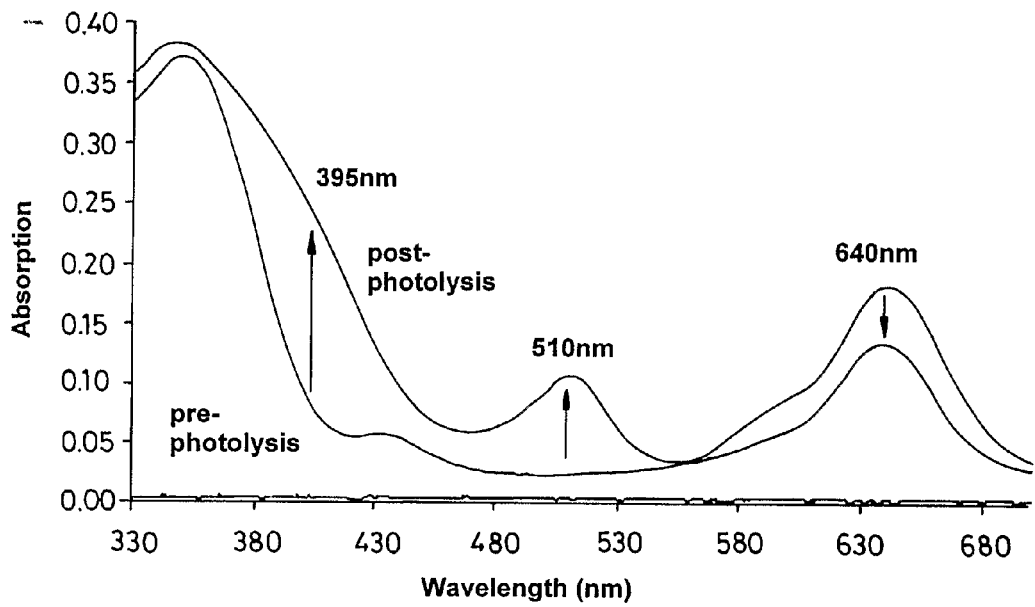
FIG. 2. Panel (a) Absorption spectra of a solid film of α-phenyl-4,5-dimethoxy-2-nitrobenzyl trichloroacetate (Ester 1) containing Brilliant Green and 5'-O-dimethoxy-tritylthymidine, before and after partial photolysis at 365 nm. Prior to photolysis the peak at 350 nm is due to Ester 1, and that at 640 nm to BG (unprotonated). Photolysis causes appearance of a shoulder around 395 nm due to formation of substituted 2-nitrosobenzophenone, a new peak at 510 nm due to DMT+ release from DMT-T, and a decrease of the peak at 640 nm due to protonation of BG. Panel (b) Effects of PMMA on intrafilm acidification. Experiments with films were carried out as above to collect a series of absorption spectra at increasing illumination energies (365 nm), but using Ester 2 in place of Ester 1. The 640 nm response of Brilliant Green to photoacid arising from increasing illumination is shown for a ratio of PMMA:Ester 2 in the casting fluid of either 1:1 (-◇-) or 2:1 (-○-), or zero (-□-). The dependence of the extent of photolysis on incident energy was measured by appearance of the 375-385 nm peak (-▲-) of the substituted 2-nitrosobenzophenone formed on photolysis of the ester: its rate of formation was unaffected by PMMA FIG. 3. Panel (a) Titration of indicators in solution. Panel (b) Photolysis of a film of Ester 2. Panel (c) Photolysis of a film of Ester 2 containing PMMA. Panel (d) Photolithographic patterns of acidification of a solid film of Ester 2 containing Brilliant Green. (The dark spots are particulate material due to non-filtered reagents and/or air-borne dust in an open laboratory).
Figure 2B:
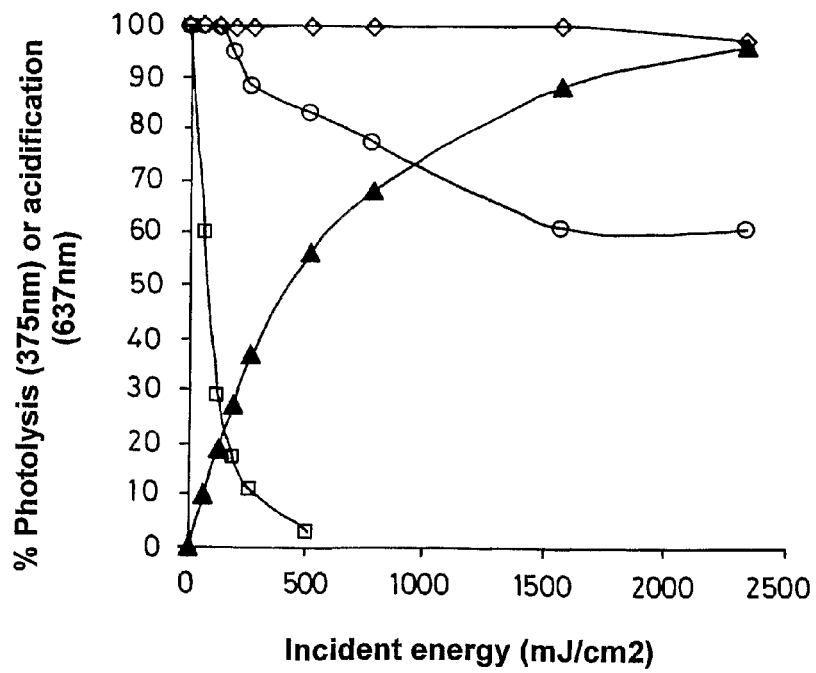

Spectrophotometric measurements of photoacid production, pH change and detritylation of DMT-thymidine in a solid thin film of Ester 1 that also contained the low-pH indicator Brilliant Green (pK c.1.0 in aqueous media) are shown in FIG. 2, panel (a). Photoacid production is equated to formation of the other product of photolysis, the substituted 2-nitrosobenzophenone, identified by increased absorption in the 350-430 nm region. Falls of intrafilm pH are identified by reduction in the Brilliant Green peak at 640 nm. Detritylation is identified by the increased absorption at 510 nm due to formation of the trityl cation DMT$^+$. All three of these changes are seen in the figure, which shows the absorption spectrum of the film before and after illumination at 365 nm.

If poly(methylmethacrylate) was also incorporated in the film at a polymer/ester ratio (wt/wt) of 2:1, photolysis of the ester proceeded as before but there was neither acidification sensed by Brilliant Green nor appearance of trityl cation. It appears that the polymer inhibited dissociation of the photogenerated trichloroacetic acid. An alternative interpretation based on proton binding by basic groups on the polymer might apply in the case of nitrogen containing polymers, but not polyacrylates, polyesters, polyethers, polysulphones or polyvinylchloride. Panel (b) of FIG. 2 shows the inhibitory effect of PMMA on the ability of Ester 2 to increase intrafilm acidity in response to photoaoacid generation.

Figure 3D:
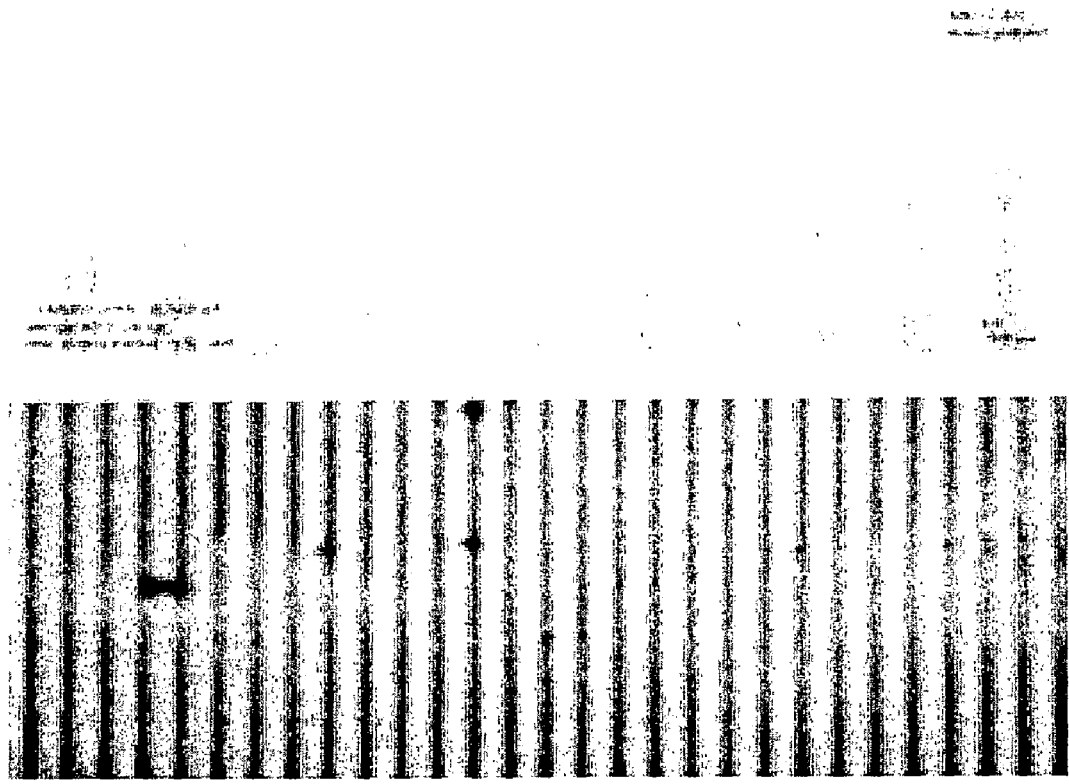

The effect of poly(methylmethacrylate) on the dissociation of trichloroacetic acid can also be shown in dichloromethane (DCM) solution, with an alternative photoacid generator (Ester 2) and an additional pH indicator (4-phenylazoaniline, pK c.2.5-3.5) to extend the range of response to lower proton concentrations (FIG. 3). In each panel of the figure the response of Brilliant Green (BG) is shown by the lines commencing at the head of the graph, and of 4-phenylazoaniline (Ph-A) at the foot. Panel (a) shows the spectrophotometric response of a solution of BG and Ph-A in DCM to additions of trichloroacetic acid (TCA). Small additions of 1M or 3M TCA in DCM were made to 2.5 ml of DCM containing 60 µM Ph-A and 13 µM BG in a spectrophotometer cuvette. The absorption spectrum was recorded after each addition, and used to construct the graph. Absorption values have been normalized by reference to the maximum values of the peaks at 500 nm (conjugate base of Ph-A) and 640 nm (BG base). Panel (b) shows the response to illumination of a polymerless film on glass of Ester 2 incorporating BG and Ph-A, with respective area densities if 105, 1.2 and 3 nmole/cm$^2$. Illumination at 365 nm (10 mW/cm$^2$) was via a dichroic filter. Absorption spectra from 420 to 750 nm were periodically recorded during photolysis and used to construct the graphs using absorption values at 510 and 640 nm. Panel (c) shows the effects of including PMMA in the films at an Ester/PMMA ratio (wt/wt) of 1:1 (■) or 2:1 (▲). These results with Ester 2 and an additional pH indicator to extend the sensitivity range confirm those described for Ester 1. The experimental methods provide a fast means for screening different polymers for their effect on acid dissociation and detritylation.

Panel (d) shows patterned acidification of an Ester 2 film. The film was made by dip coating a 25×6 mm piece of glass slide with a solution of 2% (w/v) Ester 2 (c.40 mM) and 5 mM Brilliant Green and allowing it to dry. Film was removed from one surface. The remaining film was illuminated with 365 nm light for 20 s through a contacted Ronchi ruling of 20 lines/mm (upper panel) or 50 lines/mm (lower panel) at an incident power of 20 mW/cm$^2$. The film was then examined by transmitted white light with an Olympus MIC-D digital microscope. The paler and darker bands shown in the image correspond to acidified and non-acidified zones respectively. These images demonstrate that (i) such slow lateral diffusion of trichloroacetic acid as may have occurred over a period of many minutes did not degrade photolithographic resolution at this level, and (ii) feature sizes of 10 µm or less can be obtained.

The most likely cause for the observed inhibition of photoacid dissociation is hydrogen bonding of the carboxylic acid hydrogen to the oxygen atom(s) of poly(methylmethacrylate), as in the scheme below, where item 1 shows acid dissociation, item 2 shows an acid homodimer formed by hydrogen bonds, and item 3 is of the undissociated acid bound by a hydrogen bond to a carbonyl oxygen of a polymer. Similar considerations apply to sulphonic acids, where the hydrogen of the sulphonic —OH can form hydrogen bonds with small electronegative heteroatoms within organic polymers.

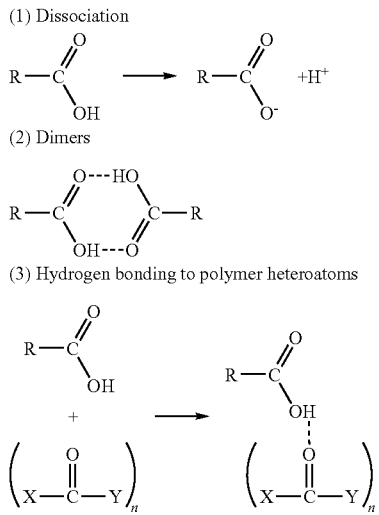

Other Polymers

In view of our explanation for the effects of polymethacrylates, other polymers lacking electronegative heteroatoms such as oxygen, nitrogen or halogen and therefore unable to participate in hydrogen bonding would not inhibit carboxylic acid dissociation. Polystyrene has the necessary film-forming and optical properties to act as a solid matrix for photoacid generation, and it has no heteroatoms. We tested polystyrene and related polymers both in solution and in solid films. Unlike poly(methylmethacrylate), polystyrene and related polymers did not increase the apparent pK$_a$ of trichloroacetic acid in dichloromethane solution. In films of either Ester 1 or 2 at polymer/ester ratios varying from 1:1 to 16:1 (wt/wt) photolysis caused the intrafilm pH to fall to levels that resulted in rapid detritylation of DMT-T either incorporated in the film or covalently attached to the underlying glass.

Experimental data for photolysis of the photoacid generators Ester 1 and Ester 2, and the associated intra-film pH changes as sensed by Brilliant Green and detritylation of incorporated or surface attached DMT-T within films of polystyrene, poly(α-methylstyrene) and their co-polymer were very similar to those observed with films of Ester 1 or 2 in the absence of any added polymer. There was however at least one major difference: the changes of intrafilm pH and associated detritylation obtained with 100% Ester 1 or 2 in a polymer-less film were obtained with as little as 11% of the ester within the polystyrene based films without loss of light sensitivity.

Our observations on poly(arylalkene) polymers are in keeping with the conclusion that hydrogen bonding of carboxylic acid to poly(methylmethacrylate) is responsible for the inhibitory effect of the latter polymer on carboxylic acid dissociation. It was of interest to determine the strength of the relationship between absence of hydrogen-bonding heteroatoms and absence of inhibition of carboxylic photoacid acid dissociation, and so we examined a larger range of polymers. We excluded from experimental test those polymers that would be insoluble through cross-linking, polymers containing acidic or basic groups, polymers such as rubbers or elastomers that would not form solid films, and, with a few useful exceptions, co-polymers or block-polymers on the grounds that it was preferable to identify the performance of homopolymers before complicating matters with heteropolymers.

As a preliminary we tested forty-six different polymers for their ability to dissolve in the low boiling point solvents dichloromethane, acetone or tetrahydrofuran as a pre-condition of film-making without requirement for spin-coating or pre-illumination baking. Polymers that failed to dissolve included:
- polyethylene or (—CH$_2$CH$_2$—)$_n$
- polypropylene or (—CH$_2$CH(CH$_3$)—)$_n$
- poly(acrylonitrile) or (—CH$_2$CH(CN)—)$_n$
- poly(oxymethylene), acetate end-capped or CH$_3$CO$_2$(CH$_2$O)$_n$COCH$_3$
- poly(phenysulphone) or (—C$_6$H$_4$-4—SO$_2$C$_6$H$_4$-4—OC$_6$H$_4$-4—O—)$_n$
- poly(1,4-phenylenesulphide) or (—C$_6$H$_4$-4—S—)$_n$
- poly(4-methyl-1-pentene) or (—CH$_2$CH[(CH$_2$CH(CH$_3$)$_2$]—)$_n$
- Poly(ethylene-co-vinylacetate) or (—CH$_2$—CH$_2$—)$_x$)[—CH$_2$CH(O$_2$CCH$_3$)—]$_y$, where the content of vinylacetate was 9, 18 or 33% by weight.

Polyethylene is well known to be insoluble in many organic solvents at room temperature, as is polypropylene unless it is the atactic (amorphous) low density form. Of several solvents tried, only tetrahydrofuran had any obvious effect on amorphous polypropylene, causing it to slowly swell and disintegrate. The supernatant contained dissolved material which, when spread on glass slides and dried, gave only a particulate and light-scattering deposit, not a clear film. We concluded that unsubstituted poly(alkenes) are not strong candidates to be cast from solution as films for use as matrices for photolithographic generation of photoacids, despite the claims by Xu and Goldberg (2004) in the context of chemical amplification.

Having narrowed the field by application of the above criteria and solubility testing, we examined the remainder. In each case, we made a film by spreading and allowing to dry 10-15 μL of a solution containing 2% (wt/v) polymer, 0.3% or 6.3 mM Ester 2, 0.2 mM Brilliant Green and 0.2 mM DMT-T nucleotide on a 12-15 mm diameter well that was defined by a thin surrounding layer of Teflon on a glass microscope slide. The solvent was tetrahydrofuran for polyvinylchloride and dichloromethane for the rest. This method of making a film for screening is more economical with reagents than is dip-coating. Absorption spectra of the films were measured from 300 to 750 nm before and after 30 sec exposure to 365 nm irradiation at 50 mW/cm$^2$.

This exposure and intensity equated to at least 5 photolytic half lives or 98% photolysis. All of these compounds made satisfactory films, with the exception of polyethylene oxide which gave a slightly hazed film. The accuracy and repeatability of these assays as conducted was about 5-15%, quite sufficient for a screening procedure. The concentration of photoacid generator used was relatively low and chosen to give discrimination between differently performing polymers. Further discrimination could be obtained by choosing a lower degree of photolysis, either with shorter exposures or lower intensities of illumination.

The results of the screening tests for 26 polymers are shown in Table 2. The polymers (including sucrose benzoate because of its excellent film forming properties) fell into four classes.

Those that supported a 70% or greater photoacid-induced fall in the 640 nm peak of Brilliant Green, and an associated greater than 90% detritylation of DMT-T nucleotide. They were poly(styrene), poly(α-methylstyrene), their co-polymer, poly(4-methylstyrene) a co-polymer of 3- and 4-chlorostyrene, poly(acenaphthalene), poly(carbomethylsilane) and poly(indene-co-comarone). Although the last of this set contained oxygen, the ratio of oxygen to carbon atoms of c.0.006 was low and unlikely to have significant effect on the pK$_a$ of photo-generated trichloroacetic acid. For comparison, the oxygen:carbon ratio in poly(methylmethacrylate) is 0.4, some 67-fold higher.

An upper intermediate group where intrafilm pH falls and detritylation were of more modest extent. The group included four 4-substituted styrene polymers (4-chloro-, 4-bromo, 4-tert-butyl and 4-hydroxyl) and poly(2-vinylnaphthalene).

A lower intermediate group where intrafilm pH changes and detritylation were detectable. The two members of this group were poly(vinylchloride) and a poly(carbonate urethane).

Those that inhibited the photoacid induced fall of intra-film pH to the point where it was undetectable by Brilliant Green. No detritylation was observed in these circumstances. Polymers in this category included three polymethacrylates, three other esters (sucrose benzoate, cellulose acetate butyrate and poly(vinylacetate)), two ethers (ethyl cellulose and polyethylene oxide) and two copolymers of styrene (one with methylmethacrylate, the other with acrylonitrile).

TABLE 2

Performance of various polymers as solid matrices for photoacid-dependent nucleotide detritylation.

| Polymer & average MW & % proportions by wt. for co-polymers (where available) | % Fall at 640 nm (intrafilm pH fall) | % Rise at 510 nm (trityl cation release) |
|---|---|---|
| Poly(styrene) 15 k. [—CH$_2$CH(C$_6$H$_5$)—]$_n$ | 65-75 | >90 |
| Poly(α-methylstyrene) 9 k. [—CH$_2$C(CH$_3$)(C$_6$H$_5$)—]$_n$ | 65-75 | >90 |
| Poly(styrene-co-α-methylstyrene) | 70-80 | >90 |
| Poly(4-methylstyrene)$^a$ 70 k. [—CH$_2$CH(C$_6$H$_4$CH$_3$)—]$_n$ | 70-80 | >90 |
| Poly(chlorostyrene) 100 k. 60/40 mix of 3- & 4-isomers | 70-80 | >90 |
| Poly(acenaphthalene) 5-10 k [—C$_{12}$H$_8$—] | 70-80 | >90 |
| Poly(indene-co-coumarone) [—(C$_9$H$_8$—)$_x$—(C$_8$H$_6$O)$_y$—] Ratio x:y≈10 | 70-80 | >90 |
| Poly(carbomethylsilane) 2 k [—Si(CH$_3$)HCH$_2$—] | 70-80 | >90 |
| Poly(4-chlorostyrene). [—CH$_2$CH(C$_6$H$_4$Cl)—]$_n$ | 50-60 | 70-80 |
| Poly(4-bromostyrene) 65 k [—CH$_2$CH(C$_6$H$_4$Br)—]$_n$ | 30-40 | 60-70 |
| Poly(4-tert-butylstyrene) 50-100 k. [—CH$_2$CH(C$_6$H$_4$C(CH$_3$)$_2$)—]$_n$ | 30-40 | 60-70 |
| Poly(4-hydroxystyrene) 20 k [—CH$_2$CH(C$_6$H$_4$OH)—]$_n$ | 30-40 | 45-55 |
| Poly(2-vinylnaphthalene) 100 k. [—CH$_2$CH(C$_{10}$H$_7$)—]$_n$ | 30-40 | 55-60 |
| Poly(carbonate-urethane)$^b$ | 5-15 | 5-15 |
| Poly(vinylchloride-co-vinylacetate-co-hydroxypropyl-acrylate) 15 k, (81:4:15) | 5-10 | 5-15 |
| Poly(vinylchloride) [—CH$_2$CH(Cl)—]$_n$ | 5-10 | 5-15 |
| Poly(styrene-co-acrylonitrile) 185 k (70:30) | <5 | <5 |
| Poly(vinylacetate) 83 k. [—CH$_2$CH(O$_2$CCH$_3$)—]$_n$ | <5 | <5 |
| Poly(methylmethacrylate) 15 k. [—CH$_2$C(CH$_3$)(CO$_2$CH$_3$)—]$_n$ | <5 | <5 |
| Poly(benzylmethacrylate) 70 k [—CH$_2$C(CH$_3$)(CO$_2$CH$_3$)—] | <5 | <5 |
| Poly(cyclohexylmethacrylate) 65 k [—CH$_2$C(CH$_3$)(CO$_2$CH$_3$)—] | <5 | <5 |

TABLE 2-continued

Performance of various polymers as solid matrices for photoacid-dependent nucleotide detritylation.

| Polymer & average MW & % proportions by wt. for co-polymers (where available) | % Fall at 640 nm (intrafilm pH fall) | % Rise at 510 nm (trityl cation release) |
|---|---|---|
| Poly(styrene-co-methylmethacrylate) 100-150 k (40:60) | <5 | <5 |
| Poly(ethylene oxide) 100 k. [—CH$_2$CH$_2$O—]$_n$ | <5 | <5 |
| Cellulose acetate butyrate, (acetate 2%, butyrate 52%) | <5 | <5 |
| Ethyl cellulose. (Ethoxy content 48%) | <5 | <5 |
| Sucrose benzoate. | <5 | <5 |

$^a$Experiment with Ester 1 in place of Ester 2
$^b$Co-polymer of (1,6-hexyl-1,2-ethylcarbonate)diol with 4,4'-methylenebis(phenylisocyanate) and 1,4-butenediol.
(c) [—OC$_6$H$_4$-4-C(CH$_3$)$_2$C$_6$H$_4$-4-OCO—]$_n$ The observations are in agreement with the concept that hydrogen bonding of carboxylic acid groups by polymers containing heteroatoms inhibits acid dissociation into anion and H$^+$. The inhibition was greatest with polyalkenes containing ester or ether linkages. The difference in performance between the two halogen-containing polymers, poly(vinylchloride) and poly(halostyrene), may simply be due in part to a dosage effect: the ratio of carbon to chlorine atoms is 2 in polyvinylchloride, and 8 in poly(chlorostyrene).

However, the lone electron pair of a heteroatom covalently bound to an aromatic ring is involved in the electron resonance of the aromatic system, and consequently may only participate weakly as a hydrogen bond acceptor. Thus electronegative heteroatoms may be tolerated as substituents of aryl systems (e.g. poly(3-chlorostyrene) but not as substituents of alkyl groups (e.g. polyvinylchloride).

There are differences between the performance of individual members of the non-heteroatom containing poly(styrene) class suggesting that factors other than hydrogen bonding may operate, for example, the effect of small absolute differences in dielectric constant could have relatively large effects on pK$_a$ values when the dielectric constant is low, as it with polystyrenes. Steric interference may also contribute, by restricting the approach of heteroatoms to carboxyl group hydrogen atoms.

Unidentified polymers that might perform as well as the first eight in Table 2 would have a low or zero content of electronegative heteroatoms. Alternatively but less preferably any heteroatoms would have their lone electron pairs conjugated with an aromatic system. For example, other poly(arylalkenes) such as poly(vinylnaphthalene), poly(vinylanthracene) and poly(vinylpyrene) all resemble polystyrene in being composed of a polyethylene main chain substituted with pendant aromatic groups. Furthermore, the poly(arylalkenes) are not restricted to the ethylene group as the source of the main chain unit: propylene, butene, pentene and other alkenes may all take its place. Polyalkenes such as poly(3-cyclopentylpropene) have pendant cycloalkyl groups rather than aryl groups, and also meet the criterion of lacking heteroatoms. However, their low solubility is problematical. Other polymers lacking heteroatoms but with a high aryl content are those with phenyl or substituted phenyl groups as part of the main chain. Examples other than the two tested (poly(acenaphthalene) and poly(indene-co-coumarone)) are poly(diphenylmethylene), poly(di-p-tolymethylene), and poly(xylylene).

Poly(alkenes) such as poly(ethylene) and poly(propylene) also lack heteroatoms, but their ability to be cast as films from their solutions in volatile solvents and then to be removed again is negated by their poor solubility in solvents unless heated to 80° C. One way to overcome this solubility problem would be to create a copolymer of an alkene with a low content of heteroatom containing unit, for example, in the hope that the required solubility can be achieved without the adverse effects of hydrogen bonding on the pK$_a$ of photogenerated carboxylic acids. However, as described above, our results on the solubility of poly(ethylene-co-vinylacetate) at increasing contents of vinyl acetate were not encouraging.

An alternative means of improving the solubility of polyalkenes is to replace at least one of the carbon atoms of the main chain repeating units with silicon, at which point the polyalkene has become a polysilane. Silicon is an electropositive heteroatom and does not participate in hydrogen bonds. It is larger than the carbon atom and as can be inferred from comparisons of the melting points and solubility of polyalkenes and polysilanes, weakens the strength of interchain binding forces. Thus, polypropylene was unsuitable due to its poor solubility, whereas replacement of its methyl-bearing main chain carbon atoms with silicon to give poly(carbomethylsilane) gave a polymer that performed as well as any of the polystyrenes.

We also considered poly(dienes), if only to rule them out. They are rubbery compounds, often tacky, chemically reactive, and prone to cross-linking. Similar considerations applied to poly(acetylenes). Cross-linked polymers, for example poly(styrene-co-divinylbenzene) were also ruled out on account of their poor solubility. On the other hand, branched polymers are not ruled out.

Although poly(methylmethacrylate) has been a common choice for other laboratories (Wallraff et al, 1997, Beecher et al, 1997) its strong inhibition of carboxylic acid dissociation suggests that it could be replaced in the chemical amplification method with advantage by a poly(styrene) polymer. On the other hand, the disruptive effects of higher temperatures on hydrogen bonds may act during the thermolytic step of chemical amplification to overcome the adverse effects of poly(methylmethacrylate).

In summary, there are four categories of heteroatom-deficient organic polymers:
  Polyethylene main chains with or without pendant alkyl groups.
  Polyethylene main chains with pendant aryl groups.
  Main chains incorporating aryl groups, with or without methylene or ethylene groups.
  Polysilanes. The silicon atoms are part of the main chain.

The first group suffers from poor solubility in organic solvents unless heated, and is therefore generally unsuitable for an application requiring rapid and uncomplicated formation and removal of their solid films. However, pendant groups such as cyclopentadiene or terpenes may confer improvements in solubility and film formation, and thereby provide usable polymers.

The second group includes polystyrenes: they are highly soluble in organic solvents and possess the other necessary properties for use as solid films for the detritylation step of oligonucleotide synthesis driven by photogenerated carboxylic acid.

The third group has repeating aryl units as part of the main chain. Many of its members would be expected to perform on a par with polystyrenes other than on price and availability. However, poly(indene) (containing <10% of poly(coumarone) as a co-polymer) is readily available, inexpensive and effective.

The fourth group includes poly(alkylsilanes). Those of its members without Si—Si bonds may be of special value if a polymer with low absorption of light in the 250-260 nm region is needed. Otherwise they compare unfavourably on chemical stability, price, and availability.

The following scheme illustrates some structures of members of the first three of the four groups.

Classification and examples of some heteroatom-deficient polymers, based on structure of the repeating unit.

| Structure of repeating unit | Name of polymer |
|---|---|
| 1. Poly(alkenes), without pendant aryl groups. | |
| —$CH_2$—$CH_2$— | Poly(ethylene) |
| —$CH_2$—$CH(CH_3)$— | Poly(propylene) |
| —$CH(CH_2CH_3)CH_2$— | Poly(1-butene) |
| —$CH_2$—$CH(C_6H_{11})$— | Poly(vinylcyclohexane) |
| —$CH_2$—$CH\{CH_2(C_5H_9)\}$— | Poly(3-cyclopentylpropene) |
| 2. Poly(alkenes) with pendant aryl groups. | |
| —$CH_2$—$CH(C_6H_5)$— | Poly(styrene) |
| —$CH_2$—$C(CH_3)(C_6H_5)$— | Poly(α-methylstyrene) |
| —$CH_2$—$CH(C_{10}H_7)$— | Poly(2-vinylnaphthalene) |
| —$CH_2$—$CH(CH_2 \cdot CH \cdot C_6H_5)$— | Poly(4-phenyl-1-butene) |
| —$CH_2$—$CH(C_6H_4$—$C_6H_5)$— | Poly(4-vinylbiphenyl) |
| —$CH2$—$CH(C_{14}H_9)$— | Poly(1-vinylanthracene) |
| 3. Polymers with main chain aryl groups | |
| —$CH_2$—$CH_2$—$C_6H_4$—$CH_2$—$CH_2$— | Poly(1,4-phenylenediethylene) |
| —$CH_2$—$CH_2$—$C_6H_4$—$C_6H_4$—$CH_2$—$CH_2$— | Poly(4,4'-biphenylenediethylene) |
| —$C_6H_4$—$CH_2$—$C_6H_4$— | Poly(4,4'-methylenediphenylene) |
| —$C_6H_4$—$CH$=$CH$— | Poly(phenylene-vinylene) |
| —$C_9H_8$— | Poly(indene) |
| —$C_{12}H_8$— | Poly(acenapthalene) |

Oligonucleotide Array Synthesis

An important requirement for the design of an automated chemical process is that the chemistry should be optimally effective and the process amenable to automation. These requirements are not well met in the case of oligonucleotide array synthesis involving physically disparate activities such as spin-coating, pre- and post-exposure baking, solvent and reagent treatments and precision photolithography, all of which are required in the methods described by Beecher et al (1997, 2000) and McGall et al (1996). However, in the present invention, the identification of effective polymer matrices, e.g. those based on polystyrene, in which the photoacid-dependent step can be effected without inhibition of photoacid dissociation greatly simplifies matters: neither heating nor chemical amplification are required, thus opening the way to simpler and automated array fabrication. We have therefore designed an automated bench-top apparatus for oligonucleotide array synthesis based on these polymer matrices. The apparatus has a number of novel features that make for simplicity and at the same time achieve a parallel throughput of 10 arrays of oligonucleotide 20-25 mers, each of c.750 k features maximum in an area of c.2-3 $cm^2$, in a single automatic run of not more than 7 h. Upgrading by provision of further photolithographic beams would increase the throughput to 40-60 arrays per run.

Nanotechnology

The diffraction of light limits photolithographic resolution using contact masks or projection to about 0.5 of a wavelength. This is not the case with scanning near field optical methods, in which an incident beam is transmitted by a waveguide that tapers to a tip of diameter 20 nm or so and is held at a similar distance from, and scanned over, the solid surface that is to be illuminated. This approach yields resolution of less than 50 nm (Sun & Leggett, 2004), which in array terms corresponds to at least $10^6$ features on an area 0.1×0.1 mm. This approach is not practical for photoresist-based technologies, because the photoresist is so thin that it no longer functions as an effective barrier. This is not a limitation for thin films used to generate photoacid that then reacts with a monolayer on the surface: they do not have a resist function, and can be say 20-40 nm thick.

However, translational diffusion becomes problematical at these sub-micron distances. The relationship between the translational diffusion coefficient (D) and the distance d traveled by a molecule undergoing one-dimensional diffusion for a time (t), is given by the Einstein-Smoluchowski equation, where the value of d may be −ve or +ve and $<d^2>$ is the mean square diffusion distance.

$$<d^2>=2Dt \qquad (6)$$

A weakly volatile photoacid such a trichloroacetic with $D \approx 10^{-13}$ $cm^2$ $s^{-1}$ is acceptable for feature sizes of 10 μm or more, but not at ≦1 μm. However, esterification of substituted 2-nitrobenzyl alcohols with acids such as perfluoro-octanoic or mesitylene-sulphonic acid would give photoacid generators that on illumination yield non-volatile acids.

An alternative would be to use the polymer itself as the photoacid. For example, as shown by Hanson et al (1992) in the context of photoresists, the poly(4-styrene-sulphonate) ester of a substituted 2-nitrobenzyl alcohol would yield poly (4-styrenesulphonic acid) on photolysis. The acid, being part of the polymer, cannot diffuse. Protons will diffuse, but their diffusion is restricted electrostatically by the immobile poly (4-styrene-sulphonate) anion or by the absence of an exchangeable mobile cation or a of mobile anion. Films could be composed of the photoacid generating polymer by itself, or mixed with an unmodified polymer such as poly(styrene), or as a co- or block-polymer of the two.

A polymeric photoacid generator for use in the synthesis of peptide nucleic acids has been described by Kim et al (2002). It consisted of the triarylsulphonium salt of an acid crosslinked with sebacoyl chloride to create a polymeric cation. The associated anion was not polymeric, and on illumination was released with a proton as the monomeric acid. Examples were given for p-toluenesulphonic, naphthalenesulphonic and 9,10-dimethoxy-2-anthracenesulphonic acids. The monomeric photogenerated acid was free to diffuse, which is not the case when the photoacid is itself part of the polymer, as with poly(4-styrene sulphonic) described above. Thus in our invention the photoacid is immobilised by remaining as part of the polymer, and is not released on photogeneration.

Chemistry

Conventional Synthesis

Solid phase synthesis of a single oligonucleotide on controlled porosity glass normally starts with a linker molecule already attached to the glass, and carrying a 5'-O-dimethoxytrityl group ((DMT) and N-protected nucleotide attached through an alkali-labile link at its 3'-position (Caruthers, 1991). Following acid-dependent removal of the 5'-O-DMT group to expose the nucleotide 5'—OH group, further nucleotide monomers are added one at a time, in the 3' to 5' direction, as 5'-O-DMT- and N-protected 3'-O-nucleoside phoshoramidites. The series of steps for adding further nucleotides to create an oligonucleotide is summarised in Synthesis Scheme 1.

| Synthesis Scheme 1 | |
|---|---|
| Start | |
| Step 1 | Deblock by adding acid (e.g. trichloroacetic) to remove DMT groups |
| Step 2 | wash |
| Step 3 | Couple the next monomer to the unblocked 5'-OH oligonucleotide groups. |
| Step 4 | wash |
| Step 5 | Cap non-reacted 5'-OH groups with acetic anhydride. |
| Step 6 | wash |
| Step 7 | Oxidise the trivalent phosphite bond to the pentavalent phosphate. |
| Step 8 | wash |
| Return to Step 1, and repeat the cycle until the desired chain length is attained. | |

Steps 1-8 are repeated n times for the synthesis of an n-mer. Using appropriate reagents the N-blocking groups are then removed, and the oligonucleotide released from the solid support. The released oligonucleotide may be purified by chromatography before use. If the stepwise yield for monomer coupling is Y, then the overall yield for an n-mer is $Y^{(n-1)}$. Values for Y of 98% or higher are achievable. The process uses a flow cell, packed with controlled porosity glass as the solid phase. A computer-controlled micro-fluidic manifold regulates the movement of solutions into the flow cell. Positive gas pressure above the reagent solutions in their reservoirs provides the driving force.

Light-Directed Synthesis

In a photoacid dependent method of synthesising very many different oligonucleotides in a two-dimensional array format on a planar glass surface, detritylation of 5'-O-DMT-protected nucleotides is accomplished by light-dependent generation of photoacid from a photoacid generator. Projection photolithography defines the necessary illumination patterns. To prevent acid diffusion from irradiated to non-irradiated array elements the photoacid generator may be immobilised in a solid polymer film, which is removed with solvent once irradiation and acid-dependent detritylation is completed. As discussed above, and in contrast to the prior art, we have found that the choice of polymer is an important factor in determining the efficiency of oligonucleotide synthesis. The preferred choices of polymer are those at the head of Table 2, such as poly(styrene), poly($\alpha$-methylstyrene) or poly(styrene-co-$\alpha$-methylstyrene). The synthesis starts with a linker molecule already attached to the glass, carrying a DMT-blocked hydroxyl group at its free end.

Each of the steps of Synthesis Scheme 1 can take place not only one after another in a single flow cell, but at separate stations on an assembly line. Because the steps form a cycle that is repeated many times, the assembly line is designed as a carousel. Only one step is undertaken at any one station. The slides therefore circulate from one station to the next. One lap of this circuit is identical to any other lap except that the nucleoside base is changed at the completion of each cycle, as is the pattern of photolithographic illumination. The N-blocking groups are removed after completion. The oligonucleotides remain attached to the glass, and are not purified. Synthesis Scheme 1 describes the activity at each location.

| Synthesis Scheme 2 | |
|---|---|
| Start | |
| Station 1 | Make film by dip-coating of polymer containing photoacid generator |
| Station 2 | Irradiate (Deblock) |
| Station 3 | wash to remove film |
| Station 4 | Couple the next monomer to the unblocked 5'-OH oligonucleotide groups |
| Station 5 | wash |
| Station 6 | Cap non-reacted 5'-OH groups with acetic anhydride |
| Station 7 | wash |
| Station 8. | Oxidise the trivalent phosphite bond to the pentavalent phosphate |
| Station 9 | wash |
| Station 10 | Spare |
| Return to Station 1, and repeat the cycle until the desired chain length is attained. | |

The light sensitivity of our preferred photoacid generators in a film of poly(styrene-co-$\alpha$-methylstyrene) for achieving complete oligonucleotide detritylation is well-covered by c.200 mJ/cm$^2$ at 365 nm. A typical 100-150 W Hg arc source can deliver an intensity at 365 nm of at least 25 mW on an area of 2 cm$^2$, or higher if the wavelength selection is broadened to include all light from 330 nm to 405 nm.

Thus illumination of an array surface of 2-3 cm$^2$ does not require more than a few seconds even after allowing for losses at the spatial light modulator.

In Synthesis Scheme 2 ten slides can be processed simultaneously, apart from a phase shift of 1 station or 36° between each slide. The impact of the phase shift is to increase the total start-to-finish time from 4NT to (4N+2)T, where N is the final length of the oligonucleotides and T is the time required for each cycle. Because N is typically 25, the increase in overall time is only 2%.

The residence time of each slide at each station is identical. Avoidance of a seriously rate-limiting step is therefore crucial. The irradiation ("Deblock") step in our hands takes less than 25 sec. The other steps are all completed within that time, so each synthetic cycle takes just over 4 min. This is a conservative value, and may be capable of being lowered.

This arrangement whereby a multiplicity of array substrates is processed typically 80-100 times around a circuit that adds on average one base to 25% of the array elements per lap has three major advantages: a multiplicity of arrays is synthesised essentially in parallel; the critical and expensive optical photolithographic step is used continuously apart from the moments when array substrates move from one location to the next; and it provides continuous automation including film formation and removal.

Wallraff et al (1997) and Beecher et al (2000) made films of polymer and photoacid by use of spin coating followed by baking to drive of residual solvent. A second baking step was used following photolytic illumination. Their procedure would allow a multiplicity of arrays to be made in parallel on a single substrate, but movement of the substrate in each of 80-100 synthetic cycles from a spin-coating apparatus to a mask-positioning high-intensity UV-photolithographic apparatus, and then to treatment by solvents and reagents, would be difficult to automate.

Automated bench-top oligonucleotide array synthesisers have been described by others, but not for a method that uses photoacid generation in a solid film. Gao and colleagues (Gao et al 2000; Zhou et al, 2004) used photoacid generation in solution, and prevented diffusion of acid between elements either by use of hydrophobic zones to define each array element, or by physical barriers in a microfluidics device. The density of array elements was low, <10$^4$ elements/cm$^2$. Singh-Gasson et al (2004) used direct photodeprotection and described a flow cell attachment for use with a DNA synthesiser to provide reagents solutions. Only one array was synthesised at a time. Our method as described here combines the high light sensitivity of photoacid generation with the high photolithographic resolution available from the use of solid films to restrict photoacid diffusion. It requires neither spin coating nor heating steps, and thereby enables simultaneous and automated synthesis of a multiplicity of high density oligonucleotide arrays.

Figure 4A:
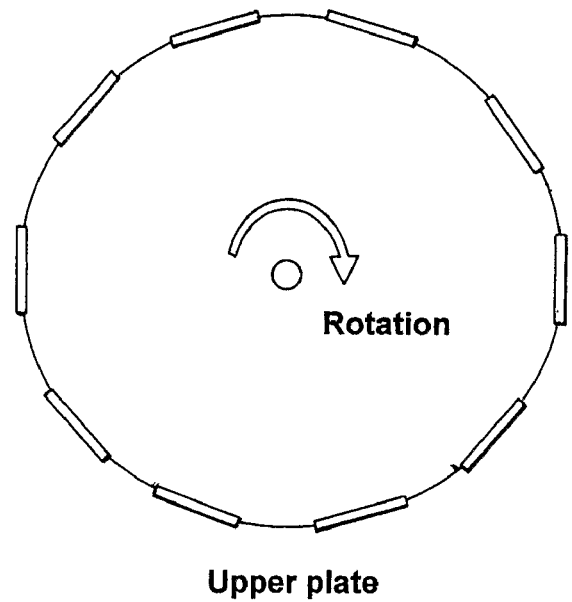
FIG. 4. Carousel design for an oligonucleotide array synthesizer. (a) Upper plate: ten slides attached at 36 deg intervals with rotational movement only; (b) Lower plate: nine fluid cells and one illumination position with vertical movement only.
Figure 4B:
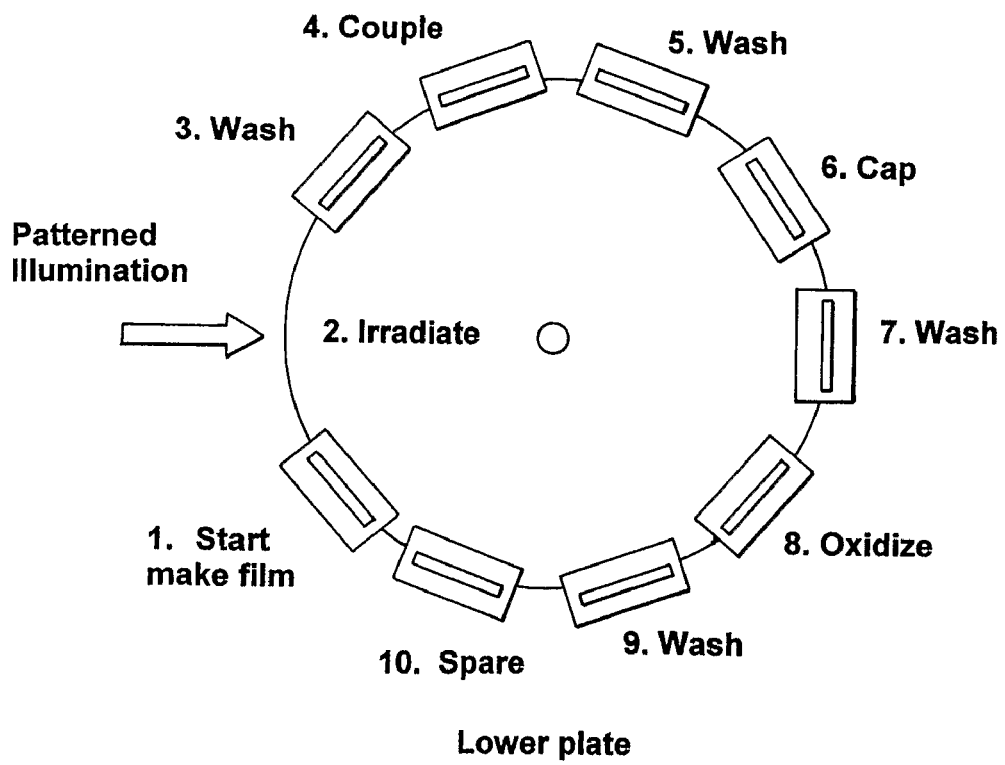

Returning to our own apparatus, as shown in FIG. 4, the 10 slides are held vertically by their higher ends on the perimeter of a carousel. The lower part of each slide is unencumbered and can be either immersed in fluid or removed from it by upward or downward movement of a suitably positioned fluid-containing open-topped cell. There are nine such cells, spaced at 36° apart on a perimeter that lies under that on which the slides are positioned. The tenth and vacant position is at the optical path where the photolithographic illumination beam passes from the projection device to fall upon the surface of a slide. Each of these 10 positions (9 with fluid cells, one vacant) is a station on a circuit.

There are two mechanical movements. The carousel rotates in 36° increments at 25 second intervals to take the slides around the circuit. The open fluid cells move vertically to engage with or withdraw from the slides at 25 second intervals when the carousel is stationary. Each fluid cell has its own flexible input tube or tubes to supply reagent(s) or wash solutions, and an output tube or tubes to waste.

Because the oligonucleotide density on the slide surface is no more than that possible with a monolayer the utilisation of chemical reagents by reaction is very low. Further reduction in reagent requirements, particularly desirable for nucleoside phosphoramidites, can come from reducing cell volume to a minimum. The volume of cells used for washing can be larger. Fluid flow into the cells from reagent or wash reservoirs is provided by dedicated micro-pumps.

The optical pathway is fixed. There is no requirement for great absolute accuracy for location of the projected image on the slide, because the projected image does not need to register with any pre-existing position. But what is important is reproducibility: each slide must return to its original position at each subsequent cycle, otherwise the wrong areas would be illuminated. A reproducibility of 1 μm or better is required, and is within the scope of a stepping motor, particularly if position-indexing is used. Wobble of the stepper motor axis is not problematical because each slide when illuminated is always at the same angular position with respect to the rotational axis.

The spatial light modulator can be a digital micromirror device for light at 365 nm or higher (Singh-Gasson et al, 1999), or a liquid crystal display, either transmissive or reflective, for violet light. The light source can be an Hg arc for 365 or 405 nm, or a high power integrated light emitting diode source for use at wavelengths from 375 to 420 nm. Throughput can be increased from 10 arrays per run to twenty or more if two or more arrays are made on each slide. To do this an additional photolithographic beam can be created by installing a second light source, spatial light modulator and projection lens. A simpler and less expensive method is to exploit the high light sensitivity of photoacid directed oligonucleotide synthesis by sharing the output of a single spatial light modulator either in time or space between two or even three areas on one slide.

Overall control of the mechanical movements, pumps and illumination patterns is under computer control. The carousel is contained within an argon or nitrogen atmosphere, appropriately replenished to remove solvent vapors.

Figure 5:
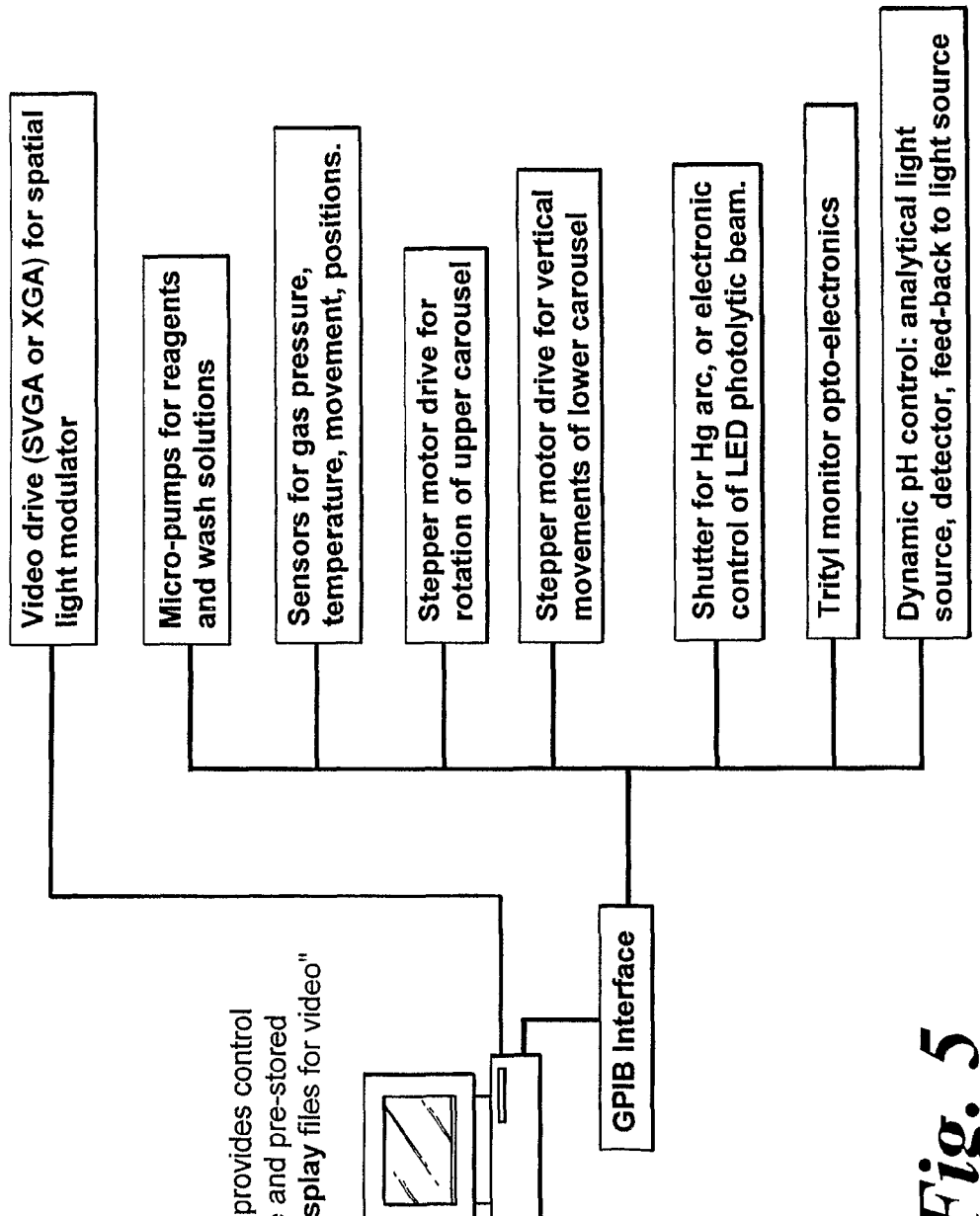
FIG. 5. Control of array synthesizer components.

FIG. 5 illustrates the essential electronic controls and components: they are all standard and commercially available. There are two optional extensions to this apparatus, and they are described under separate headings. One is a trityl monitor. The other is a mechanism for regulating intrafilm pH.

Physical arrangements alternative to those shown in FIG. 4 may be envisaged. For instance, the array substrates such as microscope slides may lie in a horizontal plane on the upper face of a circular plate that rotates around a vertical axis to bring each slide in turn to the various work stations. There are no reagent wells, and no vertical movements of slides. Windows in the circular plate allow access of the photolithographic beam to the upper surface of the slides by illumination through the slides from below. The synthesised oligonucleotides are on the upper surface of the slides, which receive reagent solutions or wash solvents. Film formation on the upper surface of the slides is achieved by causing a polymer-containing solution of photoacid generator to spread and dry.

Alternatively, films can be formed by displacing with a gas flow a solution of photoacid generator with or without polymer from the cavity between two narrowly separated glass plates sealed at their edges and converted into a flow cell by entry and exit ports at opposing ends of the cavity.

Figure 6:
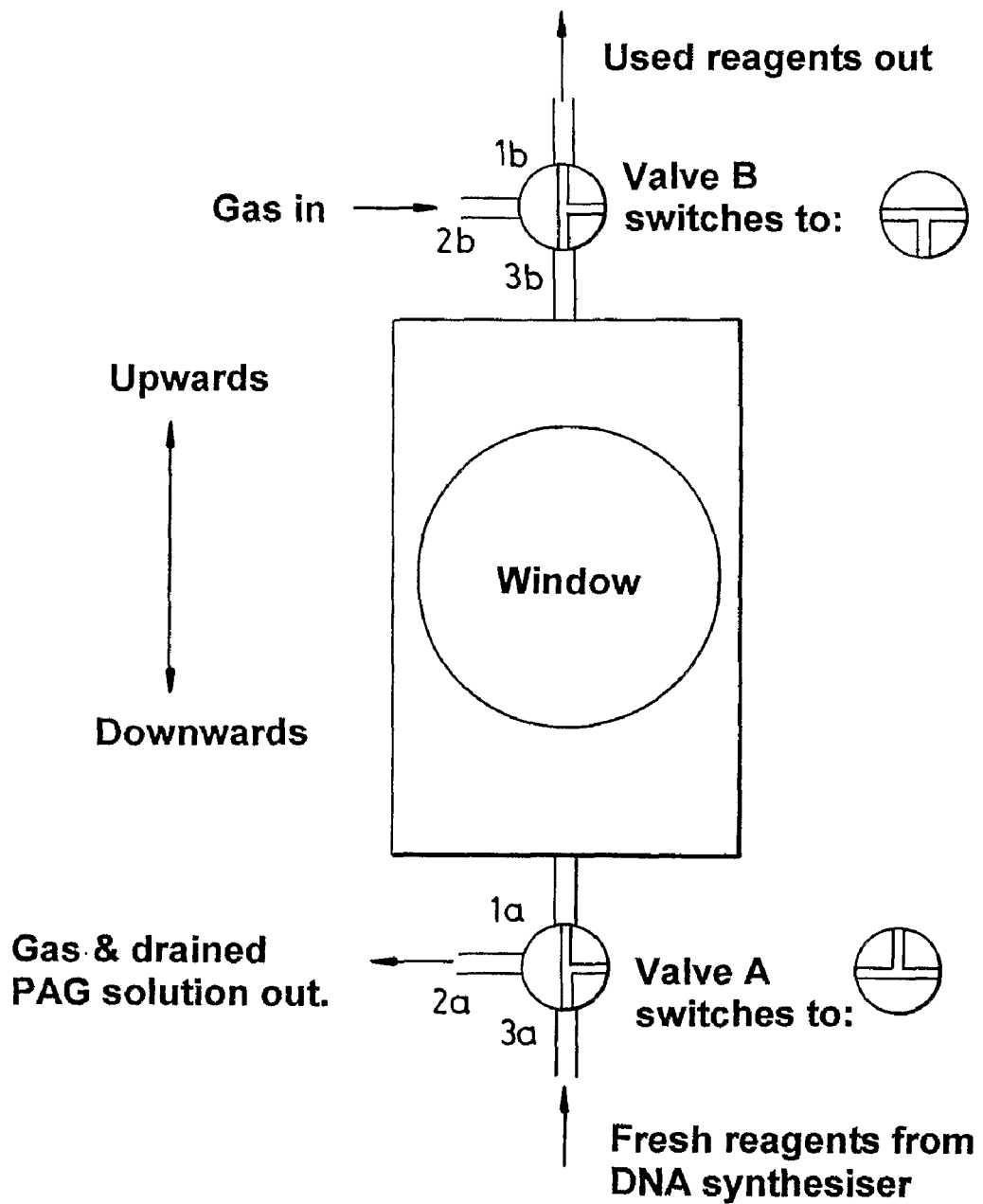
FIG. 6. Switching valves and flow pathways for a flow cell incorporating formation and removal of a solid film.

FIG. 6 illustrates feature of such a flow cell. The plates are inclined at an angle to the horizontal, typically 90°. The entry port is at the lower end, the exit port at the upper. Reagent solutions from a DNA synthesiser or equivalent fluid-handling system enter through the lower port. There is a lower switching valve immediately prior to the entry port and an upper switching valve immediately after the exit port. The flow of reagent solutions and solvent washes proceeds as per usual with a DNA synthesiser, except that at the point where a synthetic cycle normally commences with entrance of a detritylating acid solution into the flow cell, its place is taken by a solution of photoacid generator with or without polymer. This solution flows until the cell is filled, and stops. The lower switching valve then closes off entry of reagent and opens a path to waste. At the same time, the upper valve closes the usual path to waste and opens a path to permit entry of a stream of an inert gas such as argon or nitrogen. The gas displaces the solution in the cell in a downwards direction, and dries the residual film of solution on the substrate surface to leave a solid film.

Illumination with a photolithographic pattern then takes place, after which the switching valves return to their previous positions and buffered solvent is flowed into the cell to remove the solid film. Thereafter, the normal flow of solvents and reagents recommences and continues the remainder of the synthetic cycle through the coupling, capping and oxidation stages, after which the next synthetic cycle commences. The advantage of this method is that there are no mechanical moving parts other than valves or pumps. The array substrate remains in a fixed position throughout the whole synthesis. Another advantage is that reagent use can be minimized by close approximation of the two opposing surfaces of the flow cell. Parallel synthesis of arrays can be achieved with a large area flow cell, a more powerful light source and optics to provide multiple photolithographic beams.

Incorporation of Other Molecules in the Films

The non-polar but aromatic environment provided by polystyrene polymers is well suited to host non-ionic photoacid generators such a substituted 2-nitrobenzyl esters. Other functional molecules can be incorporated. For instance, pH indicators to measure at least qualitatively photoacid-induced movements of intrafilm pH values. They may also be added as pH-sensitive contrast enhancement agents. In a preferred embodiment, the pH indicator dye 4-phenylazoaniline is used as it has suitable properties for this purpose. The base has a strong absorption band covering the 365 nm spectral region, lost on protonation. The $pK_a$ is higher than the intra-film pH at which oligonucleotide detritylation commences. These attributes are precisely those required for a establishing a high acid-dependent photolithographic contrast.

pH Control

The purpose of photoacid generation is to generate protons, not undissociated photoacid. But for the fact that too low a value for intra-film pH causes oligonucleotide depurination, stronger acids could be useful for increasing light sensitivity. Although the absolute values of intrafilm pH are difficult to measure, relative changes are less so. Inclusion of pH indicator dyes in the film provides a molecular dipstick for gauging changes of intrafilm pH and their relative magnitude. We have found that the most useful indicators are Malachite Green and Brilliant Green. They are cationic triphenylmethane indicators with delocalised charge when protonated. The former has diethylamino- and the latter dimethylamino-substituents. Their $pK_a$ values in aqueous media are c.1.0, that for Malachite Green being slightly lower than for Brilliant Green. Their molar extinction coefficients at 630-640 nm are high, $10^5$ $M^{-1}cm^{-1}$. We found, as shown in Table 2, that in illuminated solid films of polystyrene and related polymers containing a photoacid generator, incorporated Brilliant Green responds to intrafilm changes of photoacid concentration over the range where the rates and extents of oligonucleotide detritylation move from undetectable to rapid and complete.

These findings lead to two ways to access the potentially high light sensitivity of strong photoacids generators without incurring the penalty of depurination.

Buffer Method

This is the simpler method of the two described. It uses a very weak organic base as a buffer to prevent the intrafilm pH from sinking below the desired value. Its $pK_a$ value should therefore be less than the desired intrafilm pH, and its concentration should be sufficient to prevent it from being exceeded by the likely concentration of photoacid. Suitable low $pK_a$ bases are quinoxaline, hexamethylenediamine and the polymer polycarbazole. The use of these bases differs from that used to protect against stray light, where the $pK_a$ is higher than the intrafilm pH required for detritylation and the concentration is low enough to be exceeded by photoacid generated by design rather than accident (Garland & Serafinowski, 2002).

Optical Feedback Method

Figure 7:
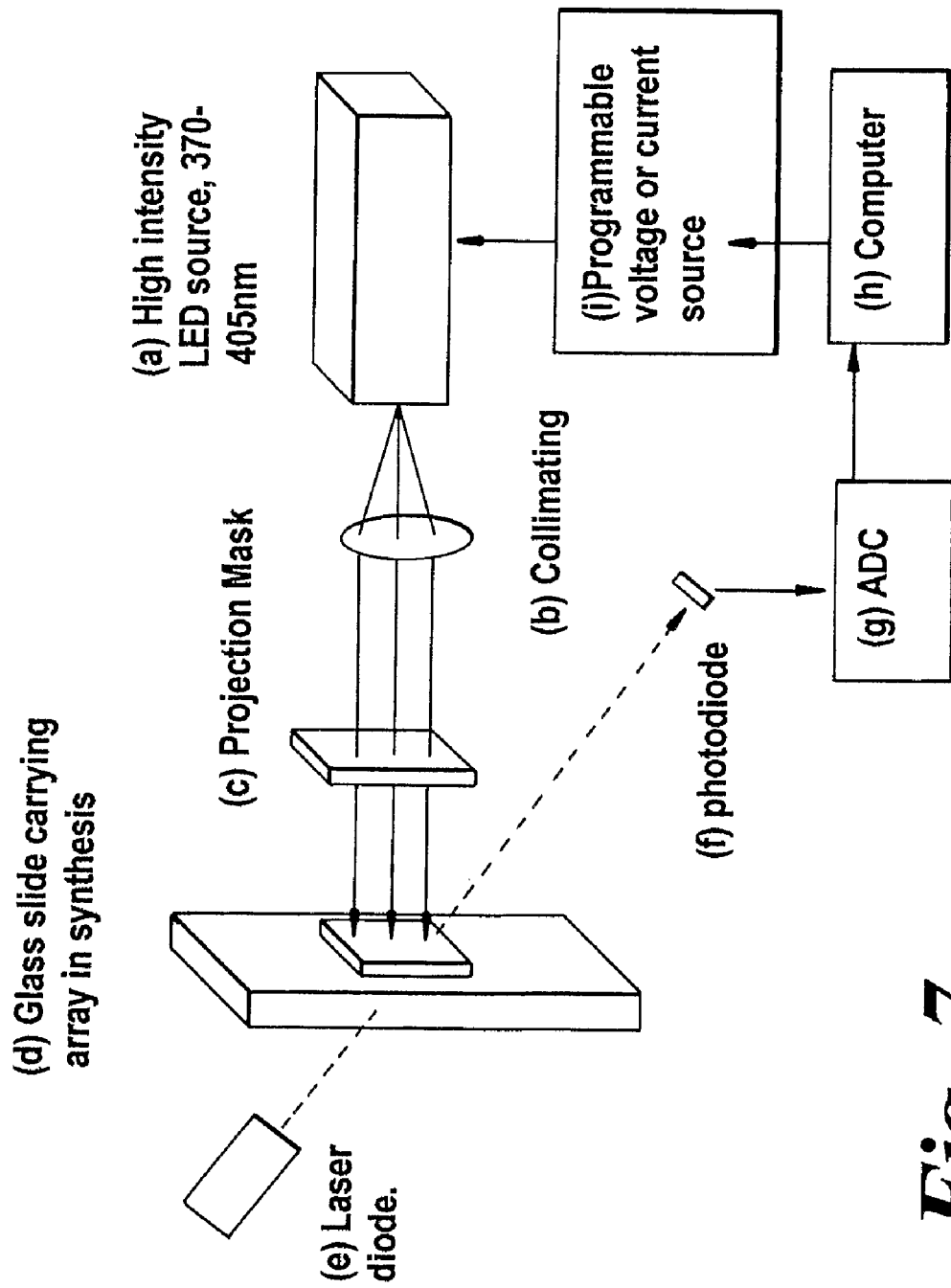
FIG. 7. Optical paths and components for active intrafilm pH control by a feedback loop.

This method requires additional instrumentation, but unlike the buffer method, would allow an abrupt rather than more gradual fall of intrafilm pH down to the desired level before terminating any further fall. It requires that a pH indicator be incorporated in the polymer film along with the photoacid generator. Both Brilliant Green and Malachite Green are suitable. Their absorption is monitored at c.640 nm, far removed from the absorption of the majority of photoacid generators or their photoproducts. The magnitude of the absorption is used in a feed-back loop to control the intensity of photolytic illumination. Intensity can be controlled with an electronic shutter. In the case of light emitting diodes, the intensity can alternatively be controlled by feedback to the power source. FIG. 7 illustrates the interrelationships of the optical and electronic components.

Trityl Monitor

Automated DNA synthesisers provide for measurement of the amount of trityl cation ($DMT^+$) released by acid at each synthetic cycle. This measurement serves two useful purposes. Firstly it determines if synthesis is proceeding according to plan and pauses the program if it is not. Secondly it gives information on the stepwise synthetic yield at each cycle. This form of quality control would be of significant value for array fabrication, where post-fabrication purification of the oligonucleotides is not available. The extinction coefficient of $DMT^+$ at 500-510 nm is 80 $M^{-1}cm^{-1}$. Typical oligonucleotide densities on an array surface are about 40 pmole.$cm^{-2}$, giving absorption values of about 0.0032 when measured at 500-510 nm and along an axis normal to the plane of the film. However, the value is reduced 4-fold because on average only 25% of the array elements are illuminated in any one synthetic cycle. One solution to these low values is to increase the optical path length by use of total internal reflection (Palik & Holm, 1978).

A glass microscope slide has a refractive index value n of c.1.5, and in media of lower refractive index can act as a waveguide. Light entering the side or end of a slide in air (n=1.0) and incident on the two internal faces at an angle greater than 42 to their normal is totally internally reflected, as shown in FIG. 7, panel (a). The internally reflected beam propagates through the slide by multiple reflections before emerging at an angle at the sides or ends of the slide. At each reflection the incident light establishes an evanescent wave that penetrates the medium of lower refractive index, air in this case, to a depth of less than one wavelength. Any light-absorbing material on the surface of the slide can absorb energy from the evanescent wave, thereby attenuating the intensity of light emitted at the end or sides of the waveguide. The greater the number of reflections the greater is the absorption of light energy.

Figure 8A:
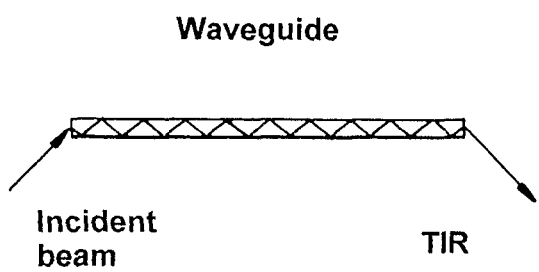
FIG. 8. Panels (a) and (b) Optical geometry for total internal absorption measurements of polymer films on glass slides. Panel (c) light sensitivity for photoacid induced detritylation of nucleotide attached to glass. Kinetics of trityl cation release from glass-surface attached DMTr-Thymidine during photoacid generation in a solid film of Ester 2. Illumination at 1.6 mW/cm$^2$ at 365 nm. Spectra recorded at 5 sec intervals. Not all spectra are shown.
Figure 8B:
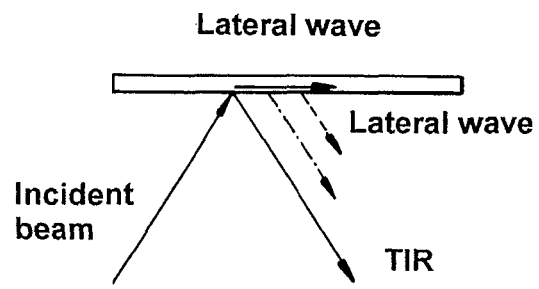
Figure 8C:
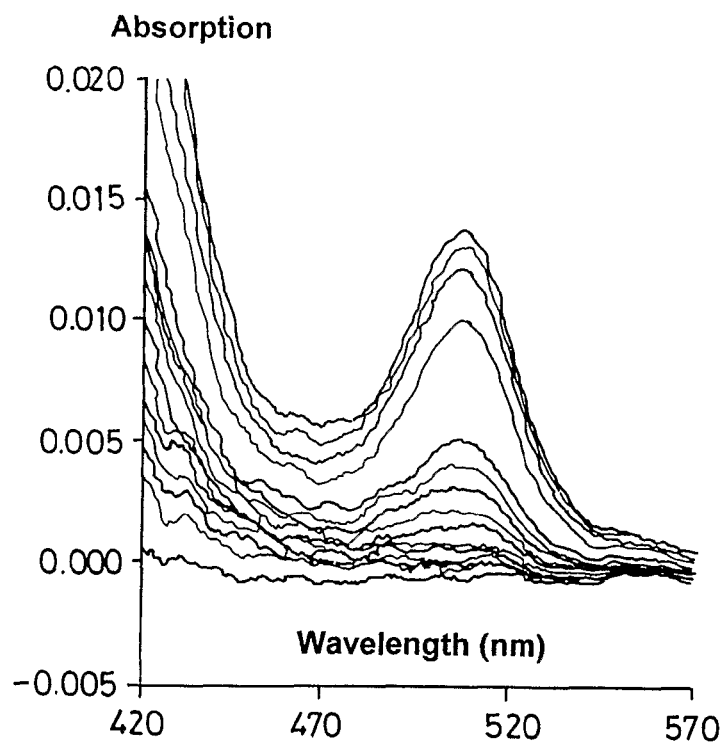

FIG. 8, panel (b), shows another aspect of the evanescent wave established at an interface. Most of the evanescent wave travels only a very short distance along the interface before leaving in the direction of reflectance. However, a small and diminishing fraction is propagated laterally along the interface before leaving. This is the so-called lateral wave, and it may extend for several mm or even cm. It can be attenuated by light absorbing molecules at the interface, giving gains of $10^3$ to $10^4$ over the absorption measured by incident light normal to the surface plane (Heavens & Sharma, 1976).

If a glass slide is coated with a polymer with a refractive index similar to glass or greater (e.g. polystyrene, n=1.59) internal reflection occurs at the polymer/air interface, not at the glass surface. But absorption of light by material at the glass surface still occurs, because it is traversed by the internally reflected beam twice at each reflection. Using a 1 mm thick glass microscope slide coated on both faces with a polystyrene film containing Brilliant Green we obtained a 15-20 fold increase of the 640 nm absorption peak on moving from an orthogonal single-pass spectrophotometer beam to a total internal refection beam over a 2.5 cm width. Much greater gains are available if the number of internal reflections is increased, both by judicious choice of incident angle and/or diminished thickness of the waveguide (i.e. the glass slide).

However, total internal reflectance methods require that the incident analytical light beam is coupled into the waveguide that either contains or has attached to one of its internally reflecting interfaces the analyte of interest. This requirement makes for complexities. A simpler alternative of sufficient sensitivity can be obtained with a so-called deep well photo-diode spectrometer, preferably with a second channel to compensate for fluctuations in the light source intensity.

FIG. 8 Panel (c) illustrates the achievable sensitivity for trityl cation detection at 510 nm in an experiment with a film containing Ester 2 using single pass absorption measurements with a relatively noisy CCD spectrometer and $DMT^+$ released from DMT-T covalently attached to a glass slide at a density of c. 125 pmoles/cm$^2$. The figure shows a set of absorption spectra in the 420-570 nm region taken during photolysis of the film. Despite the noise caused by limitations to signal averaging and the choice of spectrometer, detection of DMT$^+$ at c.10 pmole/cm$^2$ was achieved. A deep well photodiode spectrometer can extend that sensitivity by 10-20 fold. A plot of detritylation versus incident light energy in the experiment of Panel (c) is of interest, and given in Panel (d) after correction for the baseline slope seen in the spectra and caused by the long wavelength tail of the nitrosobenzophenone produced by photolysis the Ester. Detritylation was complete at an incident energy total of 250 mJ/cm$^2$ overestimated for technical reasons. The graph is strongly sigmoidal, giving good contrast, a property that is characteristic of the use of 2-nitrobenzyl esters either in their own films or in polystyrene-based polymers.

SUMMARY

The use of suitable film-forming polymers that do not form hydrogen bond with carboxylic acids enables photoacid-dependent oligonucleotide synthesis to be conducted without the complications of spin-coating, array heating or chemical amplification. Similar considerations apply to alkyl or arylsulphonic acids. The resultant process has high light sensitivity and can be automated. We describe an automated apparatus for photodirected oligonucleotide synthesis. It has several novel features not shared with conventional DNA synthesisers, nor with the two versions of apparatus for making oligonucleotide arrays developed by Nimblegen and Febit (Singh-Gasson et al, 1999; Nuwaysir et al, 2002; Baum et al, 2003; Richmond et al, 2004) both of which use a single flow cell, a digital light modulator and direct photodeprotection of the oligonucleotide-5'—OH. Array synthesis in those machines is essentially one per run, unless the single array is divided into a number of smaller arrays.

The novel features that we have included are:
(1) A move from a single flow cell or column as the single location for all steps of the synthetic chemistry, to a set of fluid-containing cells arranged as stations on a circuit. Each cell is dedicated to a particular task, and the slides on which arrays are being fabricated move through the sequence of stations. The process is repetitive: one lap of the circuit extends on average 25% of the oligonucleotides by one nucleotide, four laps extends all, and a hundred laps creates arrays of 25-mers.
(2) The use of dip-coating to form photoacid generator-containing films on slides. By this means, film formation is integrated with the chemical processing, allowing automation of the overall process without interruptions or manual intervention.
(3) Parallel array synthesis whereby 10 arrays can be made simultaneously.
(4) An optically open system to which one or more additional photolithographic beams can be added, with concomitant increases of two-fold or more in the number of arrays synthesised in one run. The upper limit is probably 3-fold, yielding 30 arrays on ten slides per run.
(5) An option to double the number of slides to 20 for the same number of stations on the circuit, work, and yielding from 20 to 60 arrays per run.
(6) An option to add a trityl monitor that monitors trityl release during photoacid generation, thereby providing a measure of quality control at source. This is significant benefit for array fabrication, where fidelity of synthesis is important but post-synthetic purification is unavailable.
(7) An option to add a dynamic pH control circuit to enable use of photo-generators of strong acids and their associated higher light sensitivities for proton generation without lowering the pH of the oligonucleotide environment to the point where depurination becomes significant.

We also describe an alternative apparatus wherein solid films comprised of photoacid generator with or without polymer are created by flow of solution and gas phases within a flow cell that is combined with a photolithographic projection device. Delivery of solutions and solvents to the flow cell is from a DNA synthesiser or equivalent device for handling fluids. Parallel synthesis of a multiplicity of arrays is achieved by providing a multiplicity of photolithographic beams incident on either a multiplicity of flow cells or one or more large area flow cells each carrying substrates for two or more arrays. Options for pH control and monitoring of release of DMT$^+$ can be added.

Part 2

Addressing the Reversible Nature of the Deprotection Reaction

There nevertheless remained the issue of reversibility of the acid dependent detritylation step and its impact on acid requirement and synthetic yield. We therefore undertook a detailed quantitative study of acid-induced oligonucleotide detritylation in solid films of polymer on a planar glass surface (microscope slides).

The equilibrium constant K for the detritylation reaction as written in Equation (4) is given by:

$$K = \frac{[\text{HO-oligonucleotide}] \times [\text{DMT}^+]}{[\text{DMT-O-oligonucleotide}] \times [\text{HA}]} \qquad (6)$$

Rearrangement of Equation (6) gives:

$$\frac{[\text{DMT-O-oligonucleotide}]}{[\text{HO-oligonucleotide}]} = \frac{[\text{DMT}^+]}{K_{eq} \times [\text{HA}]} \qquad (7)$$

Detritylation approaches completion when the left hand term of Equation (7) approaches zero. This relationship gives five independent options for increasing the yield of deprotected oligonucleotide. They are:
(i) increase the value of K;
(ii) increase the concentration of photoacid;
(iii) enhance the diffusion of DMT$^+$ away from its production site;
(iv) repeat the detritylation step;
(v) remove DMT$^+$ with a scavenging reagent.

The last three of these five options form the basis of the invention described here. They can be considered in the context of the kinetics and equilibria of the detritylation reaction taking place at the interface between an inert planar surface, to which the oligonucleotides being synthesised are covalently attached by linker molecules, and are covered by a solid diffusion-restricting photoacid-generating film.

Option (i). Increase the value of K

A number of acid labile groups for the protection of the 5'- or 3'-oligonucleotide-OH group have been described over the past 40 years. Their susceptibility to acid varies. The dimethoxytrityl group has become established for oligonucleotide synthesis, and offers stability, ease of use, high acid-sensitivity, provision of a readily assayed product (the intensely coloured DMT$^+$ carbocation: Schaller et al, 1963) and commercial availability. The p-trimethoxytrityl group has also been explored (Smith et al, 1962), and found to give ten-fold higher rates of acid-dependent cleavage than its dimethoxy-homologue. This may also reflect the equilibrium constant, since the ionization of a series of p-methoxy-substituted triphenylcarbinols increased nearly ten fold on moving from the di- to tri-substituted compounds (Lund 1927). Despite that, in practical terms the necessity to synthesise and validate replacements for well-established dimethoxytritylnucleosides is unlikely to be worthwhile when simpler methods of improving detritylation yields are available. On the other hand, there may be some suitable dimethoxytrityl variants amongst the large number described by Fisher & Caruthers (1983).

Because the equilibrium constant as defined in Equation (6) is an apparent constant, it can be increased by use of acids of greater strength. Unfortunately such acids may increase the risk of oligonucleotide depurination. Furthermore, the photogenerators of stronger acids commonly used in the semiconductor industry, such as iodonium or sulphonium salts, undergo photolysis by mechanisms that apart from generating reactive free radicals also require hydrogen abstraction from the surrounding medium, which includes the oligonucleotides themselves. Goldberg et al (2005), revisiting the depurination problems met by Wallraff et al (1997) who had used a combination of strong photoacid acids and post exposure baking to achieve detritylation of surface attached DMT-oligonucleotides, reported that omission of this heating step in conjunction with 2.6-dinitrobenzyltosylate as the photoacid generator reduced depurination but gave acceptable detritylation.

Our own approach has concentrated on photogenerators based on substituted 2-nitrobenzyl esters of a weaker acid, trichloroacetic, which is ineffectual when used within poly (methylmethacrylate) film as used by Goldberg et al (2005). To achieve satisfactory detritylation photogenerated trichloroacetic acid requires to be used in a film other than one containing polymer with a high content of electronegative heteroatoms (Garland & Serafinowski, 2005). This does not exclude other photoacids such as aryl or alkyl sulphonates that may be used to esterify substituted 2-nitrobenzyl alcohols, but in general we believe it is preferable to reduce acid strength and find alternative ways of achieving full detritylation.

Option (ii). Increase the Intrafilm Acid Concentration

Figure 10A:
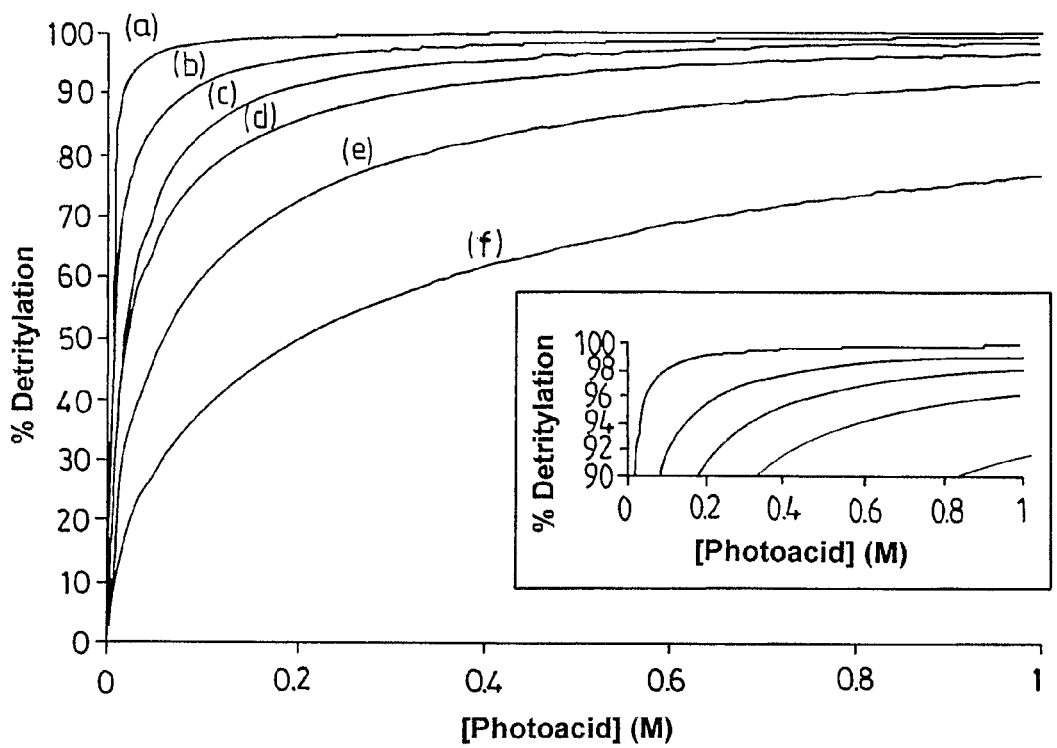
FIG. 10. Panel (a): the calculated effects of different equilibrium constants, acid concentrations and initial DMT-O-oligonucleotide concentration on the extent of detritylation. The values for K are apparent values based on total acid concentration. The insert is for the same data over the 90-100% detritylation range. Values for the equilibrium constant K and initial DMT-O-oligonucleotide concentration are (a) K=1, and 2 mM, (b) K=0 2, and 2 mM, (c) K=1, and 20 mM, (d) K=0.05, and 2 mM, (e) K=0.2, and 20 mM, (f) K=0.05, and 20 mM. The insert is for the same plots but showing only the region from 90-100% detritylation. Panel (b): experimentally determined effect of photogenerated trichloroacetic acid (HA) concentration, expressed as surface density (nmole/cm$^2$), on detritylation of DMT-T in a solid film. Film composed of poly(α-methylstyrene) and α-phenyl-(4,5-dimethoxy-2,6-dinitrophenoltri-chloroacetate) (1:1) by weight, plus DMT-T (1.1 nmole/cm$^2$). DMT$^+$ released measured at 510 nm, photoacid production at 384 nm. The film thickness was c.1.0 μm, and an area density of 1.0 nmol/cm$^2$ corresponds to an intrafilm concentration of 10 mM. Irradiation was at 365 nm.
Figure 10B:
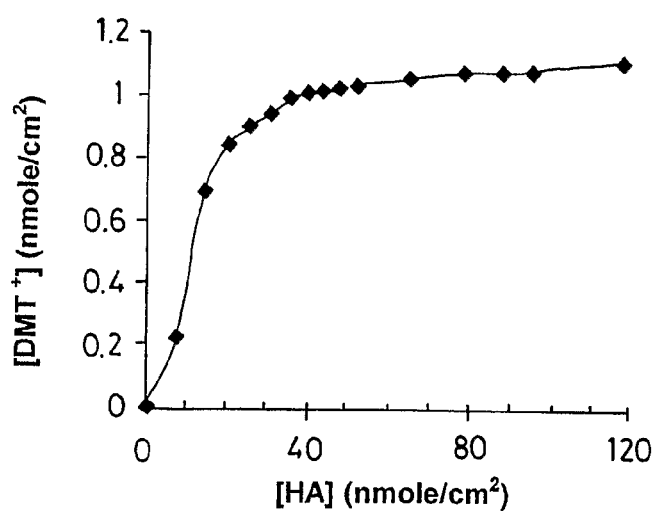
Figure 12A:
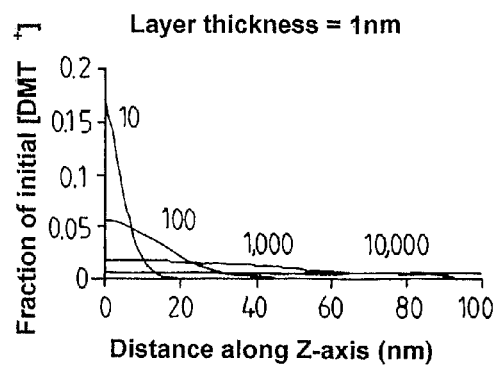
FIG. 12. Computer simulations of the effects of oligonucleotide layer thickness on the Z-axis concentration profiles of DMT$^+$ following diffusion. The model is based on random molecular jumps in a one dimension model with a mean jump distance of ±1 nm. In each Panel the title gives the thickness of the oligonucleotide layer. The film of polymer plus photoacid generator including the oligonucleotide layer is 500 nm thick. Plots are for 10, 100, 1,000 and 10,000 diffusional jumps, as labeled in the Figure. In Panels (a) to (e) the DMT$^+$ concentrations are expressed as fractions of the initial concentration before diffusion. In Panel (f), which like Panel (e) is for an initial thickness value of 20 nm, the initial DMT$^+$ concentration has been divided by 20 to compensate for the 20-fold dilution of DMT$^+$ compared with Panel (a), where the initial thickness value is 1 nm.
Figure 12B:
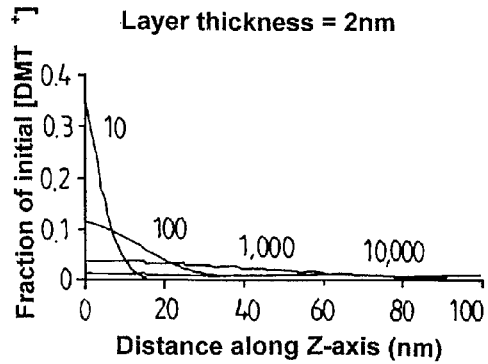
Figure 12C:
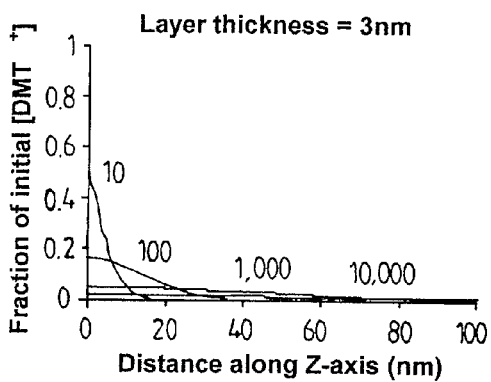
Figure 12D:
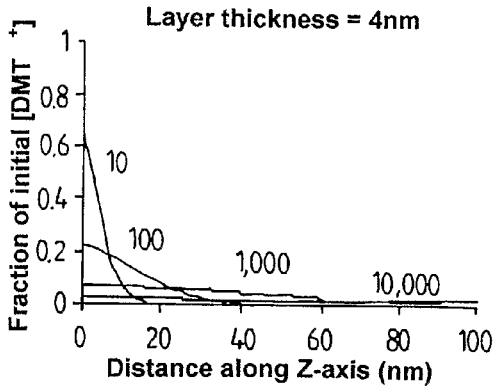
Figure 12E:
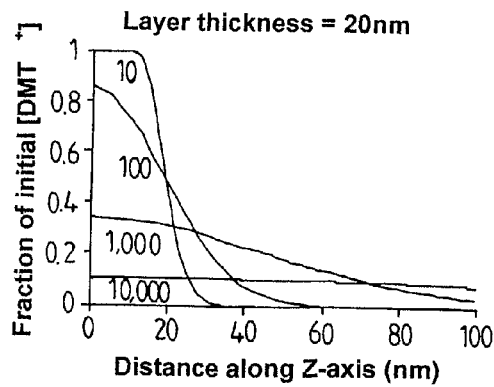
Figure 12F:
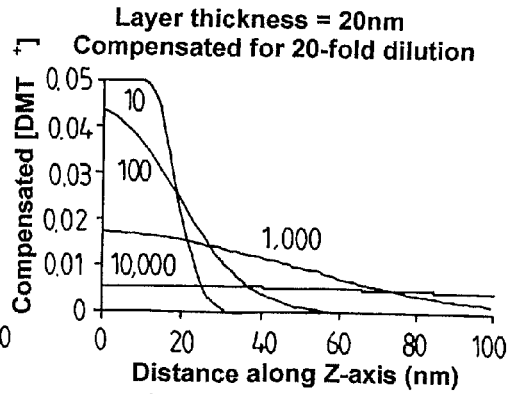

FIG. 10($a$) shows the calculated effect of increasing acid concentration on the percentage extent of detritylation for a range of $K_{eq}$ values. The most noticeable feature is the progressively increasing difficulty with which detritylation moves beyond 90%. Driving detritylation from say 95% to >99% completion by increasing acid concentration is essentially a brute force method, requiring large increases in photoacid concentration and the accompanying depurination risk. The requirement for high concentrations of photogenerated acid also increases the light energies required to achieve adequate detritylation. An experimental equivalent is shown in FIG. 10($b$) for detritylation of DMT-T incorporated in a solid film of polymer and photoacid generator. The sigmoid curve differs from the theoretical curve, and may be due to interactions between the photoacid and the changing concentrations of its ester precursor and substituted nitrosobenzophenone photoproduct. The slow approach to a maximal value for DMT$^+$ release is nevertheless seen as the photoacid concentration is increased.

Option (iii). Increase Rates of Intrafilm Diffusion

The scheme of FIG. 11 shows four different formats for a detritylation reaction, and the spatial distribution of the products and reactants in each. In panel (a) the oligonucleotide is attached to the surface of a solid support in contact with a solution of acid that slowly flows across the surface. The combination of flow and diffusion removes DMT$^+$ from its site of production at the surface, enabling the detritylation reaction to proceed to completion.

Panels (b) and (c) of FIG. 11 introduce the concept that oligonucleotides attached to a solid support and overlaid by a diffusion-restricting solid occupy a distinct compartment, separated from the bulk of the film by a kinetic barrier. Thus, unless steps are taken to facilitate removal of DMT$^+$ from its site of production in the oligonucleotide layer, the detritylation reaction will go to an equilibrium that falls short of completion on any practical time scale. The oligonucleotide layer attached to the underlying solid substrate, typically glass, is a molecular monolayer. The length of fully extended single stranded DNA is approximately 1 nm per base, so the maximum thickness of the layer of oligonucleotide attached to a planar surface will increase from 1 to 25 nm as the chain length increases from 1 to 25 bases, to which can be added the contribution of linker molecules attaching oligonucleotide to the underlying surface. The folding of oligonucleotide chains will lower the thickness of the oligonucleotide monolayer, but it will still occupy only a small fraction of a photoacid generating film that is typically 200-2000 nm thick. Any diffusion of DMT$^+$ along an axis perpendicular to the planar surface (Z-axis diffusion) will lower the concentration of DMT$^+$ in the oligonucleotide layer and allow detritylation for a given photoacid concentration to proceed further towards completion.

In panel (d) the DMT-oligonucleotide is not attached to a surface, but is distributed uniformly throughout the photosensitive film. There is no possibility for removing DMT$^+$ by diffusion: the only exit route from the film is to leave at the air/film interface, and is unavailable to non-volatile molecules. The arrangement shown in FIG. 11($d$), a film with uniformly distributed oligonucleotide, is useful experimentally, and we have used it to measure the apparent equilibrium constant $K_{eq}$ for the detritylation reaction given in Equation (6), for deprotection of the 5'—OH group of thymidine blocked by DMT.

Critics (Sierzchala et al, 2003) of the use of solid films for the detritylation step in oligonucleotide array synthesis have regarded the film as a single reaction compartment as drawn in FIG. 11($d$), and so failed to recognize that the film itself can act as diffusionally accessible volume adjacent to the reaction surface, as drawn in FIG. 11($c$). The film is analogous to the liquid phase of conventional oligonucleotide synthesis: it provides acid for the detritylation step, and a space into which DMT$^+$ can diffuse. Solid and liquid films differ primarily in the diffusion-controlled rate at which reactants and products of detritylation formed at a planar surface attain electrochemical equilibrium with the body of a contacted film, either liquid or solid. The essential difference is quantitative, not qualitative.

The kinetics of photoacid generation and detritylation in solid films can be followed spectrophotometrically during photolytic illumination (Garland & Serafinowski, 2006). When this is done with 5'-O-dimethoxytritylthymidine (DMT-T) uniformly distributed in a film of polymer (FIG. 11, panel (d)) using incident light energy levels that cause only partial detritylation, the cessation of illumination is followed by cessation of detritylation within 5-10 s, despite the continued presence of photoacid and DMT-T in the film. Brief renewal of illumination briefly renews detritylation, and so on until no further detritylation is observed. These observations demonstrate that photoacid dependent detritylation in solid films of polymer is rapid and close to its equilibrium position.

This is also the case when the DMT-T is distributed throughout a film composed of a photoacid generator without polymer. Incomplete detritylation in these environments arises because of the equilibrium position, not failure to reach it.

When similar experiments were performed with DMT-T covalently attached to glass surfaces covered with a film containing photoacid generator (FIG. 11, panel (b) and (c)) detritylation as measured by $DMT^+$ release was biphasic; it occurred not only during illumination but more slowly over several minutes following cessation of illumination. The rapid phase during illumination can be attributed to establishment of local equilibrium at the oligonucleotide layer in response to photoacid generation, whereas the slower phase is attributable to readjustment of the equilibrium in response to diffusional movement of $DMT^+$ away from the oligonucleotide layer. Diffusion of photoacid in the opposite direction to make up for that consumed in detritylation may also contribute to the slow phase. Both the theoretical arguments given above and the experimental observations suggest that one way to increase the rate and extent of photoacid-dependent detritylation would be to increase the rates of diffusion in the photoacid-generating film.

But the whole purpose of using a solid environment for the detritylation step of oligonucleotide synthesis in array fabrication is to prevent translational diffusion of photoacid that would otherwise degrade photolithographic resolution. On the other hand complete loss of diffusional movement would prevent collision-dependent chemical reactions, which obviously is not what happens in photolithography using photoresists, or in our observations of photoacid-induced detritylation in solid films. So how much diffusion can be tolerated?

The Einstein-Smoluchowski Equation (8) for one dimensional diffusion describes the relationship between the mean square diffusion distance and time, where $<x^2>$ is the mean square diffusion distance, t the time and D the diffusion coefficient (Bergethon & Simmons, 1989):

$$<x^2>=2Dt \quad (8)$$

An important consequence of this relationship is that diffusion in a given time interval can be substantial over a short distance such as 100-200 nm yet insignificant over 1-2 μm.

Numerical rather than analytical methods (Crank & Park, 1968), can be used for computer-simulation of translational diffusion. They are easily set up for Fickian diffusion using a random walk model, where the diffusing molecules move by means of a randomly directed jump of length±1. For one dimensional diffusion the mean square jump distance $<l^2>$ is related to the diffusion coefficient D according to Equation (9), where τ is the jump period or 1/τ is the jump frequency (Bergethon & Simmons, 1989):

$$D=<l^2>/2\tau \quad (9)$$

A simple virtual experiment demonstrates the use of modeling. A layer of oligonucleotides covalently attached to a solid planar surface and covered with a photosensitive film of polymer and photoacid generator will occupy a thin layer that increases with the length chain length, but is only a small fraction of the thickness of the overlying photosensitive film. A brief but intense flash of light generates photoacid throughout the film, followed rapidly by $DMT^+$ formation and acid consumption in the thin layer containing the oligonucleotides. Although the reactants in the thin volume may rapidly reach a local equilibrium, they are not in equilibrium with the remainder of the film. Thus following photoacid generation and establishment of local equilibrium, diffusional movement of acid from the overlying film into the layer and of $DMT^+$ in the opposite direction will move the detritylation reaction further towards completion.

FIG. 12 shows the calculated Z-axis concentration profiles for $DMT^+$ resulting from such an experiment. Panels (a) to (e) are for increasing thickness of the oligonucleotide layer, and in each panel curves are shown for the profile after 10, $10^2$, $10^3$ and $10^4$ diffusional jumps that have a mean distance along the Z-axis of ±1 nm. Jumps at the interface of the film with the underlying substrate or air are reflected back into the film. If in each case the diffusional time was 100 sec, the corresponding jump frequencies would be $10^{-1}$ 1, 10 and $10^2$ Hz, corresponding to one-dimensional diffusion coefficients given by Equation (8) of 0.05, 0.5, 5 and 50 $nm^2$ $sec^{-1}$. The initial pre-diffusional concentration of $DMT^+$ in the oligonucleotide layer diminishes as the length of oligonucleotides increases, and compensates for the slower rates of fall as the thickness of the oligonucleotide film increases.

Figure 13A:
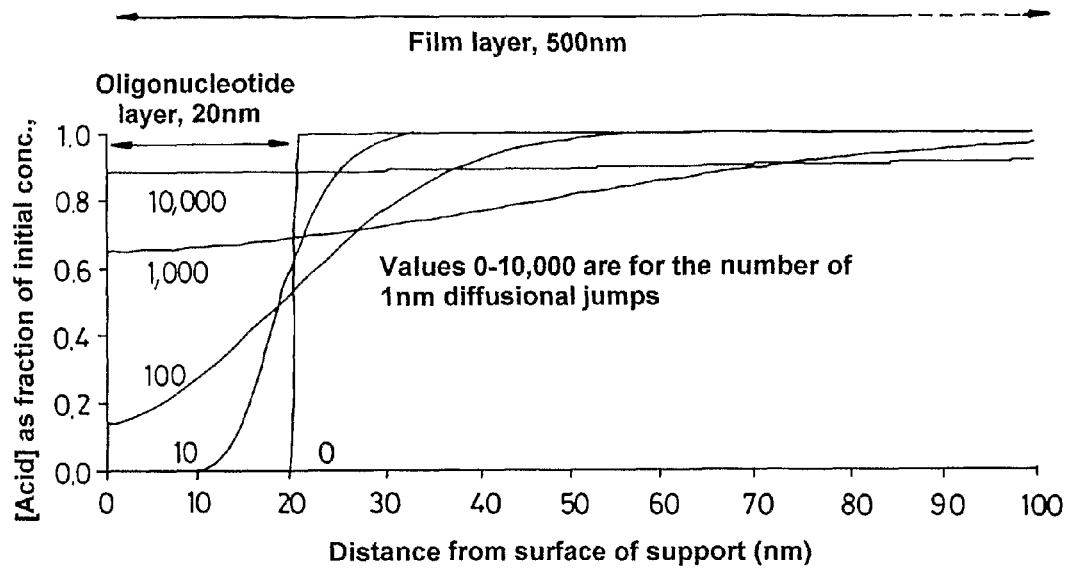
FIG. 13. The results of computer simulations of the Z-axis concentration profiles of a photoacid (TCA) following its depletion in the oligonucleotide layer. Random jump diffusional model as in FIG. 11. Depletion of acid in the oligonucleotide layer is instantaneous, followed by diffusional recovery from acid in the overlying film. The thickness of the film is 500 nm, but only the part of the film closer to the support surface is shown. Panel (a) Oligonucleotide layer 20 nm thick Panel (b) oligonucleotide layer 5 nm thick.
Figure 13B:
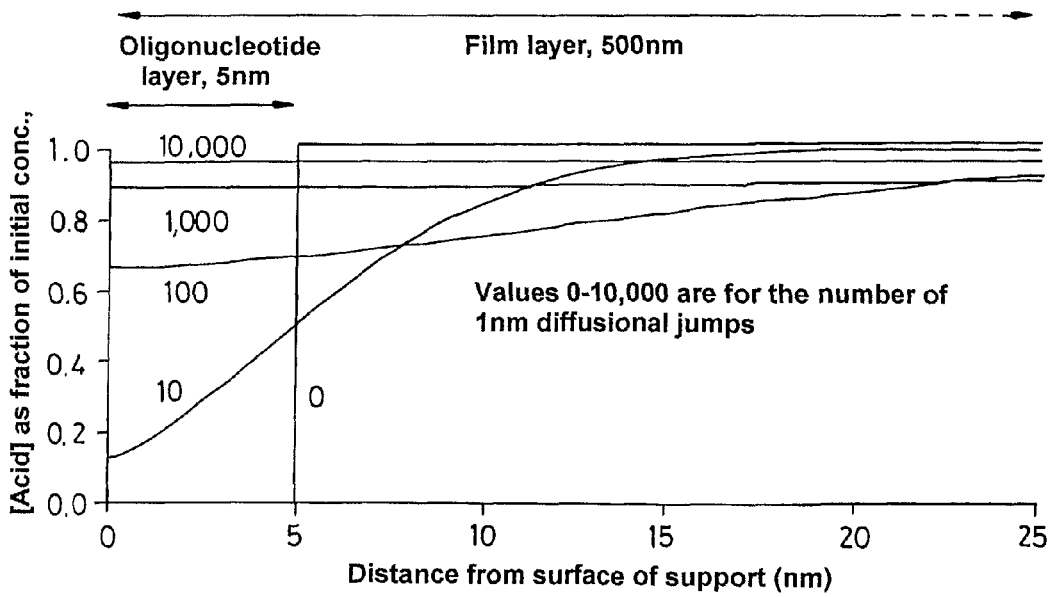

FIG. 13 shows concentration profiles for photoacid (TCA) for the same virtual experiment. In a real experiment the surface area density of oligonucleotide will be c.20 pmoles $cm^{-1}$, which in a 10 nm layer gives a concentration of 20 mM. This is significant compared to the intrafilm photoacid concentration of c.125 mM obtained when a photoacid generator such as the trichloroacetate ester of a substituted 2-nitrobenzyl alcohol present as 20% by weight in a polystyrene film is 25% photolysed. Thus some depletion of photoacid in the oligonucleotide layer is inevitable, but it is likely to be temporary while diffusion equilibrates the concentrations in the oligonucleotide layer and the overlying film.

The diffusion coefficients for volatile photoacids can be obtained experimentally by measuring the rate of their loss from thin films by Z-axis diffusion. Alternatively, and also applicable to non-volatile photoacids, a patterned photolysis method can be used (Garland & Serafinowski, 2006. See also Smith & McConnell, 1978). Z-axis diffusion of $DMT^+$ is less readily measured, but may be slower than photoacid although effects of molecular size are not great for relatively small differences (Crank & Park, 1968). The kinetics and extent of photoacid-dependent detritylation of surface-attached oligonucleotides can be directly measured with a sensitive spectrophotometer, both during and after illumination.

Thus the necessary analytical tools are in place for determining the effects on detritylation resulting from variations of the diffusion-restricting properties of the photoacid-containing solid film (Garland & Serafinowski, 2006). Using these methods we determined that the diffusion coefficient for trichloroacetic acid in a thin film of the trichloroacetate ester of 4,5-dimethoxy-2-nitrobenzyl alcohol or 4,5-dimethoxy-2, 6-nitrobenzyl alcohol at ambient temperature is c.30 $nm^2$ $s^{-1}$. This value is at least 100-fold greater than that reported by Schlegel et al (1991) for diffusion of methanesulfonic acid in a photoresist at 70° C. In keeping with this high value we observed that illuminated films of either of these two nitrobenzyl-based photoacid generators could accomplish $\geq 98\%$ detritylation of 5'-O-dimethoxytritylthymidine covalently attached through its 3'—OH by a linker to glass microscope slides.

The situation with the same photoacid generators when present as a minority component (<20%) in a film of a preferred polymer such as poly(α-methyl styrene) is different: in this environment at 20° C. the diffusion coefficient of TCA is $\leq 1$ $nm^2s^{-1}$. This low value is unsurprising in view of the ability of thin films of many polymers used as photoresists to support photolithographic resolutions as small as 200 nm, and to prevent diffusion of various vapor phase reagents (Wallraff & Hinsberg, 1999; Pease et al, 1988).

Figure 14:
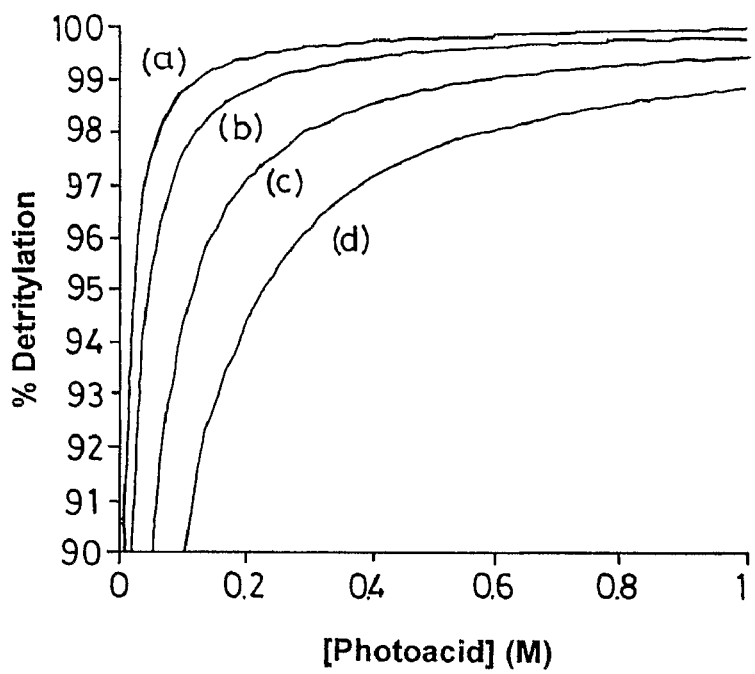
FIG. 14. Calculated effects of DMT$^+$ diffusion on the extent of detritylation of DMT-oligonucleotide attached to a solid surface and covered with a film containing a photoacid generator. The apparent equilibrium constant K for the detritylation reaction, with the total undissociated acid rather than H$^+$ as the reactant, was set at 1.5. The reduction of [DMT$^+$] in the surface layer of oligonucleotide through diffusional loss to the overlying film was 90, 80, 50 and 0% for curves (a), (b), (c) and (d) respectively FIG. 15. Calculated effects of a repeated detritylation step on the extent of detritylation of DMT-oligonucleotide. The oligonucleotide is attached to a solid surface and covered with a film containing a photoacid generator. No effects of DMT$^+$ diffusion from the surface layer into the overlying film are included. As in FIG. 13, K$_{app}$, the apparent equilibrium constant for the detritylation reaction, with the total undissociated acid rather than H+ as the reactant, was set at 1.5. The insert is an expanded region from 90-100% detritylation. The plots are for either one or two detritylation steps, as labeled.

DMT$^+$ can also diffuse, presumably as its ion pair with the trichloracetate anion. FIG. 14 shows the calculated extent of detritylation when diffusion lowers the concentration of DMT$^+$ within the oligonucleotide layer by 50, 80 and 90%. The effect on detritylation is considerable: a 10-fold reduction of [DMT$^+$] in the oligonucleotide layer reduces the photoacid concentration required to achieve 99% detritylation by an order of magnitude.

Option (iv). Repeat the Detritylation Step.

If the fractional yield for a single detritylation step is Y, then the overall fractional yield for two such steps in series is given by Y+(1−Y)Y. Thus if Y=0.9, the overall yield is 0.99. An unacceptable one-step yield of 90% becomes an acceptable two-step yield of 99%. The requirement to maintain unchanged registration of patterned illumination on the array for two consecutive steps with identical patterns is no different from that required for the 80-100 non-identical patterns throughout the whole of photodirected array synthesis of 20- or 25-mer oligonucleotides.

Option (v) Removal of DMT$^+$ with a Scavenging Agent

The removal of acid-released DMT$^+$ or other carbocations by means of scavenging agents was introduced for peptide chemistry by Brenner et al (1984) and Davison et al (1987) who used triethylsilane as the scavenger, for peptide synthesis by Pearson et al (1989) and Mehta et al (1992) who used either triethylsilane or tri(iso-propyly)silane, and for solution phase oligonucleotide synthesis by Reese et al (1986) who used pyrrole. Ravikumar et al (1996) extended the use of carbocation scavenging to conventional oligonucleotide synthesis on controlled porosity glass, adding scavenging reagents to the acid solution used to remove trityl groups from oligonucleotides bound to the solid phase. The overall synthetic yield for a 20-mer oligonucleotide was 84%, corresponding to a stepwise synthetic yield of 99.1%.

The list of compounds that have been advocated or used as carbocation scavenging agents includes anisole, thioanisole, benzyl-mercaptan, ethanediol, pyrrole and numerous tertiary silanes. Thiophen, furan and indole, substituted or as such, may also serve to react with carbocations. Not all of these will be suitable for scavenging DMT$^+$ or related carbocations in solid polymer films: the reaction rate may be too slow for usefulness, the reaction with the carbocation may be reversible, unwanted side reactions may occur, and hydrogen bonding between scavenger and carboxylic photoacid may cause unacceptable weakening of the latter. In our own experience pyrroles and indoles incorporated in a polymer film containing a substituted 2-nitrobenzyl ester react rapidly with DMT$^+$ generated by exposure to 365 nm light, but also undergo or participate in unwanted side reactions that result in cross linking of the polymer and numerous uncharacterized changes in the UV-visible absorption spectrum. These undesirable effects were not detected with tri-substituted silylhydrides such as triethyl- or triphenylsilane.

Of the five options described above, the last three form the basis of our present invention. In each case the equilibrium position of the detritylation reaction is moved towards complete detritylation by removal of DMT$^+$, without the increased risks of nucleotide damage that accompany provision of either more or stronger acid, or prolonged exposure to acid. The three methods that we describe for moving the equilibrium position of photoacid-dependent detritylation in solid films towards completion are applicable to any photoacid, irrespective of whether it is strong or weak. The photoacid generator can be ionic or non-ionic, monomeric, oligomeric or polymeric. Furthermore, in the case where detritylation is effected with an acid in the gas phase (Pease et al, 1998), a carbocation scavenger such as a low boiling point silane (e.g. trimethysilane) can be included in that phase.

The three options that form the basis of our invention, each of which involves removal of unwanted product from a reversible acid-dependent deprotection reaction, are independent of the structure of the carbocation released by the action of acid on the protecting group. Thus acid-labile protecting groups that would fall within the scope of application of the methods include the following: trityl groups such as triphenylmethyl, mono-, di- and tri-methoxy triphenylmethyl, other substituted triphenylmethyl groups (e.g. Fisher & Carruthers, 1983; Letsinger & Finan, 1975; Goertz & Seliger, 1983; Shchepinov & Southern, 2005); 1-naphthyldiphenylmethyl, 9-phenylxanthine-9-ylmethyl or "Pixyl" (Chattopadhyaya & Reese, 1978); substituted Pixyl (e.g. 9-(p-tolyl) xanthen-9-ylmethyl and 9-(p-methoxyphenylxanthen-9-ylmethyl (Gaffney et al, 1991)); and 1,1-bis-(4-methoxyphenyl)-1'-pyrenylmethyl, (Fourrey et al, 1987). Other acid-labile groups that give reversible protection of oligonucleotide hydroxyl groups and are released as carbocations trappable by scavengers include t-butyl, t-butoxycarbonyl, and fluorenemethoxycarbonyl.

The concentrations of silanes required to achieve useful rates of carbocation scavenging in solid films of polymer and photoacid generator is sufficiently high for them to also act as plasticizers. Indeed, one plasticizer that we have used is triphenylmethane, closely related in size and structure to the scavenger triphenylsilane. The action of triphenylsilane in removing DMT$^+$ from its site of production in the oligonucleotide layer is therefore two-fold, a combination of chemical scavenging and enhanced diffusional loss.

The ability of silanes to scavenge DMT$^+$ carbocations generated by the action of acid on a tritylether in the solid state can also be exploited in a further format for array fabrication. Pease et al (1998) and Xu & Golberg (2004) described the use of acid in the gas phase to deprotect DMT-oligonucleotides in an array format. Photodirection was obtained by use of physical masks, such as photolithographically patterned resists, that determined whether a given array element was accessible or not to a gas-phase reactant. "Complete" detritylation was reported using trichloroacetic acid vapor, but more quantitative measurements were not given. It would not be surprising if the use of acid vapor gave a shortfall in the extent of detritylation, because the acid-released DMT$^+$ remains at it site of production until both it and any residual acid are washed away. Inclusion with the acid vapor of a gaseous hydride donor, such as trimethylsilane or the vapor from a volatile di- or tri-substituted silane, should ensure achievement and maintenance of complete detritylation.

The effects of the composition of solid films of organic polymers on the diffusion coefficients of photoacids are highly relevant for photolithographic methods within the semiconductor industry (Wallraff & Hinsberg, 1999), where the aim is invariably to minimize diffusion. To this end it is normal practice to subject newly cast films of polymer and photoacid generator to a pre-exposure bake at 90-100° C. or higher for 1-5 min prior to photolithography in order to remove residual solvent remaining from the casting solution. Schlegel et al (1991) reported that solvent traces in films caused very strong increases of acid mobility. We have not used pre-exposure baking for our studies on detritylation of oligonucleotides by photoacid generated in films composed entirely of photoacid generators (trichloroacetate esters of substituted 2-nitrobenzyl alcohols). We observed diffusion coefficients for trichloroacetic acid of c.30 nm$^2$s$^{-1}$ at ambient temperature, at least 100-fold greater than that reported by Schlegel et al (1991) for methane sulphonic acid in a photoresist film at 70° C. that had previously received a pre-exposure bake of 120° C. for 60 s. This high diffusion rate of photoacid in our experiments suggest that the diffusion rate of $DMT^+$ would also be high, and is probably an essential factor underlying our ability to achieve >98% photoacid-dependent detritylation of an oligonucleotide attached to glass overlain with a solid film of the photoacid generator.

Diffusion would ultimately equilibrate all electrochemical activities in the films if left long enough following photoacid generation, but there are practical limits to the time allowable, especially during a process such as the fabrication of oligonucleotide arrays where the detritylation step must be repeated 80 to 100 times to obtain chain lengths of 20 to 25. A period of 60 s would be acceptable, and for that purpose diffusion coefficients would need to be around 25-50 $nm^2 s^{-1}$. In practice, and unlike the virtual experiments described above where photoacid generation was instantaneous, Z-axis diffusion of $DMT^+$ away from the oligonucleotide layer would start as soon as detritylation commenced during photoacid generation, as would the opposite movement of photoacid to replenish that consumed. Diffusional movement of ions over the distances involved in this process must be electroneutral, and there are built in possibilities to achieve this. Thus $DMT^+$ can diffuse as its uncharged ion pair with photoacid anion, or in exchange for a proton. If the photoacid generator and its anion are immobile a diffusible ion pair mechanism is ruled out, but exchange hopping by protons and $DMT^+$ on the immobilized photoacid is not.

We indicated above three potentially useful methods for overcoming the reversibility problem: enhanced intrafilm diffusion, repetition of the detritylation step, and carbocation scavenging. We will describe their implementation under the same three headings. They all apply to the basic scheme for oligonucleotide synthesis shown in FIG. 9, with the provision that the detritylation step takes place in a solid film in which an acid is generated photochemically and the growing oligonucleotides are covalently attached to the surface of an underlying planar support ("substrate") as in FIG. 11, panels (b) and (c). The choice of photoacid generator or photoacid does not affect the scheme or its implementation. Apart from the detritylation step, all other steps take place with the solid surface support and its attached oligonucleotide layer exposed to reagents in solution or to wash solvents, and are standard procedures implemented by commercially available oligonucleotide synthesizers that deliver a programmed supply of solutions or solvents to a column (normally) or a flow cell or alternative chamber (for photodirected synthesis).

Figure 9:
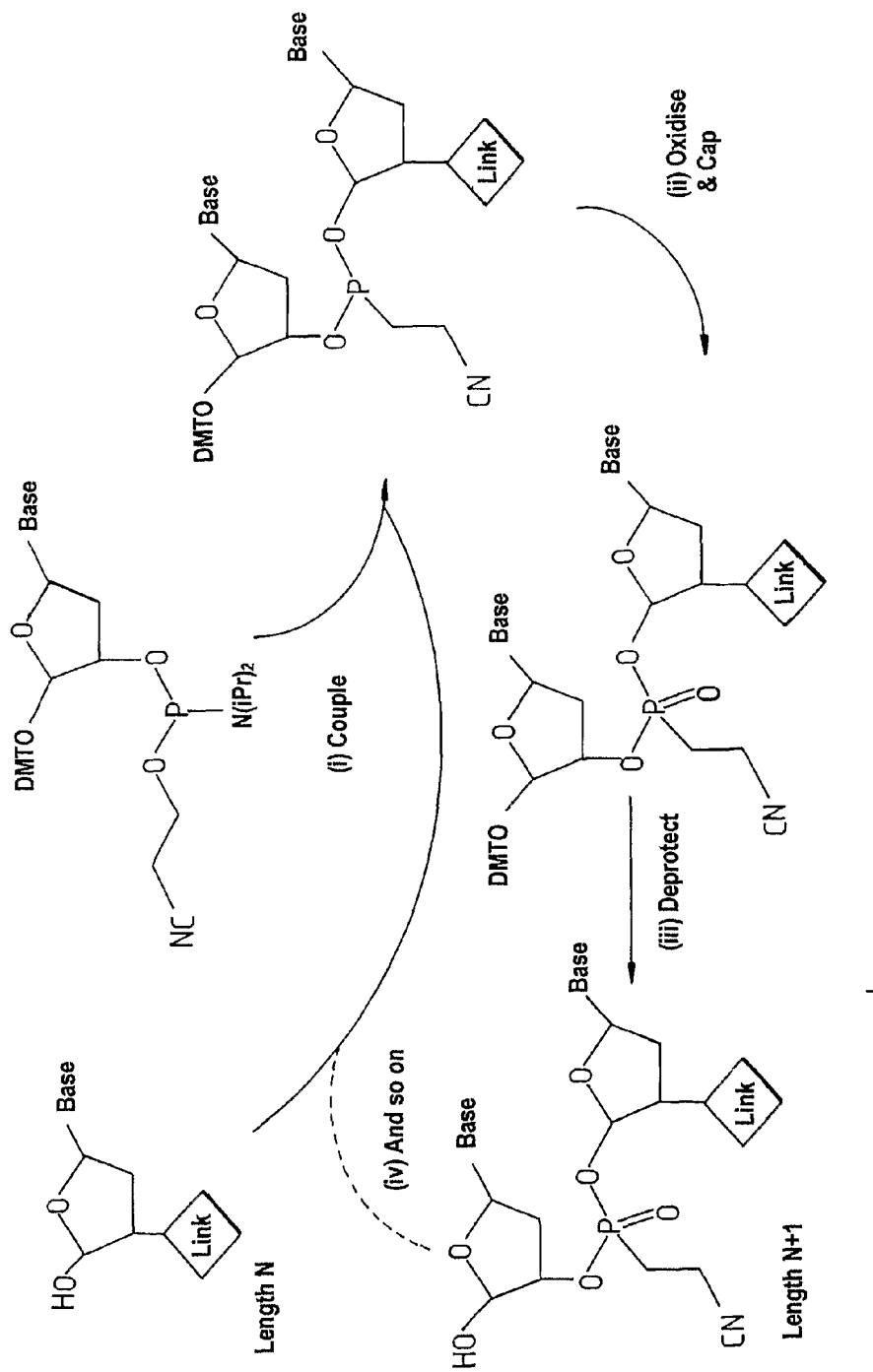
FIG. 9. An outline scheme of the chemical steps for extending an oligonucleotide chain by one nucleotide at a time (after Sierzchala et al, 2004).

For photodirected synthesis, the additions to the scheme of FIG. 9 are at the deprotection step. They are:
(a) Casting a solid film containing photoacid generator on a planar support from a solution of photoacid generator, film-forming polymer if needed or desired, any further additions, all in a low boiling point solvent such as dichloromethane or chloroform.
(b) Patterned illumination of the film at an appropriate wavelength, typically 365 or 405 nm, to create the desired spatial distribution of sequences.
(c) Removal of the film with a wash solvent such as dichloromethane or acetonitrile, preferably containing a weak base to neutralize photoacid on contact.

Film casting can be achieved in a variety of ways as described in Garland & Serafinowski (2006): they do not affect the underlying chemistry or application of the enhancements described here. Illumination is historically with a high pressure Hg arc at 365 or 405 nm, but that limited choice is expanding through the availability of highly-efficient long-lived light emitting diodes, either singly or in arrays, with increased power and near UV or violet emission wavelengths. There are two optional variants to the sequence of cast/illuminate/remove the film. One is to repeat the sequence to achieve higher detritylation, the other is to heat the film at some stage between the onset of illumination and film removal.

It is against the foregoing background that our present invention is practiced. The common purpose of the differing implementations of our invention is to increase the extent of the reversible detritylation reaction when carried out in a solid diffusion-restricting film. As summarized above there are three general methods for meeting that purpose, and our more detailed descriptions are classified in the same way.

(1) Increase the intrafilm diffusion coefficients of those products and reactants that are not tethered to the solid substrate. In general the mean diffusion path of the photoacid during the period of illumination and any following dark period acid should be <5% and preferably <2% of the shorter dimension in the X,Y plane of a rectangular array element, otherwise unacceptable loss of photolithographic resolution may result. The sigmoidal relationship between photoacid concentration and detritylation acts advantageously in this context, because low concentration of photoacids as will occur at the further reaches of diffusion are without significant effect. For practical reasons the total time that the array is exposed to acid during any one synthetic cycle should be minimized, and the stronger the photoacid the greater the need to reduce exposure to it. Equations (7), (8) and (9) and numerical simulation as used in FIGS. 12, 13, 14 and 15 enable the effects of post-illumination Z-axis diffusion to be calculated for given initial equilibrium values achieved during illumination. For example, we estimate that if illumination without diffusive loss of $DMT^+$ from the oligonucleotide layer achieved 90% detritylation, increasing the diffusion coefficient of $DMT^+$ to 30-50 $nm^{2\ l\ s^{-1}}$ would increase the detritylation yield to 99% in 60 s without further illumination.

Figure 15:
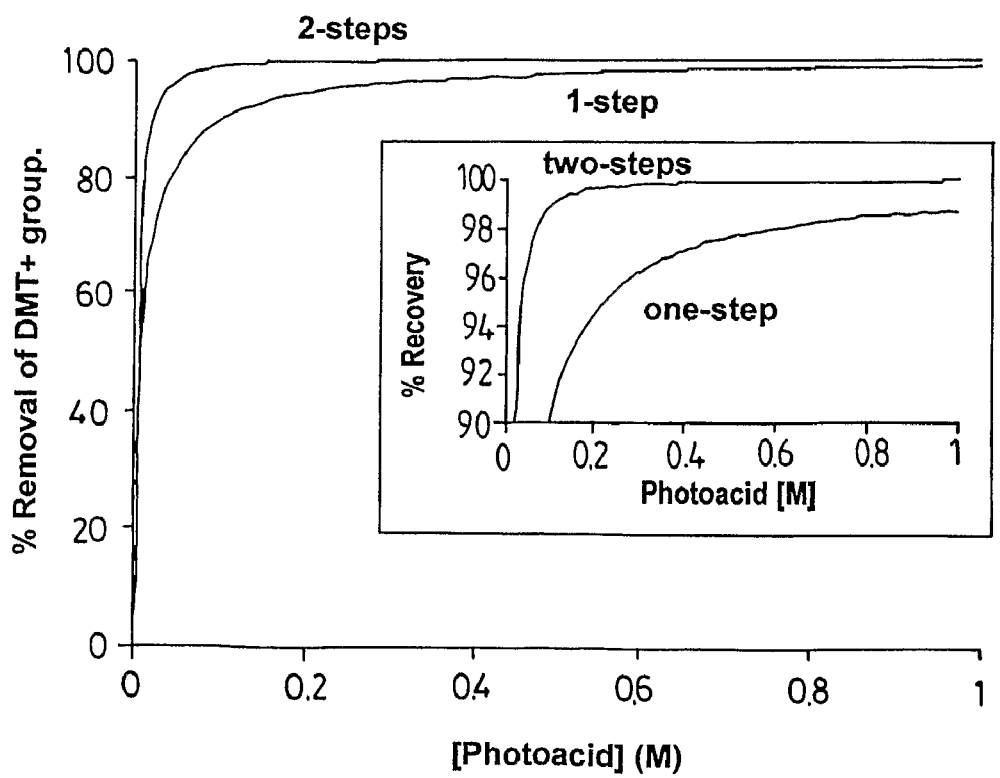
Figure 16:
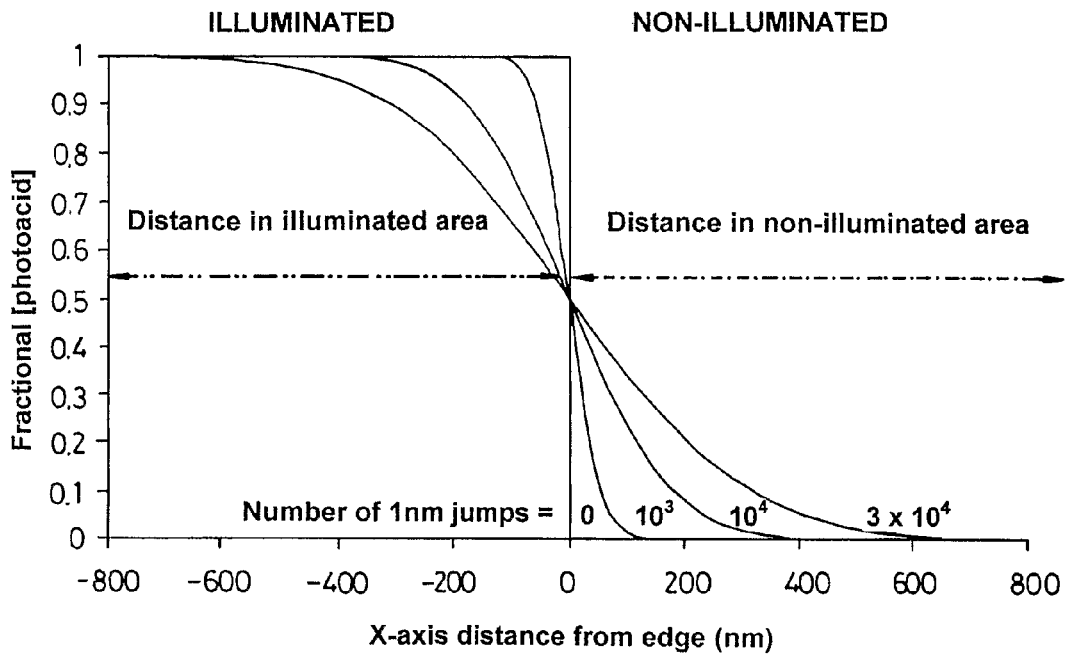
FIG. 16. Computer simulated X- or Y-axis concentration profiles of photoacid concentrations. The model is for one-dimensional diffusion of photoacid in the plane of the film (X, Y axes) following rapid photogeneration from an illuminated stripe 4 µm wide. Diffusion is into the adjacent non-illuminated area on one side of the stripe and along an axis normal to the edge of the stripe. The interface between illuminated and non-illuminated is at 0 nm on the X-axis of the diagram. The mean diffusional jump distance was ±1 nm, and concentration profiles are shown after 0, $10^3$, $10^4$ and $3 \times 10^4$ such jumps. No allowance has been made for the effects of light diffraction on the boundary between illuminated and non-illuminated areas.

Because photoacid will also diffuse, the question then is how does diffusion affect photolithographic resolution in the X-Y plane? FIG. 15 shows computer simulated concentration profiles for photoacid along an X axis in the plane of the film and normal to the edge of an illuminated area, which it traverses. As with FIGS. 12 and 13 for Z-axis diffusion, a mean jump distance of ±1 nm is used. As can be seen from FIG. 15, photoacid diffuses into the non-illuminated area. The concentration of photoacid beyond 300 nm from the edge of the illuminated area remains at <0.01 of that in the illuminated area, unless >$10^4$ diffusional jumps have occurred. Reference to FIG. 12 shows that the same number of jumps in the Z-axis would lower the concentration of $DMT^+$ in the oligonucleotide layer ten-fold, a fall that would increase detritylation from 90% to 99% (FIG. 12).

Figure 17:
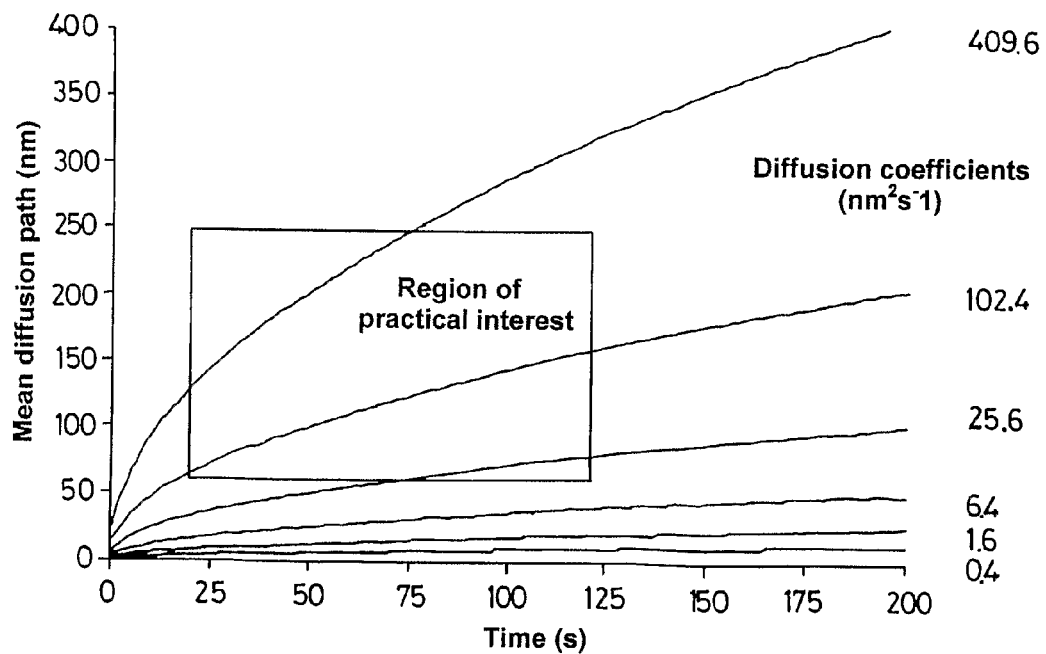
FIG. 17. Dependence of the mean diffusion distance for one-dimensional diffusion with time, for a range of diffusion coefficients. Calculations were made using the Einstein-Smoluchowski equation. The diffusion coefficient as $nm^2 s^{-1}$ is shown to the right of each curve. The area defined by a rectangle and labeled as a region of practical interest covers the region where the time scale between 20 and 120 sec might be suitable for a step in an automated oligonucleotide synthesis, and the mean diffusion distance of 50 to 250 nm sufficiently large to cause a several fold or greater fall of the concentration of DMT+ at an oligonucleotide-bearing surface covered with a solid film in which photoacid is generated, as drawn in FIG. 11(c), without causing loss of photolithographic resolution at the 0.5 µm level.

The dependence of the mean one-dimensional diffusion distance on time and a range of diffusion coefficients can be calculated directly from the Einstein-Smoluchowski equation, as shown in FIG. 17, where we have defined an area embracing a range of values for the three variables of (a) diffusion distance in the range 50-250 nm (b) diffusion time in the range 20-120 s and (c) diffusion coefficient. The ranges are those likely to be of practical interest for oligonucleotide array synthesis. There are trade-offs between the increase of diffusion and the length of time following photoacid generation before removal of the film: the higher the diffusion coefficients the shorter the time allowed for diffusion.

Methods of enhancing diffusion within polymers are well known (Crank & Parks, 1968), and may be used to increase diffusion of DMT⁺ and photoacid for achieving improved extents of photoacid dependent detritylation. The preferred polymers are those that lack electronegative heteroatoms. The methods are heat, selection of polymer, and inclusion of low molecular weight plasticizers. Heat is an unattractive option. Polymer selection is primarily determined by absence of electronegative heteroatoms, solubility, film forming properties and availability. But in general of the polymers that satisfy the foregoing criteria, the preferred ones have low average molecular weights, in the range 1,000-3,000. Inexpensive and readily available examples include poly(α-methylstyrene), poly(styrene-co-α-methylstyrene), and hydrogenated poly (styrene-co-indene).

Commonly used industrial polymer plasticizers contain high proportions of electronegative atoms, frequently oxygen in esters. Such plasticizers are unsuitable for use in conjunction with photoacids other than strong ones because of their ability to form hydrogen bonds with the undissociated acid hydrogen, and thereby increase the apparent $pK_a$: i.e. the acid is weakened. Plasticizers free of heteroatoms are suitable; they do not form hydrogen bonds and so avoid weakening photoacids by that means. A selection is shown below. It includes some that are technically dimmers only in so far as they may be synthesised from two or more identical precursors, even though the final structure bears little resemblance to a linear or cyclic polymer. Some others are dimmers or even trimmer. The majority have aryl groups, as in polystyrenes, or cycloalkane groups. All have melting points $\geq 25°$ C., and mol. wt<1000. Oligomeric methylenes or ethylenes are not shown: they have poor solubility properties. Liquids can also increase intrafilm diffusion, and for this reason solid films that are to be subject to photolithographic exposure are normally subjected to a pre-exposure baking step, to remove residual solvent. We have not found this step to be necessary, possibly because of the low boiling point of the solvent used (dichloromethane, 40° C.).

TABLE 1

Examples of some hydrocarbon oligomers and related compounds. Values for melting points are taken from Rothe (1999). The list is restricted to those with melting points >25° C., as given by Rothe (1999) or by suppliers 1. Dimers of styrene or substituted styrenes a. 3-Methyl-1-phenylindane (mp 25.5° C.):

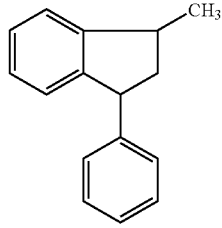

b. 1,3,3-Trimethyl-1-phenylindane (mp 53° C.):

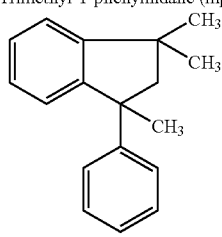

TABLE 1-continued

Examples of some hydrocarbon oligomers and related compounds. Values for melting points are taken from Rothe (1999). The list is restricted to those with melting points >25° C., as given by Rothe (1999) or by suppliers c. 1,3,3,4',6-pentamethyl-1-phenylindane (mp 40° C.):

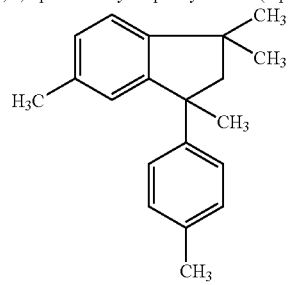

d. 1,3,3,3',7-pentamethyl-1-phenylindane (mp 57° C.):

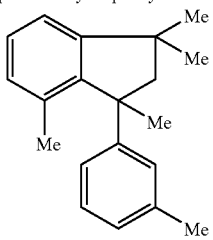

2. Oligomers of stilbene a. (a) 1,2,3,4-tetraphenylcyclobutane (mp 164 C.):

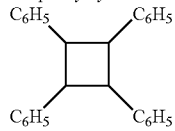

b. 1,2-Diphenyl-1-p-tolyethane (mp 42° C.):
C₆H₅CHCH₂C₆H₅

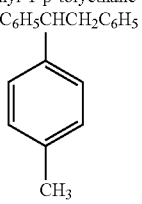

(c) Others:

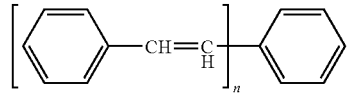

3. Dimers of phenyl substituted 1,3-butadiene (a) 1,3,4-Triphenyl 4-trans-styryl-1-cyclohexene (mp 137° C.):

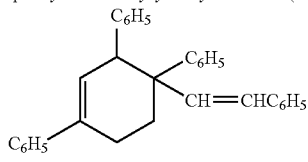

(b) 1,4-Diphenyl-4-vinyl-1-cyclohexene (mp 60° C.):

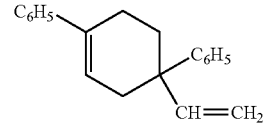

TABLE 1-continued

Examples of some hydrocarbon oligomers and related compounds. Values for melting points are taken from Rothe (1999). The list is restricted to those with melting points >25° C., as given by Rothe (1999) or by suppliers 4. Oligo (diphenylmethanes)

For n = 1, mp = 25.1° C.

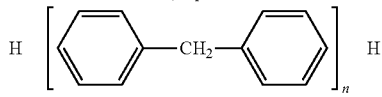

5. Oligo(phenylenes) (linear)

(a) Biphenylene (mp = 113° C.)

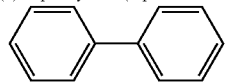

(b) Trimer of 3-methyl-p-phenylene (mp = 43° C.):

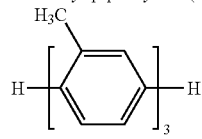

(c) Dimer of 2-methylphenylene (mp = 96° C.):

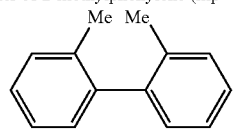

7. Oligo(xylenes) (linear)

For o-xylene dimer, mp = 67° C., and for p-xylene dimer mp = 82° C.

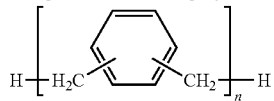

8. Oligo(xylenes) (cyclic)

For o-xylene dimer, mp = 112° C., and for p-xylene dimer mp = 286° C.

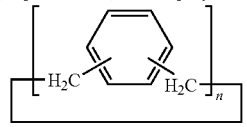

7. Substituted benzenes.

(a) 1,4-Dicyclohexylbenzene) (mp 104° C.):

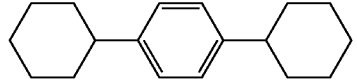

(b) 1,2,4,5 Tetramethylbenzene (mp 80° C.):

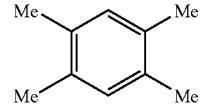

(c) 1,2-Diphenylethane (Bibenzyl or Dibenzyl) (mp 52° C.):

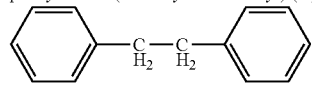

TABLE 1-continued

Examples of some hydrocarbon oligomers and related compounds. Values for melting points are taken from Rothe (1999). The list is restricted to those with melting points >25° C., as given by Rothe (1999) or by suppliers (d) Triphenylbenzene (mp 172° C.):

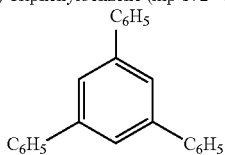

8. Others (a) 1,2,3,4-tetrabenzyl-1,3-cyclopentadiene (mp 182° C.):

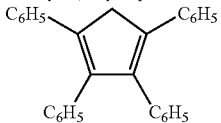

(b) 4,4'-Dimethylbiphenyl) (mp 119° C.): $CH_3C_6H_5C_6H_5CH_3$
(c) Tetraphenylethylene (mp 222° C.): $(C_6H_5)_2CH{=\!=}CH(C_6H_5)_2$
(d) Triphenylethylene (mp 70° C.): $(C_6H_5)_2CH{=\!=}CH_2C_6H_5$
(e) 1,4-bis(2-methylstyrylbenzene) (mp 181° C.):

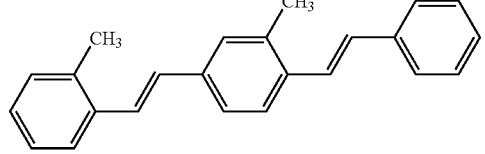

(g) 2-Phenylindene (mp 45° C.):

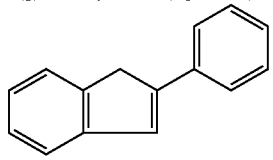

(h) Triphenylmethane (mp 93° C.):

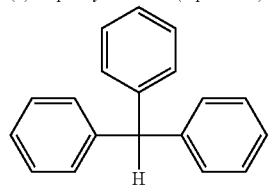

The chain length of polymers may be reduced to oligomers such as pentamers, tetramers, trimmer and dimmers. Beyond that the monomer is by definition neither a polymer nor an oligomer. But if a monomer or oligomer can form a suitable film, there is no barrier to its use for that purpose. Non-polymeric compounds lacking electronegative heteroatoms are therefore candidates to replace or supplement polymers in providing a matrix for creating photosensitive films containing photoacid generators. The chemical structure of the majority of these non-polymeric compounds will not surprisingly bear close resemblance to monomeric subunits or fragments of film-forming heteroatom-deficient polymers such as various polystyrenes or polyindenes, as can be seen from the structures listed in the above Table.

2. Repeat the reaction of interest by removing the film after a first photolytic exposure, then creating a fresh film that receives a second photolytic exposure.

This method can be regarded as the ultimate in increasing diffusion in the film, which after one exposure to photolytic light and achieving say 90% detritylation is removed with solvent along with all reactants and products not covalently bound to the array-bearing surface. To complete unfinished detritylation a fresh photoacid-generating film must be created, then illuminated and removed with solvent. There is no question about the possible effectiveness of this approach, but there is about its convenience and speed. However, if the application, illumination and removal of a single film can be effectively automated or run as a large parallel batch of arrays, then to do that twice rather than once is unlikely to be problematical. There is also a potential time-saving in that any need for diffusion to proceed after illumination is abolished, and nor do either of the two individual illumination periods have to be extended as is the case with only one illumination period. A significant attraction of this repetitive approach to detritylation is that the duration of oligonucleotide exposure to acid is reduced to two short exposures to lower acid concentrations rather than one much longer exposure to higher concentrations, thereby lowering the depurination risk.

3. Remove carbocation ($DMT^+$) with a scavenging agent.

There are at least three categories of chemical reaction that involve conversion of $DMT^+$ into a compound that is not expected to react with oligonucleotide 5' or 3'-hydroxyl groups.

(a) Trityl-group transfer to alcohols, amines and thiols according to Equations (10-12)

$$DMT^+ + ROH = H^+ + DMT\text{-}OR \qquad (10)$$

$$DMT^+ + RNH_2 = H^+ + DMT\text{-}NHR \qquad (11)$$

$$DMT^+ + RSH = H^+ + DMT\text{-}SR \qquad (12)$$

Unless the reaction has an equilibrium constant strongly favoring formation of the acid-labile DMT-containing product, this form of scavenging is unlikely to be effective.

(b) Friedel-Crafts type substitution of activated aromatic rings, or electrophilic addition to olefin bonds, typified by the reaction with pyrrole shown in Equation (11).

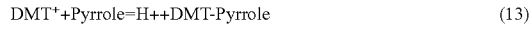

$$DMT^+ + Pyrrole = H^+ + DMT\text{-}Pyrrole \qquad (13)$$

The 2-dimethoxytritylpyrrole reaction product in Equation (13) would be as postulated by Reese et al (1986), and we have confirmed that this is the case. Other heterocyles such as 1-Methylpyrrole, indole and 5-methoxyindole also react with $DMT^+$, presumably in the same way as pyrrole. The fastest of these in DCM solution was 5-methoxyindole. But in films of polymer and a substituted 2-nitrobenzyl trichloroacetate ester submitted to photolysis at 365 nm, numerous changes in the UV-visible absorption of the film and an acquired insolubility in DCM suggested that extensive side reactions, including cross-linking of polymer, had occurred.

(c) Reduction of $DMT^+$ by hydride donors such as triphenylsilane to the corresponding triphenylmethane compound. The reaction can be written the as:

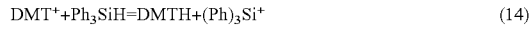

$$DMT^+ + Ph_3SiH = DMTH + (Ph)_3Si^+ \qquad (14)$$

The Si—H bond is much weaker than the C—H bond, so the reaction is effectively irreversible. The $(Ph)_3Si^+$ cation would be unstable, and be captured by trichloroacetate anion.

Table 2 gives structures for a variety of silicon based hydride donors. As with all the others listed, triethylsilane (I) contains a silicon-hydrogen bond, polarized silicon-positive and hydrogen-negative, and able to act as a hydride donor to carbocations. The more effective hydride donors are tri-substituted silanes, of which there is a wide choice including siloxanes and polymers thereof (Larson, undated). Secondary and tertiary silanes of general structure $R^1R^2SiH_2$ and $R^1R^2R^3SiH$ respectively include those (I-IV, X) where the substituents may be chosen from alkyl groups such as methyl, ethyl, n-propyl, iso-propyl, n-butyl, tert-butyl, n-hexyl and n-octyl-, and so on. Alternatively the substituents can be aryl groups (V-IX). Any of these substituents may themselves be substituted, for example by fluorine or chlorine. Similar considerations apply to the substituents of siloxanes (XIV-XVI). Higher molecular weight forms of silanes or siloxanes are available as oligomers (XIII, XVI), polymers (XV, XVII), or branched structures (XIV).

The reaction of hydrosilanes with carbocations is essentially irreversible (Pearson et al, 1989), and in the case of trityl carbocations the reaction product is the corresponding triphenylmethane. We have confirmed that triphenylsilane converts $DMT^+$ to phenyl-(di-4'-methoxyphenyl)-methane. Reaction rates at 20-23° C. of silanes with acid generated $DMT^+$ in DCM solution are easily measured spectrophotometrically by observing loss of the intense $DMT^+$ absorption peak at 505 nm. Of the compounds that we tested in this way, tetramethyldisiloxane (XVI) gave the fastest rates, followed by triethylsilane (I) and triphenylsilane (VI). Tri-iso-propylsilane (II) reacted slowly, as did diphenysilane (V) and poly (methyhydrosiloxane) (XIII). No reaction was detectable with phenylsilane (VII) or poly(carbomethylsilane) (XVII).

The inclusion of trialkylsilanes (e.g. triethylsilane or tri-n-propylsilane by up to 8-10% by mass in a film of poly($\alpha$-methylstyrene) and photoacid generator ($\alpha$-phenyl-(4,5-dimethoxy-2,6-dinitrobenzyl-trichloroacetate)) did not interfere with film-casting, but beyond that the solutions in dichloromethane did not wet glass. Both of these silanes reacted with photoacid-generated intrafilm $DMT^+$, with half lives for $DMT^+$ disappearance of 40 and 100 sec respectively at 21-23° C. Shorter half-lives are required to minimize the duration of exposure to photoacid acid and to avoid unacceptable array fabrication times.

Triphenylsilane, unlike the great majority of silanes or siloxanes other than some polymers, is a solid and unlikely to be lost by evaporation during film casting or thereafter. On the basis of its fast reaction rate with $DMT^+$ in solid films and its melting point above ambient, triphenylsilane has the most promise of the silanes that we tested. Triphenylsilane solutions at 2% (w/v) wet glass surfaces, and their inclusion in film casting solutions at 33% of the solute mass did not interfere with film casting. At this concentration the half-life for $DMT^+$ removal was c.40-45, a value that we sought to reduce by synthesis no more reactive triarylsilanes. By analogy with the greater stability of the carbocations of methoxy-substituted versus unsubstituted-triphenylmethanes, we anticipated that methoxy substitution of triphenylsilane would enhance its reactivity with $DMT^+$. This turned out to be the case. See Example 5 and FIG. 18 below.

Hydride-donating silanes include some that are volatile liquids (e.g. ethyldimethylsilane, b.p.=44-46° C.; triethylsilane, b.p.=107° C.) or gases (trimethylsilane, b.p.=6-7° C.) at room temperature. Their vapor could be used to scavenge $DMT^+$ generated from the action of acid vapor (e.g. trichloroacetic acid) on trityl-protected oligonucleotides attached to an array surface. A photolithographically patterned photoresist or other physical barrier would determine those array elements that were accessed by the acid vapor. Because the $DMT^+$ released by gaseous acid would be converted to the corresponding substituted triphenylmethane, there is minimal risk that the freshly deprotected oligonucleotide 5'- or 3'-hydroxyl groups would become re-tritylated on removal of the acid vapor. Vapor-phase deprotection of surface-attached 5'-O-DMT-oligonucleotides has been described by Pease et al (2003), who reported "complete deprotection" for exposure to trichloroacetic acid vapor at 20° C. for 60 s at atmospheric pressure. The extent of detritylation was measured by coupling a fluorescent molecule to the deprotected oligonucleotide-5'—OH and comparing the resulting fluorescent intensity to controls. The accuracy of the method was not described, but in view of the reversibility of acid-dependent detritylation it would be unsurprising if "complete deprotection" included deprotection levels a few percentage short of 100%. Such a difference is relatively small, but sufficient to render the deprotection method unsuitable for oligonucleotide synthesis. The inclusion of a hydride-donating silane in the acid vapor phase should ensure >99% deprotection and remove any risk of re-tritylation when the acid vapor is removed.

Some Practical Advantages of Removing Unwanted Products of a Reversible Deprotection Reaction Removal of unwanted photogenerated products from their site of origin at a reversible photodirected deprotection reaction can be by diffusion or scavenging or both: the effects are on the equilibrium position are the same, and additive. They are (i) increased light sensitivity and (ii) diminished exposure to the deprotecting agent which, in the case of photoacid, can cause oligonucleotide depurination.

(i) Increased Light sensitivity. There are practical and economic advantages in high light sensitivity for photodirected generation of deprotection reactants: light sources can be less expensive, more reliable, undemanding of heat generation, and longer-lived. Fabrication throughput can be increased, and damage to masks or light modulators minimized. Light sensitivity for effective (>98%) detritylation of glass-bound DMT-T using phenyl-(4,5-dimethoxy)-2,6-dinitrophenoltrichloracetate in a film of poly(α-methylstyrene) containing triphenylsilane, in a 1:1;1 ratio by weight, with a 50 sec post-exposure period before film removal, was ≦60 mJcm$^{-2}$ at 365 nm. This compares favorably with the 5-9 Jcm$^{-2}$ required for direct photochemical removal of first-generation photosensitive oligonucleotide-protecting groups (Pease et al, 1994), c.1 Jcm$^{-2}$ for second-generation protecting groups (Buhler et al, 2004) either alone or with inclusion of triplet sensitizers (Woll et al, 2004). The sensitivity for other photoacid generators is also higher; c.1 Jcm$^{-2}$ for 2,6-dinitrobenzyltosylate without a triplet sensitizer (Goldberg et al., 2005) and 260 mJcm$^{-2}$ for pentafluorobenzoic acid produced by chemical amplification (Beecher et al, 1997).

(ii) Diminished exposure to acid. The hazards associated with detritylation are two-fold: either acid-dependent oligonucleotide depurination or incomplete acid-dependent detritylation. Steering a course to avoid the one increases the risk from the other. Apart from increased acid strength and concentration, the cumulative time exposure of oligonucleotides to acid also increases the depurination risk, which is 20-25 times greater for the first of 20-25 nucleotides put in place than for the last. Our solution to the problem posed by reversibility of detritylation is to pull the equilibrium towards completion by removal of DMT$^+$ from the oligonucleotide layer. This is achieved by enhanced intrafilm diffusion and/or chemical trapping with a scavenging reagent. The required intrafilm concentration of photoacid is lowered several-fold, and the duration of light exposure even more so. Yet despite the low photoacid concentration, detritylation is effectively irreversible; it goes rapidly to completion following photogeneration of acid, and well within the time taken to generate the much higher photoacid concentrations that are otherwise needed.

TABLE 2

Examples of silicon-based compounds, some of which are effective reducing agents.

I. Triethylsilane

II. Tri-iso-propylsilane

III. Tri-tert-butylsilane

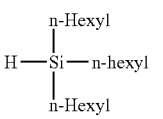
IV. Tri-n-hexylsilane

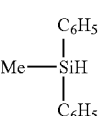
V. Diphenylmethylsilane

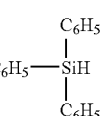
VI. Triphenylsilane

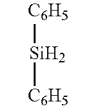
VII. Diphenylsilane

VIII. Phenylsilane

IX. Dibenzylsilane

X. Diethylsilane

XI. Triethoxysilane

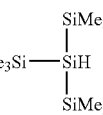
XII. Tris(trimethylsilyl)silane

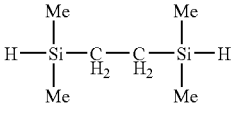
XIII. 1,1,4,4-Tetramethyldisilethylene

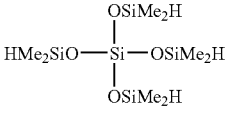
XIV. Tetrakis(dimethylsiloxy)silane

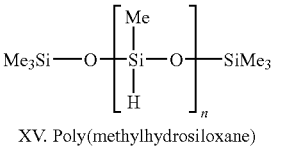
XV. Poly(methylhydrosiloxane)

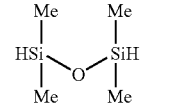
XVI. Tetramethyldisiloxane

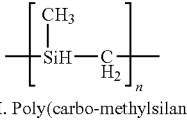
XVII. Poly(carbo-methylsilane)

EXAMPLES

Example 1

Photoacid-Dependent Detritylation of 5'DMT-O-Thymidine Covalently Attached to a Glass Microscope Slide at Moderate Density Attachment of DMT-T to glass slides. We followed literature methods to attach linkers and mononucleotides to glass.

Slides derivatized with 3-aminopropyltriethoxysilane were either purchased from Sigma-Aldrich or prepared in our laboratory. We followed literature procedures to prepare (a) 5'-O-DMT-3'-O-succinylthymidine by reaction of commercially available 5'-DMT-O-thymidine with succinic anhydride in the presence of dimethylaminopyridine in dry pyridine, and (b) 5'-O-dimethoxy-trityl-3'-O-succinyl-(p-nitrophenyl)-thymidine by the condensation of 5'-O-DMT-3'-O-succinyl-thymidine with p-nitrophenol in the presence of dicyclohexylcarbodiimide (DCC) in dioxane. As an alternative, used in Example 2, glass slides were derivatised with 3-glycidoxypropyltrimethoxysilane followed by ethylene glycol or hexaethylene glycol to provide a terminal primary hydroxyl group. In both preparations we used either whole slides in a staining jar or slides that had been cut into rectangular pieces roughly 20×6-7 mm. These pieces can be treated in a round-bottomed flask requiring smaller volumes of reagents than staining jars.

Coupling of mononucleotides to glass slides derivatised with 3-aminopropyltriethoxysilane. Glass microscope slides, 75×25×1 mm, were placed in a staining jar and immersed, with stirring, for 120 h at rt in 1 M DCC solution in DCM (45 mL) containing 3'-O-succinyl-thymidine-5'-O-DMT (0.50 g). The slides were then washed thoroughly with dry dimethylformamide, dioxane, methanol, acetone, acetonitrile, and diethyl ether and were finally dried in vacuo over phosphorus pentoxide overnight. A fragment (approx. 2 cm$^2$) was treated with 3% TCA/CH$_2$Cl$_2$ (1 mL) and the concentration of trityl cation in the resulting solution was determined from absorption measurement at 505 nm. Using commercially available derivatised slides we observed a loading of 50-60 picomoles of 5'-O-DMT-thymidine/cm$^2$, and twice that value using slides derivatised in our own laboratory.

Photoacid generation and measurements of detritylation. To measure photoacid-dependent detritylation of glass-attached DMT-T, rectangular (10×5 mm) pieces of slides prepared as described above were first dip-coated in a 1% (wt/v) solution of the trichloroacetate ester of α-phenyl-2,6-dinitro-, 4,5-dimethoxybenzyl alcohol in DCM. No polymer was used. A coated piece was placed on the stage of a spectrophotometer purpose built for highly sensitive measurement of UV-visible absorption changes occurring on coated glass slides in response to UV (365 nm) or violet (405 nm) irradiation. Exposure of the piece of coated slide normal to its plane with 280 mJ/cm$^2$ at 365 nm followed by a dark period of 2 min resulted in the growth of a sharp absorption peak at 510 nm, corresponding to the dimethoxytrityl cation DMT$^+$. The height of the peak after it had ceased to grow closely corresponded to that anticipated from the independently measured surface density, bearing in mind that both the upper and lower surfaces contributed in the optical geometry used by us. Repetition of the photoacid-dependent detritylation procedure by solvent removal of exposed film followed by its replacement and exposure did not form detectable amounts of DMT$^+$. The sensitivity level of the spectrophotometer in the 470-530 nm region operating with a low noise photodiode array detector and high intensity light source was +0.0002 absorption units, corresponding to ±2.5 pmole DMT$^+$. The area density of DMT-T in these experiments was 50-60 pmole/cm$^2$ for one surface and therefore 100-120 pmole/cm$^2$ for two such surfaces normal to the optical axis of the spectrophotometer. On this basis the extent of photoacid-induced detritylation was >95%.

Example 2

Photoacid-dependent detritylation of 5'-O-DMT-Thymidine covalently attached to a glass microscope slide at high density. Coupling of mononucleotides to glass slides derivatised with 3-glycidoxypropyltrimethoxysilane. Rectangular pieces of derivatised slide were placed in a round bottom flask and treated with 5'-O-DMT-thymidine-3'-O-phosphoramidite (0.25 g) in dry acetonitrile (5 mL) and activator solution (5 mL of 0.25 M tetrazole in acetonitrile, from Applied Biosystems) added under argon. The reaction was stirred vigorously at rt for 10 minutes and exposed to ultrasound for 5 min. The slides were washed thoroughly with dry acetonitrile and treated with the oxidizer solution (25 mL), from Applied Biosystems, for 60 sec at rt. After being washed again with dry acetonitrile the slides were treated with the Cap A and Cap B solution (1:1 v/v, 25 mL), from Applied Biosystems, and finally washed thoroughly with dry DMF, dioxane, methanol, acetonitrile, acetone, and diethyl ether and dried in vacuo over phosphorus pentoxide overnight. A small fragment (2-3 cm$^2$) was treated with 3% TCA/CH$_2$Cl$_2$ (1 mL). Absorption of the resulting solution at 505 nm was used to calculate the loading with 5'-O-DMT-thymidine, which was typically 700 picomoles/cm$^2$ for this method of derivatization.

We used the procedures to those described in Example 1 above for coating slides with films of trichloroacetate ester of α-phenyl-4,5-dimethoxy-2,6-dinitro-benzyl alcohol, and for exposure to UV light and measurement of DMT$^+$ release from attached DMT-T. The results differed only in the higher amounts of DMT$^+$ generated by photoacid. We were unable to detect any generation of DMT$^+$ after removing a first film coating after photolysis and repeating with a second coating and exposure. The higher surface densities of DMT-T relative to detection sensitivity for DMT$^+$ enabled higher extents of detritylation to be determined, which in this example were >98% using a conservative estimate of detection sensitivity.

Example 3

Use of Plasticizers to Increase Intrafilm Diffusion Coefficients

Examples 1 and 2 are with photoacid generating films composed entirely of the photoacid generator. Such films permit a low molecular weight compound such as trichloroacetic acid to undergo translational diffusion with a diffusion coefficient of c.20-30 nm$^2$s$^{-1}$ at room temperature. This is not the case with films composed mainly of a polymer such as poly(α-methylstyrene), where the diffusion coefficient of trichloroacetic acid is <1 nm$^2$s$^{-1}$. We carried out experiments using DMT-T attached to glass slides as in Example 2, dip-coated with a 1-1.5 μm thick film from a dichloromethane solution containing poly(α-methylstyrene) of average mol.wt. 2,000, the trichloroacetate ester of α-phenyl-4,5-dimethoxy-2,6-dinitro-benzyl alcohol, and triphenylmethane (as the plasticizer) in the ratio 8:4:1 by weight and an overall solute content of c.2% (wt/vol).

The diffusion coefficient at 20-23° C. for trichloroacetic acid in such a film is c.50-200 nm$^2$s$^{-1}$. Exposure of the film overlaying a glass surface with attached DMT-T to 300 mJ.cm$^{-2}$ of UV-irradiation (365 nm) resulted in the appearance of the 510 nm absorption peak of DMT$^+$ with a height in the region predicted from independent assay of the DMT-T surface density (c.700 pmol cm$^{-2}$) on parallel slides using 3% trichloroacetic acid in dichloromethane to generate and elute DMT$^+$. No residual DMT-T was detected when the first and exposed photoacid-generating film was removed with solvent and replaced with a second photoacid-generating film that was then exposed to 300 mJ.cm$^2$ of UV light (365 nm). These observations demonstrated 98-99% detritylation efficiency.

Repetition of these experimental conditions as controls that a lacked the plasticizer triphenylmethane showed that <50% of the DMT-T initially attached to the glass slide was detritylated following a first exposure to UV light (365 nm, 300 mJ.cm$^{-2}$).

Example 4

Use of a Carbocation Scavenger

Figure 18:
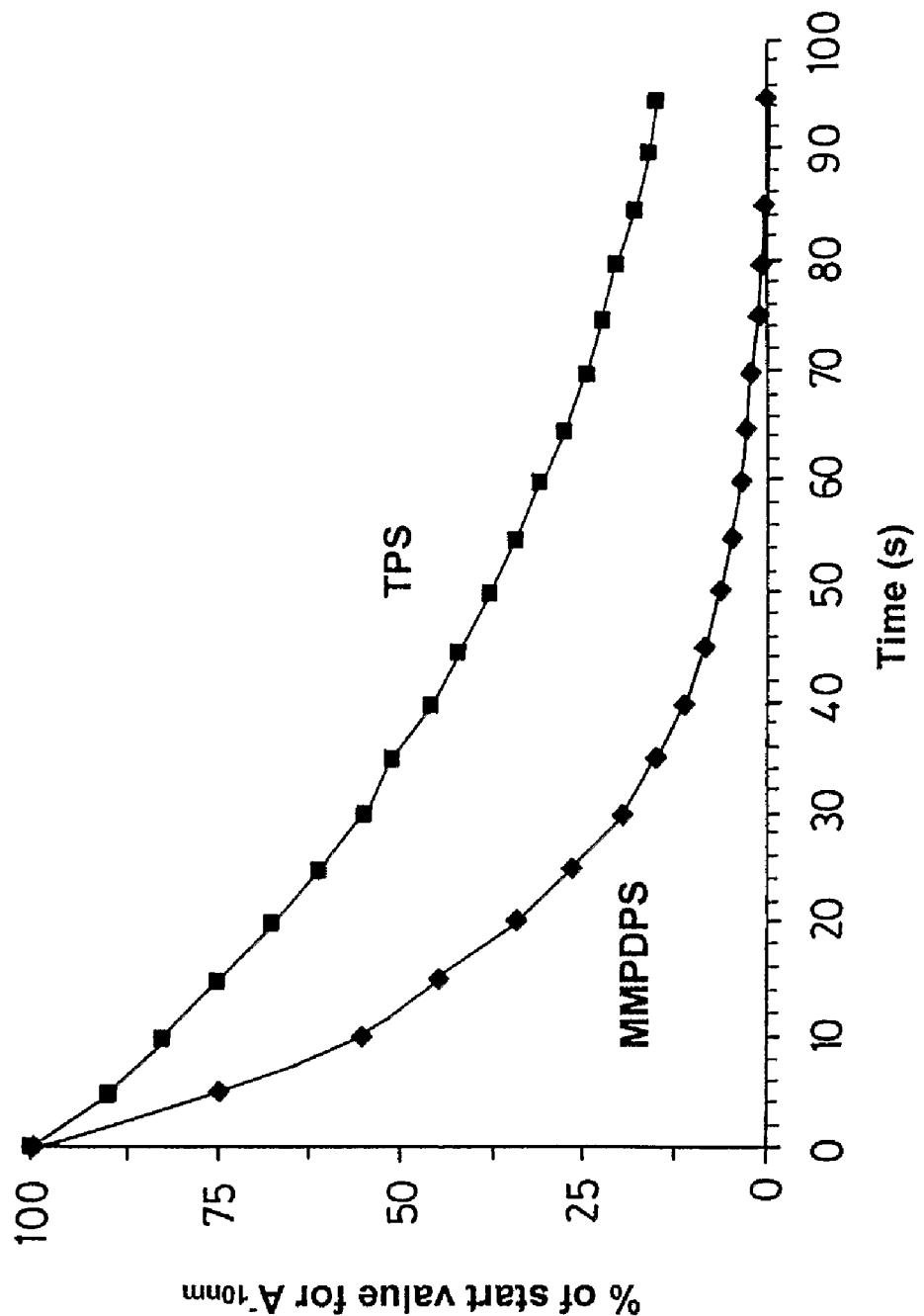
FIG. 18. Reaction kinetics of triarylsilanes with DMT+ in solid films. A solid film, c.1.5 µm thick, was cast from a solution in dichloromethane containing 0.66% by weight of each of poly(α-methylstyrene), Ester 2, and either triphenylsilane ("TPS") or (4-methoxyphenyl)-diphenylsilane ("MMPDPS") and 0.2 mM DMT-T. Exposure to UV light (365 nm, 160 mJ/cm², 5 s) resulted in the rapid appearance of an absorption peak at 384 nm due to formation of the substituted 2-nitrosobenzophenone, and a smaller peak at 510 nm due to generation of DMT+ in response to the acid. The 510 nm peak decayed with time, as shown by a series of spectra taken at 5 sec intervals starting immediately at the end of illumination. No decay occurred in absence of the silanes or if they were replaced by triphenylmethane. The upper curve with a decay half-time of c.45 s is for triphenylsilane. The lower curve with a decay half-time of c.12 s is for (4-methoxyphenyl)diphenylsilane.

Experimental demonstration of the ability of a carbocation scavenger to remove DMT$^+$ and thereby move the equilibrium position of photoacid-dependent detritylation of DMT-T in a solid film towards completion required that (i) the scavenger reacts with DMT$^+$ and (ii) the photoacid-dependent detritylation reaction with its reactants and products at equilibrium within a solid film respond to removal of DMT$^+$ by further detritylation of DMT-T. Demonstration of the first requirement was carried out as shown in FIG. 18, which gives experimental data for reaction of triphenylsilane with DMT$^+$ within a solid film of poly(α-methylstyrene).

In addition to triphenylsilane other tri-substituted silanes also reacted with DMT$^+$ when exposed to photoacid in solid polymer films, for instance triethyl- and tri-n-propylsilane, but their rates of reaction were several-fold lower. Triphenylsilane has two other important advantages: it is a solid and less likely to leave the film during casting, and, unlike alkyl-substituted silanes and several siloxanes that we tested, did not interfere with wetting of glass surfaces when included in the film-casting solution with dichloromethane as the solvent.

In order to demonstrate the effect of a carbocation scavenger on the equilibrium position of the detritylation reaction, we exposed a triphenysilane-containing film identical to that described immediately above to UV irradiation for 1 sec (365 nm, 12.5 mJ cm$^{-2}$). This level of irradiation was sufficient to photolyse only about 5% of the photoacid generator as detected from the 382 nm absorption peak of its substituted benzophenone photoproduct. This level of photoacid did not achieve more than 24% of the detritylation obtained with 10- or 20-fold or greater UV-exposure power intensities. The absorption peak at 510 nm observed immediately following the 12.5 mJ cm$^{-2}$ exposure decayed slowly ($T_{half}$=180 sec). When exposure to much higher power (160 mJ cm$^{-2}$) was provided 15 minutes later, the height of the 510 nm absorption peak observed immediately following exposure was only 34% of that obtained in the absence of any earlier exposure. This peak decayed with $T_{half}$=40 s. These two episodes of illumination accounted between them for 60% of the DMT-T content of the film. The remaining 40% can be accounted for by scavenging of DMT$^+$ causing further detritylation during the period between the two exposures. This conclusion is supported by the prolonged $T_{half}$ value for decay of the DMT$^+$ concentration in the film following the first and low power exposure; the observed decay rate of the 510 nm peak is slowed because DMT$^+$ removed by scavenging is replaced from DMT-T by shift of the detritylation equilibrium.

The use in these experiments of DMT-T incorporated throughout the film rather than attached to the supporting glass removed any effect of translational diffusion of DMT$^+$ on the extent of detritylation. The experimental observations could therefore be interpreted solely in terms of reaction kinetics and equilibria. These experiments demonstrated that triphenylsilane (a) reacted with DMT$^+$ formed by photoacid-dependent detritylation of DMT$^+$, and as a consequence (b) caused further detritylation of DMT-T.

Example 5

Synthesis and Performance of (4-methoxyphenyl)-diphenylsilane 4-(Methoxyphenyl)diphenylsilane has previously been synthesised by Gillman & Dunn (1951) and Lachance & Gallant (1998). We anticipated that methoxy-group substitution would increase hydride-donating ability compared with triphenylsilane. We developed a simpler method for its synthesis, as follows. 4-Methoxyphenylmagnesium bromide (1 M solution in THF 1.8 mL, 1.8 mmol), was added dropwise by syringe over 10 minutes, at 0-5° C., under argon, to a solution of diphenylchlorosilane (0.435 g, 1.5 mmol) in THF (6 mL). The resulting mixture was stirred at rt for 16 hours. The mixture was cooled to 0-5° C. and 2% aqueous hydrochloric acid (25 mL) was added dropwise over 20 minutes followed by dichloromethane (50 mL). The organic layer was washed with water (20 mL), 3% aqueous sodium bicarbonate (3×20 mL), water (20 mL), brine (20 mL), dried (sodium sulphate) and concentrated in vacuo. The residue was chromatographed on a silicagel column eluting with hexane-ethyl acetate (24:1) to give the product as a colorless liquid; yield (0.178 g, 41%); Rf (hexane/ethyl acetate 9:1) 0.61; GC MS [$C_{19}H_{18}OSi$—H] 289.3; $^1$H NMR (DMSO-d6) δ 3.78 (s, 3H, OCH$_3$), 5.38 (s, 1H, SiH) 7.02 (d, 2H, J=4.82 Hz, H-3', H-5'), 7.53 (m, 12H, H-2'-H-6', 2×H-2-H-6), 7.40 (m, 1H, H-6), 7.66 (m, 1H, H-4), 8.04 (m, 1H, H-3); $^{13}$C-NMR (DMSO-d6) 54.95 (OCH$_3$), 114.17 (C-3', C-5'), 160.86 (C-4').

The ability of (4-methoxyphenyl)diphenylsilane to scavenge DMT$^+$ was assessed in solid films as described in the legend of FIG. 18. Photoacid (trichloroacetic) was generated by exposure to light at 365 nm (180 mJcm$^{-2}$ over 5 s). The initial extent of DMT$^+$ accumulation and its subsequent post-exposure decay due to reaction with the silane was measured by recording absorption spectra (300-560 nm) at 5 s intervals. Post-exposure decay of the 510 nm absorption peak of DMT$^+$ proceeded as a pseudo-first order reaction, with a half life of c.12 s. Under similar conditions the half-life using triphenylsilane as the scavenger was 45 s, some 3-4 fold slower. No decay was observed when the scavenger was replaced with triphenylmethane.

REFERENCES

The following references are all expressly incorporated by reference in their entirety.

Atkinson, T; Smith, M. in *Oligonucleotide Synthesis: a Practical Approach* (Ed. Gait, M. J.) 47-48. IRL Press, Oxford & Washington D. C.

Baum, M; Bielau, S; Rittner, N; Schmid, K; Eggelsbuch, K; Dahms, M; Schauersbach, A; Tahedl, H; Beier, M; Güimil, R; Scheffler, M; Hermann, C; Funk, J-M; Wixmarten, A; Febscher, H; Hönig, M; Andeae, C; Wixmarren, A; Büchner, D; Moschel, E; Glathe, A; Jäger, E; Thom, M; Greil, A; Bestvater, F; Obermeier, F; Burgmaier, J; Wichert, S; Hein, S; Binneweiss, T; Foitzik, V; Müller, M; Stähler, C. F. & Stähler, P. F. (2003) "*Validation of a novel, fully integrated and flexible microarray benchtop facility for gene expression profiling*" Nucleic Acids Research 31, e151 (13 pages).

Beecher, J. E; McGall, G. H. & Goldberg, M. J. (1997) "*Chemically amplified photolithography for the fabrication of high density oligonucleotide arrays*" Polymeric Materials Sci. Eng. (Washington) 76, 597-598.

Beecher, J. E; Goldberg, M. J. & McGall, G. H. (2000) "Chemical amplification for the synthesis of patterned arrays" U.S. Pat. No. 6,083,697.

Beaucage, S. L; & Iyer, R. P. (1992) "*Advances in the synthesis of oligonucleotides by the phosphoramidite approach*" Tetrahedron, 48, 2223-2311.

Bergethon, P. R; & Simons, E. R. Biophysical Chemistry, (1989) 233-234, (Springer-Verlag, Berlin).

Brenner, D; Davison, A; Lister-James, J. & Jones, A. G. (1984) "Synthesis and characterization of a series of isomeric oxotechnetium(V) diamido dithiolates" Inorg. Chem. 23, 3793-3797.

Bühler, S; Lagoja, I; Giegrich, H; Stengele, K-P & Pfleiderer, W. (2004) "*New types of very efficient photolabile groups based upon the [2-(2-nitrophenyl)propoxy]carbonyl (NP-POC) moiety*" Helv. Chim. Acta. 87, 620-659.

Caruthers, M. (1991) "*Chemical synthesis of DNA and RNA analogues*" Acc. Chem. Res. B24, 278-284.

Chattopadhyaha, J. B. & Reese, C. B. (1978) "*The 9-phenylxanthen-9-yl protecting group*" J. Chem. Soc. Commun. 639-640.

Cowell G. W. & Pitts, J. N. Jr. (1968) "*Photochemical studies in rigid matrices. II. A study of the photochemical reactivity of anthracene in polystyrene and the development of an o-nitrobenzaldehyde actinometer in poly(methylmethacrylate)*" J. Amer. Chem. Soc. 90, 1106-1110.

Crank, J., & Parks, G. S. (1968). "*Diffusion in Polymers*" Academic Press, New York, pages 1-39.

Davison, A; Brenner, D; Lister-James, J. & Jones, A. G. (1987) "*Bisamide bisthiol compounds useful for making technetium radiodiagnostic renal agents*" U.S. Pat. No. 4,673,562.

Fisher, E. F. & Caruthers, M. H. (1983) "*Color coded triarylmethyl protecting groups useful for deoxypolynucleotide synthesis*" Nucleic Acids Research, 11, 1589-1599.

Fourrey, J. L; Varenne, J; Blonski, C; Dousset, P. & Shire, D. (1987) "1,1 *Bis-94-methoxyphenyl*)-1'-*pyrenyl-methyl (bmpm): a new fluorescent 5' protecting group for the purification of unmodified and modified oligonucleotides*" Tetrahedron Lett. 28, 5157-5160.

Gaffney, P. R. J; Changsheng, L; Rao, M. V; Reese, C. B. & Ward, J. G., (1991) "*Some substituted 9-phenylxanthen-9-yl protecting groups*" J. Chem. Soc., Perkin Trans. 1, 1355-1360.

Gao, X; Yu, P; LeProust, E; Sonigo, L; Pellois, J. P. & Zhang, H. (1998) "*Oligonucleotide synthesis using solution photogenerated acids*" J. Am. Chem. Soc. 120, 12698-12699.

Gao, X; LeProust, E. Zhang, H; Srivannavit, 0; Gulari, E; Yu, P; Nishiguchi, C; Xiang, Q. & Zu, X. (2001) "*A flexible light-directed chip synthesis gated by photodeprotection using solution photogenerated acids*" Nucleic Acids Research, 29, 4744-4750.

Gao, X; Zhou, X.; & Gulari, E. (2004) "*Device for chemical and biochemical reactions using photogenerated reagents.*" US Patent Application US2004/0023368A1.

Garland, P. B. & Serafinowski, P. J. (2002) "Effects of stray light on the fidelity of photodirected oligonucleotide array synthesis" Nucleic Acids Res. 30, e99, 9 pages.

Garland. P. B. & Serafinowski, P. J (2005) "*Materials and Methods for the Photodirected Synthesis of Oligonucleotide Arrays*" submitted as a patent application to USPTO, May 2005.

Gilman, Henry. & Dunn, G. E. (1951) "*The effects of substituents on the rate of hydrolysis of triarylsilanes in wet piperidine*". J. Amer. Chem. Soc. 73, 3404-7.

Golberg, M. J; Kuimelis, R. G; McGall, G. H; parker, N. A. and Xu, G. (2005) "*process for high-yield synthesis of standard length and long-mer nucleic acid arrays*" US Patent Application 20050164258.

Heavens, O. S. & Sharma, S. K. (1976) "*The use of lateral waves for the examination of weakly absorbing surface films*" Optics Comm. 17, 339-341.

Hanson, J. E.; Reichmanis, E.; Houlihan, F. M.; & Neenan, T. X. (1992) "*Synthesis and evaluation of copolymers of (tert-butoxycarbonyloxy)styrene and (2-nitrobenzyl)styrene sulfonates: single component chemically amplified resists for deep-UV imaging*" Chem. Mat. 4, 837-842.

Hayase, S; Nakano, Y; & Mikogami, Y (1994) "*Photosensitive composition comprising a polysilane and an acid forming compound*" U.S. Pat. No. 5,372,908.

Kim, M-H; Kim, D-Y; Moon, B-S; Park, J-C; Kim, Y-K. & Seo, S-J. (2002) "*Process for preparing peptide nucleic acid probe using polymeric photoacid generator*". U.S. Pat. No. 6,359,125.

Körmendy, K. & El-Sawy, M. (1974) "*Tritylation and transtritylation reactions of ethanolamine*" Acta Chim. Acad. Sci. Hung. 83, 107-114.

Lachance, Nicolas. & Gallant, Michel. (1998) "*New method for the preparation of functionalized aryldiphenylsilanes (ArPh$_2$SiH)*", Tetrahedron Lett. 39 (3) 171-174.

Larson, G. L (undated) "*Silicon-based reducing agents.*" Technical Brochure, 25 pages, available at www.gelest.com Lehmann, C; Xu, Y-Z; Christodoulou, C; Tan, Z-K. & Gait, M. J. (1989) *Solid phase synthesis of oligoribonucleotides using 9'-fluorenylmethoxycarbonyl (Fmoc) for 5'-hydroxyl protection*. Nucleic Acids Research 17, 2379-2390.

Lehmann, C; Xu, Y-Z; Christodoulo, C; Tan, Z-K. & Gait. M. J. (1989) "*Solid-phase synthesis of oligoribonucleotides using 9-fluorenymethoxycarbonylgroups (Fmoc) for 5'-hydroxyl protection*" J. Chem. Soc. Perkins. Trans. 1, 2379-2390.

Letsinger, R. L & Finan, J. L. (1975) "*Selective deprotection by reductive cleavage with radical anion*" J. Amer. Chem. Soc. 97, 7197-7198.

Lund, H. (1927) "*Methoxy-substituted triphenyl carbinols and their salts*" J. Amer. Chem. Soc. 49, 1346-1360.

Maskos, U. & Southern, E. M. (1992) "*Oligonucleotide hybridisations on glass supports: a novel linker for oligonucleotide synthesis and hybridisation properties of oligonucleotides synthesised in situ*" Nucleic Acids Res. 20, 1679-1684.

McGall, G. H. & Fidenza, J. A. (2000) "*High density oligonucleotide arrays*" Proceedings of SPIE, 3926, 106-110.

McGall, G; Labadie, J; Brock, P; Nguyen, T. & Hinsberg, W. (1996) "*Light-directed synthesis of high-density oligonucleotide arrays using semiconductor resists*" Proc. Natl. Acad. Sci. USA 93, 13555-13560.

Mehta, A., Jaouhari, R., Benson, T. J. & Douglas, K. T. (1992) "*Improved efficiency and selectivity in peptide synthesis: use of triethylsilane as a carbocation scavenger in deprotection of t-butyl esters and t-butoxycarbonyl-protected sites*" Tetrahedron Lett. 33, 5411-5444.

Nuwaysir, E. F; Huang, W; Albert, T. J. Singh, J; Nuwayir, K; Pitas, A; Richmond, T, Gorski, T; Berg, J. P; Ballin, J; McCormick, M; Norton, J; Pollock, T; Sumwalt, T; Butcher, Porter, D; Molla, M; Hall, C; Blattner, F; Susman, M. F; Wallace, R. L; Cerrina, F. & Green, R. "*Gene expression using oligonucleotide arrays produced by maskless photolithography*" (2002) Genome Research, 1749-1755.

Palik, E. D. & Holm, R. T. (1978) "*Internal reflection spectroscopy studies of thin films and surfaces*" Optical Engineering" 71, 512-524. Park, G. S. in Crank, & J; Park, G. S. *Diffusion in Polymers*; (1968) 141-163. Academic Press, New York.

Pease, A. C; Solas, D; Sullivan, E. J; Cronin, M. T; Holmes, C. P. & Fodor, S. P. A. (1994) "*Light generated oligonucleotide arrays for rapid DNA sequence analysis*" Proc. Natl. Acad. Sci. USA 91, 5022-5026

Pearson D. A; Blanchette, M; Baker, M. l & Guindon, C. A. (1989) "Trialkylsilanes as scavengers for the trifluoroacetic acid deblocking of protecting groups in peptide synthesis" Tetrahedron Lett. 30, 2739-2742.

Pease, R. F; McGall, G; Goldberg, M. J; Rava, R. P; Fodor, S. P. A; Stryer, L. & Winkler, J. L. (1998) "*Printing oligonucleotide arrays using deprotection agents solely in the vapor phase*" U.S. Pat. No. 5,831,070.

Pease, R. F; McGall, G; Goldberg, M. J; Rava, R. P; Fodor, S. P. A; Goss, V; Stryer, L. & Winkler, J. L. (2003) "*Printing oligonucleotide arrays using deprotection agents solely in the vapor phase*" U.S. Pat. No. 6,667,394.

Ravikumar, V; Andrade, M; Mulvey, D. & Cole, D. J. (1996) "Carbocation scavenging during oligonucleotide synthesis" U.S. Pat. No. 5,510,476.

Reese, C. B; Serafinowska, H. T. & Zappia, G. (1986) "*An acetal group suitable for the protection of 2'-hydroxy functions in rapid oligoribonucleotide synthesis*" Tetrahedron Letters, 37, 2291-2294.

Reese, C. B. & Yan, H. (2004) "*Alternatives to the 4,4'-dimethoxytrityl (DMTr) protecting group*" Tetrahedron Lett. 45, 2567-2570.

Richmond, K. E; Li, M-H; Rodesch, M. J; Patel, M; Lowe, A. M; Kim, C; Venkataramaian, N; Flickinger, S. F; Kaysen, J; Belshaw, P. J; Susman, M. R. & Cerrina, F. (2004) "Amplification and assembly of chip-eluted DNA (AACED): a method for high throughput gene synthesis" Nucleic Acids Research, 32, 5011-5018.

Rothe. M. (1999) "*Physical data of oligomers*" in Polymer Handbook, $4^{th}$ edition, pp IV/1-IV/97 (Edit. Brandrup, J; Immergut, E. H. & Grulke, E. A.) J. Wiley & Sons Inc, Chichester.

Schaller, H; Weimann, G; Lerch, B. & Khorana, H. G. "*Studies on polynucleotides XXIV. The stepwise synthesis of specific deoxyribopolynucleotides (4). Protected derivatives of deoxyribonucleosides and new syntheses of deoxriboynucleoside-3'-phosphates*" J. Amer. Chem. Soc. (1963) 85, 3821-3827.

Schlegel, L; Ueno, T; Hayashi, N; & Iwayanagi, T. (1991) "*Determination of acid diffusion in chemical amplification in positive deep ultraviolet resists*" J. Vac. Sci. Technol. 2, 278-289.

Serafinowski, P. J. & Garland, P. B. (2003) "*Novel photoacid generators for photodirected oligonucleotide synthesis*" J. Amer. Chem. Soc. 125, 962-965.

Serafinowski, P. J. & Garland, P. B. (2005) WO 03/000644.

Shchepinov, M. S. & Southern, E. M. (2005) "Trityl-type compounds and their use" U.S. patent application Ser. No. 2005/0043414.

Sierzchala, A. B; Dellinger, D. J; Betley, J. R; Wyrzykiewicz, T. K; Yamada, C. M; Caruthers, M. H. (2003) "*Solid-phase oligodeoxynucleotide synthesis: a two-step cycle using peroxy anion deprotection*" J. Amer. Chem. Soc., 125, 13427-13441.

Singh-Gasson, S; Green, R. D; Yue, Y; Blattner, F. Sussman, M. R. & Cerrina, F. (1999) "*Maskless fabrication of light-directed oligonucleotide microarrays using digital micromirror array*" Nature Biotechnology 17, 974-978.

Smith, B. A. & McConnell, H. M. (1978) "*Determination of molecular motion in membranes using periodic pattern photobleaching*" Proc. Natl. Acad. Sci. USA, 75. 2759-2763.

Smith, M; Rammler, D. H.; Goldberg, I. H. & Khorana, G. H. (1962) "*Studies on Polynucleotides. XIV. Specific synthesis of the C3'-C5' inter-ribonucleotide linkage. Syntheses of Uridyl-(3'→5')-uridine and uridyl-(3'→5')-Adenosine*" J. Amer. Chem. Soc. 84, 430-440.

Southern, E. M. & Egeland, R. Y. (2004) "Treatment of substrates" U.S. patent application Ser. No. 2004/0238369A1.

Sun, S. & Leggett, G. J. (2004) "*Matching the resolution of electron beam lithography by scanning near field microscopy*" Nano Letters 4, 1381-1384.

Thompson, L. F; Wilson, C. G. & Bowden, M. J. (1994) "*Introduction to Microlithography*" Amer. Chem. Soc. Washington D. C.

Wallraff, G; Labadie, J; Brock, P; DiPietro, R; Nguyen, T; Huynh, T; Hinsberg, W. & Mcgall G. (1997) "*DNA sequencing on a chip*" Chemtech, February 22-32.

Wallraff, G. M; & Hinsberg, W. D. (1999) "*Lithographic imaging techniques for the formation of nanoscopic features*" Chem. Rev. 99, 1801-1821.

Woll, D; Walbert, S; Stengele, K-P; Albert, T. P; Richmond, T; Norton, J; Singer, M; Green, R. D; Pfleiderer, W. & Steiner, U. E. (2004) "*Triplet-sensitised photodeprotection of oligonucleotides in solution and on microarray chips*" Helv. Chim. Acta 87, 28-45.

Xu, G., & Goldberg, M. (2004) "Functionated photoacid generator for biological microarray synthesis." U.S. patent application Ser. No. 2004/0110133 A1

Xu, G. & Goldberg, M. J. (2005) "Method of photolithographic production of polymer arrays" U.S. patent application Ser. No. 20050244755.

Zhou, X.; Cai S; Hong, A; Yiu, Q; Yu, P; Sheng, N; Srivannavit, 0; Muranjan, S; Roillard, J. M; Xia, Y; Zhang, X; Xiang, Q; Ranesh, R; Zhu, Q; Matejko, A; Gulari, E & Gao, X. (2004) "*Microfluidic picoarray synthesis of oligodeoxynucleotides and simultaneous assembling of multiple DNA sequences*" Nucleic Acids Research, 32, 5409-5417.

The invention claimed is:

1. A method of synthesizing an oligomer array on a solid substrate, the array comprising linker molecules or oligomer molecules attached to the substrate at a plurality of array elements, the linker molecules or oligomers molecules having protecting groups to make them unreactive to a chain extension reaction with a monomer, wherein the method comprises:

(a) providing in contact with the array with a film that restricts diffusion of reactants and products on the substrate during synthesis of the array, wherein the film includes a precursor of a reagent that is capable of removing the protecting groups of the linker or oligomer molecules;

(b) generating the reagent that is capable of removing the protecting groups of the linker or oligomer molecules from the precursor at one or more of the array elements chosen for the chain extension reaction with a monomer;

(c) removing the protecting groups in a reversible reaction at the one or more of the array elements to produce reactive array elements at which the linker molecules or oligomer molecules are capable of undergoing a chain extension reaction with a monomer, and one or more other products of the deprotection reaction that are not further required; and (d) coupling a monomer to the linker or oligomer molecules at one or more of the reactive array elements;

said method further comprising removing one or more of the non-required products of the deprotection reaction from the reactive array elements at which they are produced during the reaction, in order to displace said deprotection reaction towards completion.

2. The method of claim 1, wherein the oligomer array is an oligonucleotide array or a peptide array.

3. The method of claim 1, wherein the step of removing the protecting groups comprises generating a reactant from a precursor in the film which is capable of directly removing the protecting group.

4. The method of claim 1, wherein the reactant capable of removing the protecting group is produced photolytically from the precursor in the film.

5. The method of claim 1, wherein the protecting group is a dimethoxytrityl (DMT) group.

6. The method of claim 1, wherein removing the one or more non-required products of the deprotection reaction from the reactive array elements comprises further reacting the one or more of the non-required products of the deprotection reaction to form further chemical species that do not participate in reversal of the deprotection reaction.

7. The method of claim 6, wherein the protecting group is converted by the deprotecting reagent to a carbocation that then reacts irreversibly with a carbocation scavenging reagent incorporated in the film.

8. The method of claim 1, wherein removing one or more of the non-required products of the deprotection reaction comprises providing a film through which the products are capable of translational diffusion whereby to remove the products from the location of the reversible reaction at the reactive array elements.

9. The method of claim 1, wherein the polymer array is an oligonucleotide array and the protecting groups are acid labile groups linked to the free 3' or 5' terminus of oligonucleotides or linker molecules and wherein producing reactive array elements comprises illuminating those elements of the array to photolyse a photoacid generator within the film to generate acid that is capable of directly removing the protecting group of the linker molecules or oligonucleotides.

10. The method of claim 1, wherein the method further comprises:
   removing the film and products of the deprotection reaction from the polymer array;
   providing in contact with the array with a second film; and
   repeating photolytic or electrochemical production of the reactant capable of removing the protecting group is produced from the precursor in the second film.

11. The method of claim 1, wherein the film is a polymer formed from the photoacid generator.

12. The method of any one of claim 4, wherein a base or a buffer is provided at each element in the array to neutralise acid generated by stray light photolysing the compound present at elements of the array other than those elements targeted for synthesis.

13. The method of claim 1, further comprising determining the concentration of the protecting group released in each synthetic cycle.

14. The method of claim 1, wherein the photoacid generator is a substituted 2-nitrobenzyl ester that photolysis to release a carboxylic or halo-substituted carboxylic acid; or an alkyl-, or substituted alkyl-, aryl-, or substituted aryl- sulphonic acid, or haloacid.

15. The method of claim 1, wherein the acid generated by the photolysis of the compound is a halogen substituted carboxylic acid or sulphonic acid.

16. The method of claim 1, wherein the photoacid generator is:
   1. (3-(Dimethylamino)-2,6-dinitrophenyl)(pheny)methyl-2,2,2-trichloroacetate;
   2. (3-(Diethylamino)-2,6-dinitrophenyl)(phenyl)methyl-2,2,2-trichloracetate;
   3. (2,6-Dinitro-3-pyrrolidin-1-yl)phenyl)(phenyl) methyl-2,2,2-trichloroacetate;
   4. (2-Nitro-5-(pyrrolidin-1-yl)phenyl)(phenyl)methyl-2,2,2-trichloroacetate;
   5. (2,6-Dinitro-3-(piperidin-1-yl)phenyl)(phenyl)methyl-2,2,2-trichloroacetate;
   6. (3-Morpholino-2,6-dinitrophenyl)(phenyl)methyl-2,2,2-trichloroacetate;
   7. Trichloro-acetic acid-(2-nitro-5-phenylazo-phenyl)-phenyl-methyl ester;
   8. Acetic acid-2(2-nitro-5-phenylazo)-benzylester;
   9. 5-Acetamido-2-nitrobenzyl-acetate;
   10. 5-Amino-2-nitrobenzyl-acetate;
   11. (3-Amino-2,6-dinitrophenyl)(phenyl)methyl-acetate;
   12. (5-Bromo-2,6-dinitrophenyl)(phenyl)methyl-2,2,2-trichloroacetate;
   13. (3-Bromo-2,6-dinitrophenyl)(phenyl)methyl-2,2,2-trichloroacetate;
   14. (5-Chloro-2-nitrophenyl)(phenyl)methyl-2,2,2-trichloroacetate;
   15. (3-Chloro-2,6-dinitrophenyl)(phenyl)methyl-2,2,2-trichloroacetate;
   16. (3-Fluoro-2,6-dinitrophenyl)(phenyl)methyl-2,2,2-trichloroacetate;
   17. (5-Iodo-2-nitrophenyl)(phenyl)methyl-2,2,2-trichloroacetate;
   18. (2,6-Dinitro-3-(phenylamino)phenyl)(phenyl)methyl-2,2,2-trichloroacetate;
   19. (3-(4-Methoxyphenylamino)-2,6-dinitrophenyl)(phenyl)methyl-2,2,2-trichloroacetate;
   20. (2,6-Dinitro-3-(phenyl)phenyl(phenyl)methyl-2,2,2-trichloroacetate;
   21. (2,6-Dinitro-3-(4-N,N-dimethylaminophenyl)phenyl)(phenyl)pmethyl-2,2,2-trichloroacetate;
   22. (2,6-Dinitro-3-(4-methoxyphenyl)phenyl)(phenyl)methyl-2,2,2-trichloroacetate;
   23. (2,6-Dinitro-3-(3,4-dimethoxyphenyl)phenyl)(phenyl)methyl-2,2,2-trichloroacetate;
   24. (4, Methoxy-2,6-dinitrophenyl)(phenyl)methyl-2,2,2-trichloroacetate;
   25. (4-Methoxy-2-nitrophenyl)(phenyl)methyl-2,2,2-trichloroacetate; or
   26. 4,5-Dimethoxy-2-nitrophenyl(methyl)tosylate).

* * * * *